US011041035B2

(12) United States Patent
Hagadorn et al.

(10) Patent No.: US 11,041,035 B2
(45) Date of Patent: Jun. 22, 2021

(54) PROCESS TO PRODUCE LONG-CHAIN BRANCHED POLYOLEFINS USING DIENES

(71) Applicant: ExxonMobil Chemical Patents Inc., Baytown, TX (US)

(72) Inventors: John R. Hagadorn, Houston, TX (US); Jo Ann M. Canich, Houston, TX (US); Jingwen Zhang, Houston, TX (US); Peijun Jiang, Katy, TX (US); Britni J. Brobey, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 173 days.

(21) Appl. No.: 16/289,918

(22) Filed: Mar. 1, 2019

(65) Prior Publication Data

US 2019/0276572 A1 Sep. 12, 2019

Related U.S. Application Data

(60) Provisional application No. 62/640,356, filed on Mar. 8, 2018.

(51) Int. Cl.
| | |
|---|---|
| *C08F 2/38* | (2006.01) |
| *C08F 4/643* | (2006.01) |
| *C08F 4/642* | (2006.01) |
| *C08F 210/06* | (2006.01) |
| *C08F 236/20* | (2006.01) |
| *C08F 210/16* | (2006.01) |
| *C08F 10/02* | (2006.01) |
| *C08F 2/00* | (2006.01) |
| *C08K 5/01* | (2006.01) |
| *C08F 4/64* | (2006.01) |
| *C08F 4/659* | (2006.01) |
| *C08K 5/56* | (2006.01) |

(52) U.S. Cl.
CPC ............ *C08F 210/16* (2013.01); *C08F 2/001* (2013.01); *C08F 2/38* (2013.01); *C08F 4/64113* (2013.01); *C08F 4/65908* (2013.01); *C08F 10/02* (2013.01); *C08K 5/01* (2013.01); *C08K 5/56* (2013.01); *C08F 2438/03* (2013.01); *C08F 2500/09* (2013.01)

(58) Field of Classification Search
CPC ........... C08F 2/38; C08F 4/64113; C08F 4/50
See application file for complete search history.

(56) References Cited

U.S. PATENT DOCUMENTS

| | | | |
|---|---|---|---|
| 5,670,595 A | 9/1997 | Meka et al. | |
| 6,300,451 B1 | 10/2001 | Mehta et al. | |
| 7,087,686 B2 | 8/2006 | Britovsek et al. | |
| 7,928,164 B2 | 4/2011 | Jiang et al. | |
| 8,053,529 B2 | 11/2011 | Carnahan et al. | |
| 8,188,200 B2 * | 5/2012 | Sita .................. | C08F 10/02 526/161 |
| 8,338,557 B2 | 12/2012 | Mitani et al. | |
| 9,249,238 B2 | 2/2016 | Hagadorn et al. | |
| 9,290,519 B2 | 3/2016 | Hagadorn et al. | |
| 9,315,593 B2 * | 4/2016 | Hagadorn ........... | C08F 4/65912 |
| 9,580,533 B2 | 2/2017 | Jiang et al. | |
| 2004/0054098 A1 | 3/2004 | Weng et al. | |
| 2008/0177020 A1 | 7/2008 | Agapie et al. | |
| 2013/0143461 A1 | 6/2013 | Richeson et al. | |

FOREIGN PATENT DOCUMENTS

| | | |
|---|---|---|
| EP | 1 197 500 | 4/2002 |
| JP | 2011/168625 | 9/2011 |
| WO | 2007/035485 | 3/2007 |
| WO | 2009/061499 | 5/2009 |
| WO | 2017/034680 | 3/2017 |

OTHER PUBLICATIONS

Valente et al., "Coordinative chain transfer polymerization" Chemical Reviews, 2013, vol. 113, pp. 3836-3857.
Chum et al., "Olefin polymer technologies—History and recent progress at the Dow Chemical Company" Progress in Polymer Science, 2008, vol. 33, pp. 797-819.

* cited by examiner

*Primary Examiner* — Caixia Lu

(57) ABSTRACT

The present disclosure provides methods for producing an olefin polymer including: i) contacting alpha-olefin with a first catalyst system comprising a first non-metallocene catalyst, a first activator, and a reversible chain transfer agent to form a first polymer; ii) contacting the first polymer with a coupling agent in the presence of a catalyst, an activator; and iii) obtaining a second polymer. The present disclosure further provides polymers having a g'vis value from about 0.4 to about 0.8 and a vinyl unsaturation content of 0.8 or greater vinyls/1000 carbons, and preferably low gel content.

25 Claims, 8 Drawing Sheets

| | |
|---|---|
| INJECT MASS (mg) = 0.156 | LINEAR ZIMM ANALYSIS |
| CALC. MASS (mg) = 0.128 (82.3%) | A2 (INPUT VALUE) = 0.0015 |
| ADJUSTED FLOW RATE (ml/m) = 0.559 | (dn/dc) = 0.1048 |
| COLUMN CAL. C0 = 12.518 | LS to DRI (ml) = 0.21 |
| COLUMN CAL. C1 = -0.33593 | LS to VIS. (ml) = 0.405 |
| COLUMN CAL. C2 = -0.00092593 | K (SAMPLE) = 0.00049786 |
| COLUMN CAL. C3 = 0 | ALPHA (SAMPLE) = 0.695 |
| INJECT MARK (ml) = 32.987 | LS CALIB. CONST. = 4.6712e-05 |
| VISTALON BI = 0.268 | DRI CONST. = 0.0002302 |
| | DP CONST. = 0.6358 |
| | IP GAIN = 23.1 mV/KPa |

| | |
|---|---|
| INJECT MASS (mg) = 0.106 | LINEAR ZIMM ANALYSIS |
| CALC. MASS (mg) = 0.088 (83.1%) | A2 (INPUT VALUE) = 0.0015 |
| ADJUSTED FLOW RATE (ml/m) = 0.559 | (dn/dc) = 0.1048 |
| COLUMN CAL. C0 = 12.518 | LS to DRI (ml) = 0.21 |
| COLUMN CAL. C1 = -0.33593 | LS to VIS. (ml) = 0.405 |
| COLUMN CAL. C2 = -0.00092593 | K (SAMPLE) = 0.00050232 |
| COLUMN CAL. C3 = 0 | ALPHA (SAMPLE) = 0.695 |
| INJECT MARK (ml) = 32.987 | LS CALIB. CONST. = 4.6712e-05 |
| VISTALON BI = 0.3 | DRI CONST. = 0.0002302 |
| | DP CONST. = 0.6358 |
| | IP GAIN = 23.1 mV/KPa |

INJECT MASS (mg) = 0.103
CALC. MASS (mg) = 0.09 (87.9%)
ADJUSTED FLOW RATE (ml/m) = 0.559
COLUMN CAL. C0 = 12.518
COLUMN CAL. C1 = -0.33593
COLUMN CAL. C2 = -0.00092593
COLUMN CAL. C3 = 0
INJECT MARK (ml) = 32.987
VISTALON BI = 0.186

LINEAR ZIMM ANALYSIS
A2 (INPUT VALUE) = 0.0015
(dn/dc) = 0.1048
LS to DRI (ml) = 0.21
LS to VIS. (ml) = 0.405
K (SAMPLE) = 0.00050588
ALPHA (SAMPLE) = 0.695
LS CALIB. CONST. = 4.6712e-05
DRI CONST. = 0.0002302
DP CONST. = 0.6358
IP GAIN = 23.1 mV/KPa

PROCESS TO PRODUCE LONG-CHAIN BRANCHED POLYOLEFINS USING DIENES

PRIORITY CLAIM

This application claims the benefit of and priority to U.S. Ser. No. 62/640,356 filed Mar. 8, 2018 and is incorporated by reference in its entirety.

FIELD

The present disclosure relates to polyolefins and methods for producing long chain branched polyolefins.

BACKGROUND

Most commercial polymers are substantially linear, e.g., they have a single-chain of monomers (mers) that form the backbone of the molecule. Side chains can occur and can have a major effect on the physical properties of the polymer. Copolymerization (e.g., of ethylene and 1-hexene) provides short-chain branching where the branches contain, for example, 4 carbon atoms derived from the 1-hexene comonomers. The random location of the side chains can lower the crystallinity and density of the polymer. Long-chain branching refers to branches that are much longer than the mer-based short-chain branching. Typically these long-chain branches exceed the entanglement molecular weight of the polymer. For example, the branches can be similar in length to the polymer backbone. While these long-chain branches may lower the crystallinity and density of a polymer, their major effect can be to improve the processability of the polymer by increasing shear thinning and sometimes melt strength. These properties are favorable for example, in EPDM (ethylene-propylene-diene modified) polymers for processing the high MW polymers into articles, such as weather seals, hoses, and roofing materials.

One approach described to increase long-chain branching in polyolefins produced in solution polymerization processes is to add a di- or polyfunctional crosslinking agent, e.g. α,ω-dienes or cyclic dual reactive dienes such as vinylnorbornene, to the polymerization reactor. While this approach can produce long-chain branching, it is very sensitive to the amount of crosslinking agent (a polymer can be exceedingly cross-linked), and as a result the process has been prone to the formation of insoluble gels. Such gels may remain part of the polymerization medium or they may cling to the surface of the reactor and/or plug the tubing of a reactor. The presence of gels is generally undesirable because they reduce the ability of the polymer to flow, even when the molten polymer is subjected to shear. A highly crosslinked gel behaves like a crosslinked thermoset polymer and is not suitable for melt processing under typical extrusion temperatures either during pelletizing or extrusion into the final product. Gels also hinder formation of film blowing grade resins. Gels are also visible on the blown film and may burst as a film bubble. Furthermore, gels are typically not processable in melt-extrusion processes, and the gel formation may reduce the solubility of the polymer; this low solubility can be observed as very low mass recovery amounts in gel permeation chromatography (GPC) experiments (e.g., 10-15% or less). Gel formation is a common operations phenomenon and causes unplanned production outages. When gels are detected in the product and/or reactor, the reactor is typically shut down for mechanical cleaning. Thus, improved methods to use dienes to introduce long-chain branching in olefin polymerization processes without the formation of intractable gels are needed and desirable.

References of interest include: US 2014/0256893; US 2015/0141596; U.S. Pat. Nos. 8,053,529; 8,188,200; 8,338,557; US 2015/0141601; U.S. Pat. Nos. 7,087,686; 7,928,164; 9,580,533; 6,300,451; 5,670,595; WO 2007/035485; WO 2009/061499; WO 2017/034680; and A. Valente, et al., Chem. Rev., 2013, 113, 3836-3857.

There is a need for new and improved long-chain branched polyolefins and methods for producing long-chain branched polyolefins that do not form reactor gels. Likewise, there is a need to provide reduced or eliminated gel formation as compared to conventional polymerizations using diene monomers that contain two polymerizable alkene groups. Processes of the present disclosure provide reduced or eliminated gel formation, and gel content of 20% or less based on the total weight of polymer product.

SUMMARY

The present disclosure provides polyolefins and methods for producing long chain branched polyolefins. Methods include a two stage process where living polymer chains produced in a first polymerization stage are reacted in a subsequent polymerization stage with diene monomer to crosslink the living ends of the polymer chains to form long-chain branched polyolefin. This process yields polyolefin containing high levels of long-chain branching, but without the formation of gels that cause reactor fouling.

In at least one embodiment, a method for producing an olefin polymer includes: i) contacting one or more alpha-olefins (which can include one or more mono-reactive dienes) with a first catalyst system comprising a first non-metallocene catalyst, a first activator, and a reversible chain transfer agent to form a polymerization mixture containing a first polymer; ii) contacting the polymerization mixture containing the first polymer with a coupling agent, and optionally, a second catalyst, a second activator, and optionally additional alpha-olefins; and iii) obtaining a second polymer.

In at least one embodiment, a method for producing an olefin polymer includes: i) contacting one or more alpha-olefins with a catalyst system comprising a non-metallocene catalyst, an activator, and a reversible chain transfer agent to form a first polymer; ii) contacting the first polymer with a coupling agent in the presence of the first catalyst system or a second catalyst system comprising a second non-metallocene catalyst and a second activator; and iii) obtaining a second polymer.

In at least one embodiment, a method for producing an olefin polymer includes: i) contacting one or more alpha-olefins (which can include one or more mono-reactive dienes) with a catalyst system comprising a non-metallocene catalyst, an activator, and a reversible chain transfer agent in a first reactor to form a first polymer; ii) transferring the first polymer and reactor effluent into a second reactor and contacting the first polymer and reactor effluent with a coupling agent (and optionally one or more alpha-olefins (which can include one or more dienes); and optionally a second catalyst and a second activator, and iii) obtaining a second polymer.

In at least one embodiment, a polymer has a g'vis value from about 0.4 to about 0.8 and a vinyl unsaturation content of 0.8 or greater vinyls/1000 carbons.

DETAILED DESCRIPTION

Figure 1:
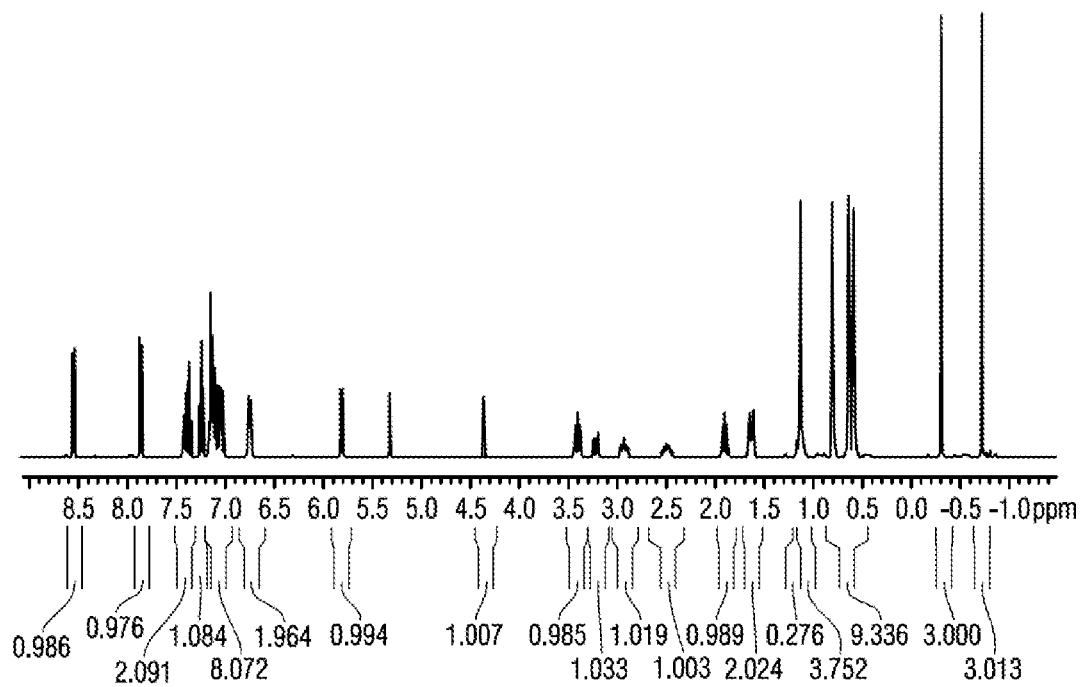
FIG. 1 is a $^1$H NMR spectrum of CAT-1 acquired on a 400 MHz NMR spectrometer, according to an embodiment.

The present disclosure provides methods for producing olefin polymers by contacting one or more $C_2$-$C_{20}$ α-olefins (which can include one or more dienes, such as mono-reactive dienes), with a catalyst, an activator, and a reversible chain transfer agent to obtain a first polymer. The first polymer is linear (i.e. it has little to no long-chain branching) and can have a g'vis value of 0.95 or greater, as determined by GPC-3D. Methods include contacting the first polymer with a coupling agent, such as a dual-reactive diene, a catalyst and an activator to crosslink the first polymer chains to form long-chain branched polymer with little to no formation of gels. Polymers formed by methods of the present disclosure have reduced or eliminated gel-formation in a reactor, preferably providing reduced or eliminated gel content of 20 wt % or less (preferably less than 15 wt %, preferably less than 10 wt %, preferably less than 5 wt %, preferably less than 3 wt %, preferably less than 2 wt %, preferably less than 1 wt %, preferably less than 0.5 wt %, preferably 0 wt %, based on the weight of the polymer, or optionally providing a mass recovery of polymer products of 50% or greater by weight based on the total weight of polymer product of a polymerization, as determined by gel permeation chromatography, such as 80% or greater (alternatively 85% or greater, alternatively 90% or greater, alternatively 95% or greater). Crosslinked long-chain branched polymers of the present disclosure can have g'vis values of 0.9 or less (alternatively 0.85 or less, alternatively 0.80 or less, alternatively 0.75 or less, alternatively 0.70 or less, alternatively 0.65 or less, alternatively 0.60 or less), such as from about 0.4 to about 0.8, as determined by GPC-3D. Low g' values often correlate with shear thinning behavior, e.g. a polymer is becoming less viscous at higher shear rates (which indicates long-chain branching). Polymers of the present disclosure can have a vinyl unsaturation content of 0.1 or greater vinyls/1000 carbons (alternatively 0.2 or greater, 0.3 or greater, 0.4 or greater, 0.5 or greater, 0.6 or greater, 0.7 or greater, 0.8 or greater vinyls/1000 carbons), as determined by $^1$H NMR, which provides reactive end groups on the polymers for optional functionalization. Polymers of the present disclosure have HLMI/MI values of 20 or greater, preferably 25 or greater, more preferably 30 or greater, more preferably 40 or greater, most preferably 50 or greater. In at least one embodiment, a polymer of the present disclosure has an HLMI/MI value from about 40 to about 120, such as from about 50 to about 120, such as from about 50 to about 113, such as from about 60 to about 113, such as from about 70 to about 113.

Definitions

The specification describes transition metal complexes. The term complex is used to describe molecules in which an ancillary ligand is coordinated to a central transition metal atom. The ligand can be bulky and is stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

As used herein, the numbering scheme for the Periodic Table groups is the new notation as set out in Chemical and Engineering News, 63(5), 27 (1985).

The following abbreviations are used: dme is 1,2-dimethoxyethane, Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL and TNOA each refer to tri(n-octyl)aluminum, MAO is methylalumoxane, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

The term "crosslinked" refers to two or more polymer chains joined by reaction with one or more coupling agents of the present disclosure. When crosslinking is performed as described in the present disclosure, a long-chain branched polymer is produced with minimal reactor fouling and/or formation of insoluble gels.

The term "vinyl" describes a —CH=CH$_2$ group. The term "vinylene" describes a 1,2-disubstituted alkene. The term "vinylidene" describes a 1,1-disubstituted alkene. The term "trisub" indicates a 1,1,2-trisubstituted alkene.

An "olefin", is a linear, branched, or cyclic compound of carbon and hydrogen having at least one double bond (and in some embodiments only one double bond) that is reactive with a transition metal polymerization catalyst system. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

The term "alpha-olefin" is defined to include ethylene and C$_3$ and higher olefins that have one and only one vinyl or a cycloalkene group. Excluded from alpha-olefins are alkenes that have two or more total vinyl or cycloalkene groups. The term "alpha-olefin" is used interchangeably with "α-olefin" or "alpha olefin" or "α olefin". The term "alpha-olefin" includes "mono-reactive dienes". Examples of "alpha-olefins" include ethylene, propylene, 1-butene, 1-hexene, 1-octene, 1-decene, norbornene, 1,4-hexadiene, 5-ethylidene-2-norbornene, and 7-methyl-1,6-octadiene, cyclopentene, styrene, 4-methyl-1-pentene, and 3-methyl-1-pentene. For clarity the term "alpha olefin" does not include alpha-omega dienes.

The term "diene" includes olefins that have two or more carbon-carbon double bonds. Examples of "dienes" include 1,4-hexadiene, 1,5-hexadiene, 1,7-octadiene, 1,9-decadiene, poly(1,2-butadiene), 5-ethylidene-2-norbornene, 5-vinyl-2-norbornene, 7-methyl-1,6-octadiene, and norbornadiene. For clarity the term "diene" does include alpha-omega dienes.

The term "mono-reactive diene" includes those dienes that have one and only one vinyl or cycloalkene group. Examples of "mono-reactive dienes" include alpha, internal dienes (such as 1,4-hexadiene), 5-ethylidene-2-norbornene, and 7-methyl-1,6-octadiene.

The term "dual-reactive diene" includes dienes that have two or more diene groups independently selected from vinyl and cycloalkene groups. Examples of "dual-reactive dienes" include 1,5-hexadiene, 1,6-heptadiene, 1,7-octadiene, 1,8-nonadiene, 1,9-decadiene, poly(1,2-butadiene), di(but-3-en-1-yl)dimethylsilane, tri(but-3-en-1-yl)(methyl)silane, tetra(but-3-en-1-yl)silane, 1,4-divinylbenzene, 5-vinyl-2-norbornene, and norbornadiene. For clarity the term "mono-reactive diene" does include alpha-omega dienes.

The term "substituted" means that a substituent is present on a molecule instead of a hydrogen atom. Substituents can be a heteroatom, a heteroatom containing group, or a hydrocarbyl group. For example, bromobenzene is a substituted benzene.

The term "heteroatom" refers to non-metallic group 13 to 17 elements, excluding carbon.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be C$_1$-C$_{100}$ radicals, that may be linear, branched, or cyclic, and when cyclic, aromatic or non-aromatic.

Substituted hydrocarbyl radicals are radicals in which at least one hydrogen atom of the hydrocarbyl radical has been replaced with at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, or where at least one heteroatom has been inserted within a hydrocarbyl ring.

For purposes of the present disclosure, a "catalyst system" is the combination of at least one catalyst compound, at least one activator, an optional co-activator, and an optional support material. For the purposes of the present disclosure, when catalyst systems are described as comprising neutral stable forms of the components, it is well understood by one of ordinary skill in the art that the ionic form of the component is the form that reacts with the monomers to produce polymers. For the purposes of the present disclosure, "catalyst system" includes both neutral and/or ionic forms of the components of a catalyst system, such as the catalyst compounds.

For the purposes of the present disclosure, a formula representing a neutral catalyst compound also embraces ionic forms of the catalyst.

Complex, as used herein, is also often referred to as catalyst precursor, precatalyst, catalyst, catalyst compound, transition metal compound, or transition metal complex. These words are used interchangeably. Activator and cocatalyst are also used interchangeably.

The term "reversible chain transfer agent" refers to a group 12 or 13 organometallic compound, or mixture of such compounds, which is capable of reversibly transferring an alkyl group, including polymeryl groups, between the group 12 or 13 metal center and the activated transition metal polymerization catalyst. Some reversible chain transfer agents may also function as scavengers. Additionally, the initiation of new polymer chains in the presence of the crosslinking agent is undesirable as it will lead to the formation of insoluble gels. The term "reversible chain transfer agent" does not include chain transfer agents that irreversibly react with a growing polymer chain to form a dead chain, which does not participate in any further growth. Examples of irreversible chain transfer agents are hydrogen and silanes, which react with the growing polymer chain of an activated catalyst to cleave off the polymer chain and generate a metal-hydride that can initiate the growth of a new polymer chain.

A scavenger is a compound that can be added to a reactor to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound. Examples of scavengers include, but are not limited to, trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride.

An oligomer is typically a polymer having a low molecular weight, such as an Mn of less than 25,000 g/mol, or in an embodiment less than 2,500 g/mol, or a low number of mer units, such as 75 mer units or less or 50 mer units or less.

Unless otherwise noted, all molecular weights units (e.g., Mw, Mn, Mz) are g/mol.

Unless otherwise noted, all melting points ($T_m$) are DSC second melt.

Halocarbyl radicals are radicals in which one or more hydrocarbyl hydrogen atoms have been substituted with at least one halogen (e.g. F, Cl, Br, I) or halogen-containing group (e.g. $CF_3$).

Substituted halocarbyl radicals are radicals in which at least one halocarbyl hydrogen or halogen atom has been replaced with at least one functional group such as $NR^*_2$, $OR^*$, $SeR^*$, $TeR^*$, $PR^*_2$, $AsR^*_2$, $SbR^*_2$, $SR^*$, $BR^*_2$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure. Substituted halocarbyl radicals are only bonded via a carbon atom.

Silylcarbyl radicals are radicals in which one or more hydrocarbyl hydrogen atoms have been substituted with at least one $SiR^*_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure.

Substituted silylcarbyl radicals are radicals in which at least one hydrogen atom has been replaced with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR^*_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure. Substituted silylcarbyl radicals are only bonded via a carbon or silicon atom.

Germylcarbyl radicals are radicals in which one or more hydrocarbyl hydrogen atoms have been substituted with at least one $GeR^*_3$ containing group or where at least one —Ge(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Substituted germylcarbyl radicals are only bonded via a carbon or germanium atom.

Substituted germylcarbyl radicals are radicals in which at least one hydrogen atom has been replaced with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $SnR^*_3$, $PbR^*_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

The term "aryl" or "aryl group" means a monocyclic or polycyclic aromatic ring and the substituted variants thereof, including phenyl, naphthyl, 2-methyl-phenyl, xylyl, 4-bromo-xylyl. Likewise, "heteroaryl" is an aryl group where a ring carbon atom (or two or three ring carbon atoms) has been replaced with a heteroatom, such as N, O, or S. The term "substituted aryl" means: 1) an aryl group where a hydrogen has been replaced by a substituted or unsubstituted hydrocarbyl group, a substituted or unsubstituted halocarbyl group, a substituted or unsubstituted silylcarbyl group, a heteroatom containing group, or a substituted or unsubstituted germylcarbyl group. The term "substituted heteroaryl" means: 1) a heteroaryl group where a hydrogen has been replaced by a substituted or unsubstituted hydrocarbyl group, a substituted or unsubstituted halocarbyl group, a substituted or unsubstituted silylcarbyl group, a heteroatom containing group, or a substituted or unsubstituted germylcarbyl group.

The term "ring atom" means an atom that is part of a cyclic ring structure. For example, a benzyl group has six ring atoms and tetrahydrofuran has 5 ring atoms.

A "ring carbon atom" is a carbon atom that is part of a cyclic ring structure. For example, a benzyl group has six ring carbon atoms and para-methylstyrene also has six ring carbon atoms.

A heterocyclic ring is a ring having a heteroatom in the ring structure as opposed to a heteroatom substituted ring where a heteroatom is present instead of a hydrogen on a ring atom. For example, tetrahydrofuran is a heterocyclic ring and 4-N,N-dimethylamino-phenyl is a heteroatom substituted ring.

As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn during a polymerization process.

The term "pyridyldiamido complex" or "pyridyldiamide complex" or "pyridyldiamido catalyst" or "pyridyldiamide catalyst" refers to a class of coordination complexes described in U.S. Pat. No. 7,973,116B2, US 2012/0071616A1, US 2011/0224391A1, US 2011/0301310A1, US 2015/0141601A1, U.S. Pat. Nos. 6,900,321 and 8,592,615 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes the pyridyldiamido ligand is coordinated to the metal with the formation of one five membered chelate ring and one seven membered chelate ring. It is possible for additional atoms of the pyridyldiamido ligand to be coordinated to the metal without affecting the catalyst function upon activation; an example of this could be a cyclometalated substituted aryl group that forms an additional bond to the metal center. The term "quinolinyldiamido complex" or "quinolinyldiamido catalyst" or "quinolinyldiamide complex" or "quinolinyldiamide catalyst" refers to a related class of pyridyldiamido complex/catalyst described in US 2018/0002352 where a quinolinyl moiety is present instead of a pyridyl moiety.

The term "phenoxyimine complex" or "phenoxyimine catalyst" refers to a class of coordination complexes described in EP 0 874 005 that feature a monoanionic bidentate ligand that is coordinated to a metal center through one neutral Lewis basic donor atom (e.g., an imine moiety) and an anionic aryloxy (i.e., deprotonated phenoxy) donor. Typically two of these bidentate phenoxyimine ligands are coordinated to a group 4 metal to form a complex that is useful as a catalyst component.

The term "bisphenolate complex" or "bisphenolate catalyst" refers to a class of coordination complexes described in U.S. Pat. No. 6,841,502, WO 2017/004462, and WO 2006/020624 that feature a dianionic tetradentate ligand that is coordinated to a metal center through two neutral Lewis basic donor atoms (e.g., oxygen bridge moieties) and two anionic aryloxy (i.e., deprotonated phenoxy) donors.

The term "cyclopentadienyl-amidinate complex" or "cyclopentadienyl-amidinate catalyst" refers to a class of coordination complexes described in U.S. Pat. No. 8,188,200 that typically feature a group 4 metal bound to a cyclopentadienyl anion, a bidentate amidinate anion, and a couple of other anionic groups.

The term "iron pyridyl bis(imine) complex" refers to a class of iron coordination complexes described in U.S. Pat. No. 7,087,686 that typically feature an iron metal center coordinated to a neutral, tridentate pyridyl bis(imine) ligand and two other anionic ligands.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

As used herein, Mn is number average molecular weight, Mw is weight average molecular weight, Mz is z average molecular weight, Mv is viscosity-averaged molecular weight, wt % is weight percent, and mol % is mol percent. Unless specified, the molecular weight distribution (MWD), also referred to as polydispersity index (PDI), is defined to be Mw(LS)/Mn(DRI), where Mw(LS) is the weight average molecular weight as determined with a light scattering detector and Mn(DRI) is the number average molecular weight as determined with a differential refractive index detector. Unless otherwise noted, all molecular weight units (e.g., Mw, Mn, Mz, and Mv) are g/mol.

For purposes of the present disclosure, a metallocene catalyst is defined as a "bisCp", i.e. an organometallic transition metal compound with two π-bound cyclopentadienyl moieties (or substituted cyclopentadienyl moiety) bound to a transition metal. The two cyclopentadienyl moieties may be linked to each other to form what is commonly referred to as a bridged or ansa-bridged metallocene.

For purposes of the present disclosure, "alkoxide" or "alkoxyl" includes a substituent represented by the formula —OR, where R is substituted or unsubstituted hydrocarbyl. For example, R can be a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group. The terms alkoxide and alkoxyl can be used interchangeably.

EMBODIMENTS

The present disclosure provides methods for producing olefin polymer comprising: i) contacting one or more $C_2$-$C_{40}$ alpha-olefins, with a catalyst, an activator, and a reversible chain transfer agent to obtain a polymerization mixture containing the first polymer, ii) contacting the polymerization mixture containing the first polymer with a coupling agent, such as a dual-reactive diene, optionally a catalyst and an activator, and optionally one or more $C_2$-$C_{40}$ alpha-olefins, and iii) obtaining a long-chain branched polymer having a $g'_{vis}$ value of 0.9 or less (alternatively 0.85 or less, alternatively 0.80 or less, alternatively 0.75 or less, alternatively 0.70 or less, alternatively 0.65 or less, alternatively 0.60 or less), such as from about 0.4 to about 0.8, as determined by GPC-3D, and a vinyl unsaturation content of 0.1 or greater vinyls/1000 carbons, as determined by $^1$H NMR.

Processes

The catalyst systems described herein are useful in polymerizing unsaturated monomers conventionally known to undergo transition metal catalyzed coordinative polymerization such as solution, slurry, and gas-phase polymerization. In a first stage, one or more of the catalyst compounds of the present disclosure, one or more activators, one or more reversible chain transfer agents, one or more $C_2$ to $C_{40}$ alpha-olefins are contacted to produce a first polymer. In a second stage, the mixture containing the first polymer is contacted with one or more coupling agents, optionally one or more of the catalyst compounds of the present disclosure, optionally one or more activators, and optionally one or more $C_2$ to $C_{40}$ alpha-olefins, to form long-chain branched polymer. Preferably, a coupling agent is not introduced into the reactor during the first stage. Preferably, a reversible chain transfer agent is not introduced into the reactor during the second stage. Comparatively, a coupling agent present in the reactor during the first stage forms an intractable network gel with a high gel content (often 25% or more, alternately 30% or more.)

Processes of the present disclosure provide reduced or eliminated gel content of 20 wt % or less (preferably less than 15 wt %, preferably less than 10 wt %, preferably less than 5 wt %, preferably less than 3 wt %, preferably less than 2 wt %, preferably less than 1 wt %, preferably less than 0.5 wt %, preferably 0 wt %, based on the weight of the polymer.

Processes of the present disclosure provide reduced or eliminated gel formation, and mass recovery of 50% by weight or greater based on the total weight of polymer product of a polymerization, as determined by gel permeation chromatography. Comparatively, a coupling agent present in the reactor during the first stage forms an intractable network gel with a low mass recovery of less than 30%.

In at least one embodiment, the catalyst system of the first stage and the catalyst system of the second stage each have one catalyst.

For the first stage and second stage, the catalyst compound and activator may be introduced to the reactors as separate solutions, slurries, or suspensions. Alternatively, the catalyst compound and activator may be combined together as a slurry, suspension, or solution prior to introduction to the reactors. The catalyst compound and activator are combined typically prior to contacting the catalyst system with the reversible chain transfer agent in the first stage. The catalyst compound and activator are combined typically prior to contacting the catalyst system with the coupling agent in the second stage. In one embodiment, additional catalyst and activator are not added during the second stage, and residual catalyst from the first stage is used to promote the crosslinking of the living polymer chains with the coupling agent.

The first stage and the second stage can (1) be performed in the same reactor or (2) be performed in different reactors where the ethylene polymer/copolymer of the first stage is transferred to a second reactor and the second stage is then performed. A catalyst compound of the first stage can be the same as or different than a catalyst compound of the second stage. Similarly, an activator of the first stage can be the same as or different than an activator of the second stage. For purposes of the present disclosure, one catalyst compound or activator is considered different from another if they differ by at least one atom. For example, (iPrCp)(Cp)ZrCl$_2$ is different that Cp$_2$ZrCl$_2$, which is different from (iPrCp)$_2$ZrCl$_2$.

The process described herein is preferably a solution polymerization process that may be performed in a batchwise fashion or in a continuous process. Suitable reactors include tank, loop, and tube designs. In one embodiment, the process is performed in a continuous fashion and dual loop reactors in a series configuration are used. In one embodiment, the process is performed in a continuous fashion and dual continuous stirred-tank reactors (CSTRs) in a series configuration are used. In one embodiment, the process is performed in a continuous fashion and a tube reactor is used. In one embodiment, the process is performed in a continuous fashion and one loop reactor and one CSTR are used in a series configuration. In one embodiment, the process is performed in a batchwise fashion and a single stirred tank reactor is used.

In the first stage, one or more reactors in series or in parallel may be used. The complexes, activator, and reversible chain transfer agent, may be delivered as a solution, neat liquid, or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, reversible chain transfer agent, and optional modifiers are added continuously to a single reactor or in series reactor operation, in which the above components may be added to each of two or more reactors connected in series. The components can be added to the first reactor in the series. The components may also be added to both reactors, with one component, such as an activator, being added to the first reactor and another component, such as a coupling agent, to the second reactor. In one preferred embodiment, the complex is activated in the reactor in the presence of olefin.

In the second stage, one or more reactors in series or in parallel may be used. The coupling agent and optional catalyst and activator, may be delivered as a solution, neat liquid, or slurry, either separately to the reactor, activated in-line just prior to the reactor, or preactivated and pumped as an activated solution or slurry to the reactor. Polymerizations and crosslinkings are carried out in either single reactor operation, in which catalyst/activator/co-activator, coupling agent, optional monomer, optional comonomer, optional scavenger, and optional modifiers are added to a single reactor or in series reactor operation, in which the above components are added to each of two or more reactors connected in series. The components can be added to the first reactor in the series. The component may also be added to both reactors, with one component, such as an activator, being added to the first reactor and another component, such as a coupling agent, to the second reactor. If the reaction is performed in a single reactor then the addition of the crosslinking agent (i.e. second stage) occurs after the first stage of the polymerization has been completed. In one preferred embodiment, the complex is activated in the reactor in the presence of olefin.

Any suitable process may be used to prepare the polymers of the first stage of the polymerization or crosslinking process of the second stage including the use of a single continuous flow stirred tank reactor (CSTR). Other modifications, such as the use of two reactors in series or parallel to tailor the Mw/Mn of the polymer, are also contemplated.

In a preferred embodiment, the polymerization process of the first stage of the polymerization or crosslinking process of the second stage is performed in a batch reactor, semi-continuous batch reactor, a CSTR reactor or tubular reactor or a combination thereof.

In a particularly preferred embodiment, the polymerization process of the first stage of the polymerization and/or crosslinking process of the second stage is a continuous process.

The processes of the first stage and/or the second stage may be conducted under conditions preferably including a temperature of about 30° C. to about 200° C., such as from about 60° C. to about 195° C., such as from about 70° C. to about 150° C., such as from about 100° C. to about 140° C. The processes of the first stage and/or the second stage may be conducted at a pressure of from about 0.05 to about 1500 MPa. In a preferred embodiment, the pressure of the first stage and/or the second stage is from about 1.7 MPa to about 30 MPa, or in another embodiment, especially under supercritical conditions, the pressure is between 15 MPa and 1500 MPa.

Processes of the first stage and/or the second stage of the present disclosure can be carried out in any suitable manner, such as any suitable bulk, or solution polymerization process. Such processes can be run in a batch, semi-batch, or continuous mode. Solution phase polymerization processes are preferred. A solution process is a process where at least 90 wt % of the product is soluble in the reaction media. A bulk process is a process where monomer concentration in all feeds to the reactor is 70 volume % or more. Alternatively, no solvent or diluent is present or added in the reaction medium, (except for the small amounts used as the carrier for the catalyst system or other additives, or amounts typically found with the monomer; e.g., propane in propylene).

Suitable diluents/solvents for polymerization and/or crosslinking include non-coordinating, inert diluents/solvents. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™, which is isoparaffins); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably 0 wt % based upon the weight of the solvents.

In at least one embodiment, the feed concentration of the monomers and comonomers for the polymerization is from 1 vol % in solvent to 60 vol % in solvent, such as 1 vol % in solvent to 40 vol % in solvent, such as 1 vol % in solvent to 20 vol % in solvent, based on the total volume of the feedstream.

Preferred processes of the first stage and/or second stage can be run at any temperature and/or pressure suitable to obtain the desired polymers. Typical temperatures and/or pressures include a temperature in the range of from 0° C. to 300° C., such as 50° C. to 200° C., such as 75° C. to 150° C., such as from 85° C. to 140° C., such as from 100° C. to 135° C.; and at a pressure from 0.2 MPa to 25 MPa, such as from 0.45 MPa to 13 MPa, such as from 1 MPa to 12 MPa, such as from 0.2 MPa to 0.5 MPa, for example 1.5 MPa or 8 MPa, or 2.5 MPa to 8 MPa. Alternately the pressure is 2.5 MPa to 25 MPa.

In typical processes of the first stage and/or second stage, the average residence time of the reaction in each reactor is from about 5 to 300 minutes, such as from about 6 to 60 minutes, such as from about 15 minutes to about 60 minutes, such as from about 10 to 45 minutes, such as from about 10 to 30 minutes. For a process using two continuous reactors (CSTR or loop) in series, each continuous reactor will preferably have a residence time of from about 15 to about 60 minutes. In at least one embodiment, an average period of time between the end of the first stage and the beginning of the second stage is from about 0 minutes to about 300 minutes, such as from about 0.1 minutes to about 100 minutes, such as from about 0.5 minutes to about 30 minutes, such as about from about 0.3 to about 15 minutes, such as from about 1 minute to about 5 minutes.

In some embodiments hydrogen is present in the polymerization reactor at a partial pressure of 0.000007 to 0.7 MPa, preferably from 0.007 to 0.2 MPa, preferably from 0.01 to 0.1 MPa. In at least one embodiment, hydrogen is not present in the polymerization reactor (or kept below 0.000007 MPa) while the first stage is being performed so as not to interfere with polymer chelation with the metal of the chain transfer agent, e.g. form unreactive "dead" polymer chains. In at least one embodiment, hydrogen is not present in the polymerization reactor (or kept below 0.1 psig) while the second stage is being performed so as not to initiate the growth of new polymer chains in the presence of the coupling agent, which will increase the unwanted formation of reactor gels.

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. 29, 2000, 4627. Generally, solution polymerization involves polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. Suitable processes typically operate at temperatures from about 0° C. to about 250° C., preferably from about 50° C. to about 170° C., more preferably from about 80° C. to about 150° C., more preferably from about 100° C. to about 140° C. and at pressures of about 0.1 MPa or more, preferably 2 MPa or more, preferably 2.5 MPa or more. The upper pressure limit is not critically constrained but typically can be about 200 MPa or less, preferably 120 MPa or less, preferably 30 MPa or less. A Preferred pressure is 2.5 MPa to 30 MPa. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Alpha-Olefin Monomers

Alpha-olefin monomers useful for processes of the first stage and/or second stage include alpha-olefins having from 2 to 40 carbon atoms, alternatively 2 to 20 carbon atoms, alternatively 2 to 12 carbon atoms (preferably ethylene, propylene, 1-butene, 1-pentene, 1-hexene, 1-heptene, 1-octene, 1-nonene, 1-decene, 1-dodecene, styrene, p-methylstyrene, norbornene, 1,4-hexadiene, 4-methylpentene; 1,3-methylpent-1-ene, 3,5,5-trimethylhex-1-ene, 5-ethylnon-1-ene, and 5-ethylidene-2-norbornene). Particularly preferred alpha-olefin monomers include ethylene, and mixtures of $C_2$ to $C_{10}$ alpha-olefins, such as ethylene-propylene, ethylene-butene, ethylene-hexene, ethylene-octene, ethylene-propylene-(5-ethylidene-2-norbornene), and the like.

The complexes described herein are particularly effective for the polymerization of ethylene and at least one other alpha-olefin monomer, such as a $C_3$ to $C_{20}$ alpha-olefin, and particularly a $C_3$ to $C_{12}$ alpha-olefin. Examples of preferred alpha-olefin monomers to copolymerize with ethylene include propylene, 1-butene, 1-pentene; 1-hexene, 1-heptene, 1-octene, 1-nonene, 1-decene, 1-dodecene, 4-methylpentene; 1,3-methylpent-1-ene, 3,5,5-trimethylhex-1-ene, and 5-ethylnon-1-ene.

In at least one embodiment the preferred alpha-olefins are $C_2$ to $C_{20}$ alpha-olefins that exclude dienes.

Catalyst Compounds

The present disclosure provides polymerization processes where, in a first stage, one or more catalyst compounds, one or more activators, one or more reversible chain transfer agents, one or more $C_2$ to $C_{40}$ alpha-olefins are contacted to produce a first polymer that has a substantially linear backbone. In a second stage, the first polymer is contacted with one or more coupling agents, optionally one or more catalysts and activators, and optionally one or more $C_2$ to $C_{40}$ alpha-olefins, to form a long-chain branched polymer. Catalyst compounds of the present disclosure for the first stage and/or the second stage can be any suitable coordinative chain transfer polymerization (CCTP) catalysts. Preferably, a catalyst is a non-metallocene catalyst. In an embodiment, a catalyst is selected from pyridyldiamido, quinolinyldiamido, phenoxyimine, bis(phenolate), cyclopentadienylamidinate, pyridyl amido, and pyridine bis(imine) complexes. Preferably, a catalyst is selected from group 4 pyridyldiamido, quinolinyldiamido, phenoxyimine, and pyridyl amido complexes. More preferably, a catalyst is selected from group 4 pyridyldiamido and quinolinyldiamido complexes. Most preferably, a catalyst is selected from group 4 quinolinyldiamido complexes.

Without being bound by theory, catalyst systems that are suitable for use in the present disclosure are those that are capable of behaving as living alpha-olefin polymerization catalysts in the presence of a reversible chain transfer agent. The catalyst should not undergo significant beta-hydride elimination or beta-hydride transfer to monomer during the process. This will allow nearly all of the living polymer chains produced in the first stage to be crosslinked in the second stage in a head-to-head fashion. The coupling of polymer chains in a head-to-head fashion prevents the formation of extended network gels. Metallocenes, in particular group 4 metallocenes, are known to be susceptible to beta-hydride elimination or beta-hydride transfer to monomer processes under typical polymerization conditions.

The transition-metal catalyst and activator are added to the first stage of the polymerization. In the second stage of the polymerization (e.g., the crosslinking stage), additional catalyst and activator may be added to the reactor, but it may not be needed if the catalyst mixture from the first stage is still active. The first stage catalyst/activator may be the same or different from the second stage catalyst/activator. Additionally, mixtures of catalysts and activators may be used in each stage. Transition metal catalysts may be linked together by covalent or non-covalent bonds to form bimetallic or multimetallic catalysts.

In at least one embodiment, a catalyst is a pyridyldiamido or quinolinyldiamido transition metal complex represented by formula (I) or (II):

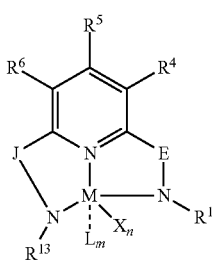
(I)

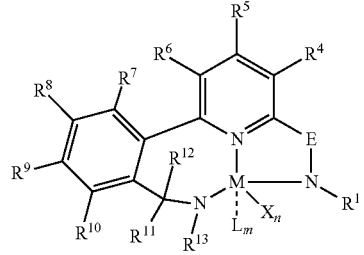
(II)

wherein:
M is a Group 3, 4, 5, 6, 7, 8, 9, or 10 metal (preferably M is Zr or Hf);
E is $C(R^2)$ or $C(R^3)(R^{3'})$;
X is an anionic leaving group (preferably X is methyl, chloride, or dialkylamido);
L is a neutral Lewis base (preferably L is ether, amine, phosphine, or thioether);
$R^1$ and $R^{13}$ are independently selected from substituted or unsubstituted hydrocarbyl or silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group that is unsubstituted in the 2 and 6 positions);
$R^2$ is a group containing 1-10 carbon atoms that is optionally joined with $R^4$ to form an aromatic ring (preferably $R^2$ & $R^4$ are joined to form a six membered aromatic ring);
$R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino (preferably $R^3$ & $R^{3'}$ are hydrogen);
J is a divalent group that forms a three-atom-length bridge between the pyridine ring and the amido nitrogen (preferably J is selected from:

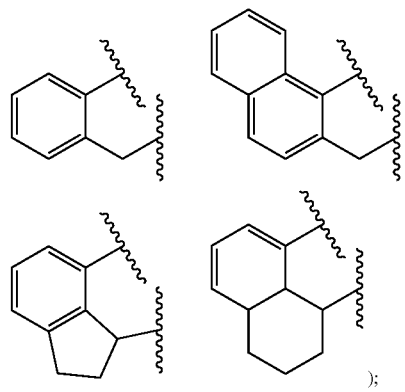
);

n is 1 or 2;
m is 0, 1, or 2; and
two X groups may be joined to form a dianionic group;
two L groups may be joined to form a bidentate Lewis base;
an X group may be joined to an L group to form a monoanionic bidentate group;
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (preferably $R^7$ & $R^8$ are joined to form an aromatic ring, preferably $R^7$ & $R^8$ are joined to form cyclopentyl or cyclohexyl, preferably $R^{10}$ & $R^{11}$ are joined to form a fiveor six-membered ring, preferably $R^{10}$ & $R^{11}$ are joined to form cyclopentyl or cyclohexyl).

Examples of pyridyldiamido or quinolinyldiamido transition metal complexes include the quinolinyldiamido transition metal complex CAT-1 and the pyridyldiamido transition metal complex CAT-2.

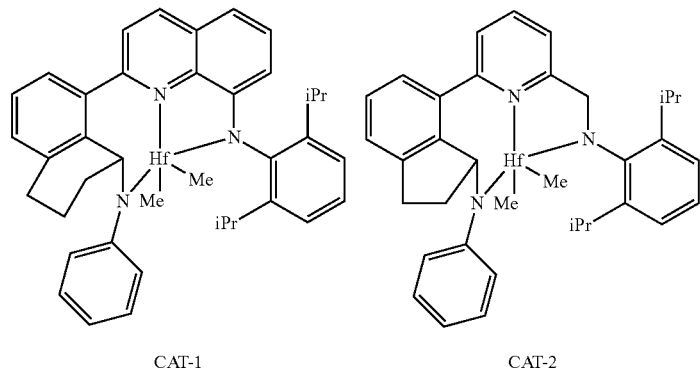

CAT-1     CAT-2

Catalysts of the present disclosure can include bis(phenolate) complexes described in U.S. Pat. No. 6,841,502, WO 2017/004462, and WO 2006/020624, the disclosures of which are incorporated herein by reference in their entirety.

In at least one embodiment, a bis(phenolate) transition metal complex is represented by formula (III):

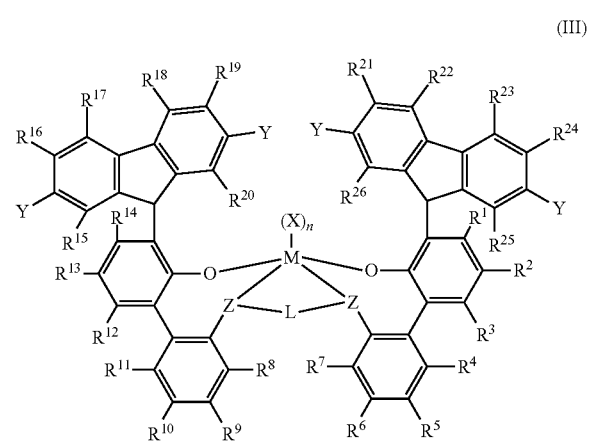

(III)

wherein:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (III) is, overall, neutral; and each Z independently is O, S, N($C_1$-$C_{40}$)hydrocarbyl, or P($C_1$-$C_{40}$)hydrocarbyl; and L is ($C_2$-$C_{40}$)hydrocarbyl or ($C_2$-$C_{40}$)heteroalkyl, wherein the ($C_2$-$C_{40}$)hydrocarbyl has a portion that comprises a 2-carbon atom to 10-carbon atom linker backbone linking the Z atoms in formula (III) (to which L is bonded) and the ($C_2$-$C_{40}$)heteroalkyl has a portion that comprises a 2-atom to 10-atom linker backbone linking the Z atoms in formula (III), wherein each of the 2 to 10 atoms of the 2-atom to 10-atom linker backbone of the ($C_2$-$C_{40}$)heteroalkyl independently is a carbon atom or heteroatom, wherein each heteroatom independently is O, S, S(O), S(O)$_2$, Si($R^C$)$_2$, P($R^P$), or N($R^N$), wherein independently each $R^C$ is ($C_1$-$C_{30}$)hydrocarbyl, each $R^P$ is ($C_1$-$C_{30}$) hydrocarbyl; and each $R^N$ is ($C_1$-$C_{30}$)hydrocarbyl; and $R^1$-$R^{26}$ are each independently selected from ($C_1$-$C_{40}$)hydrocarbyl, ($C_1$-$C_{40}$)heteroalkyl, Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C═N—, $R^C$C(O)O—, $R^C$OC(O)—, $R^C$C(O)N(R)—, ($R^C$)$_2$NC(O)—, halogen atom, hydrogen atom, each of hydrocarbyl, heteroalkyl, Si($R^C$)$_3$, Ge($R^C$)$_3$, P($R^P$)$_2$, N($R^N$)$_2$, O$R^C$, S$R^C$, $R^C$S(O)—, $R^C$S(O)$_2$—, ($R^C$)$_2$C═N—, $R^C$C(O)O—, $R^C$OC(O)—, $R^C$C(O)N(R)—, ($R^C$)2NC(O)—, hydrocarbyl, and heteroalkyl groups independently is unsubstituted or substituted with one or more $R^s$ substituents, each $R^s$ independently is a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$S$_1$—, R$_3$Ge—, RO—, RS—, RS(O)—, RS(O)$_2$—, R$_2$P—, R$_2$N—, R$_2$C═N—, NC—, RC(O)O—, ROC(O)—, RC(O)N(R)—, or R$_2$NC (O)—, or two of the $R^s$ are taken together to form an unsubstituted ($C_1$-$C_{18}$alkylene, wherein each R independently is an unsubstituted ($C_1$-$C_{18}$)alkyl;

when $R^7$ is H, then $R^8$ is a ($C_1$-$C_{40}$)hydrocarbyl; ($C_1$-$C_{40}$) heteroalkyl; Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C═N—, $R^C$C (O)O—, $R^C$OC(O)—, $R^C$C(O)N(R)—, ($R^C$)$_2$NC(O)— or halogen atom; or when $R^8$ is H, then $R^7$ is a ($C_1$-$C_{40}$) hydrocarbyl; ($C_1$-$C_{40}$)heteroalkyl; Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C═N—, $R^C$C(O)O—, $R^C$C(O)—, $R^C$C(O)N(R)—, ($R^C$)$_2$NC(O)— or halogen atom;

optionally two or more R groups of the $R^1$-$R^{26}$ groups (for example, from $R^1$-$R^7$, $R^8$-$R^{14}$, $R^8$-$R^{11}$, $R^1$-$R^3$, $R^4$-$R^7$, $R^{15}$-$R^{20}$, $R^{21}$-$R^{26}$) can combine together into ring structures with such ring structures having from 3 to 50 atoms in the ring excluding any hydrogen atoms; and Y has the formula -T($R^d$)$_b$ and contains more than four non-hydrogen atoms, wherein T is, independently for each Y occurrence, selected from the group consisting of C, Si, Ge, N, O, S, P or a combination thereof and wherein T is substituted with $R^d$ substituents, b being an integer from 1 to 3, depending on the valency of T and $R^d$, each $R^d$ is a substituent and is selected from the group consisting of hydrogen, ($C_1$-$C_{40}$)hydrocarbyl; ($C_1$-$C_{40}$)heteroalkyl; Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)

$_2C=N-$, $R^cC(O)O-$, $R^cOC(O)-$, $R^cC(O)N(R)-$, $(R^c)_2NC(O)-$, halogen atoms, and any combination thereof.

In at least one embodiment, a bis(phenolate) transition metal complex is represented by formula (IIIa):

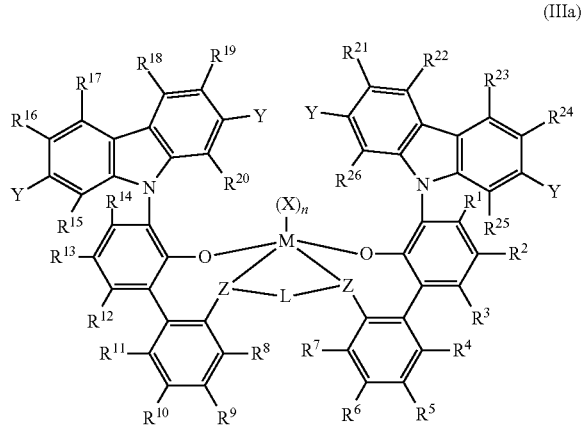

(IIIa)

where M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (IIIa) is, overall, neutral; and each Z independently is O, S, N($C_1$-$C_{40}$)hydrocarbyl, or P($C_1$-$C_{40}$)hydrocarbyl; and L is ($C_2$-$C_{40}$)hydrocarbyl or ($C_2$-$C_{40}$)heteroalkyl, wherein the ($C_2$-$C_{40}$)hydrocarbyl has a portion that comprises a 2-carbon atom to 10-carbon atom linker backbone linking the Z atoms in formula (IIIa) (to which L is bonded) and the ($C_2$-$C_{40}$)heteroalkyl has a portion that comprises a 2-atom to 10-atom linker backbone linking the Z atoms in formula (IIIa), wherein each of the 2 to 10 atoms of the 2-atom to 10-atom linker backbone of the ($C_2$-$C_{40}$)heteroalkyl independently is a carbon atom or heteroatom, wherein each heteroatom independently is O, S, S(O), S(O)$_2$, Si($R^c$)$_2$, P($R^P$), or N($R^N$), wherein independently each $R^c$ is ($C_1$-$C_{30}$)hydrocarbyl, each $R^P$ is ($C_1$-$C_{30}$)hydrocarbyl; and each $R^N$ is ($C_1$-$C_{30}$)hydrocarbyl; and $R^1$-$R^{26}$ are each independently selected from ($C_1$-$C_{40}$)hydrocarbyl, ($C_1$-$C_{40}$)heteroalkyl, Si($R^c$)$_3$, Ge($R^c$)$_3$, P($R^P$)$_2$, N($R^N$)$_2$, OR$^c$, SR$^C$, NO$_2$, CN, CF$_3$, $R^cS(O)-$, $R^cS(O)_2-$, $(R^C)_2C=N-$, $R^cC(O)O-$, $R^cOC(O)-$, $R^cC(O)N(R)-$, $(R^c)_2NC(O)-$, halogen atom, hydrogen atom, each of hydrocarbyl, heteroalkyl, Si($R^c$)$_3$, Ge($R^c$)$_3$, P($R^P$)$_2$, N($R^N$)$_2$, OR$^c$, SR$^C$, $R^cS(O)-$, $R^cS(O)_2-$, $(R^C)_2C=N-$, $R^cC(O)O-$, $R^cOC(O)-$, $R^cC(O)N(R)-$, $(R^c)_2NC(O)-$, hydrocarbyl, and heteroalkyl groups independently is unsubstituted or substituted with one or more $R^s$ substituents, each $R^s$ independently is a halogen atom, polyfluoro substitution, perfluoro substitution, unsubstituted ($C_1$-$C_{18}$)alkyl, $F_3C-$, $FCH_2O-$, $F_2HCO-$, $F_3CO-$, $R_3Si-$, $R_3Ge-$, RO—, RS—, RS(O)—, RS(O)$_2$—, $R_2P-$, $R_2N-$, $R_2C=N-$, NC—, RC(O)O—, ROC(O)—, RC(O)N(R)—, or $R_2NC(O)-$, or two of the $R^s$ are taken together to form an unsubstituted ($C_1$-$C_{18}$)alkylene, wherein each R independently is an unsubstituted ($C_1$-$C_{18}$)alkyl;

when $R^7$ is H, then $R^8$ is a ($C_1$-$C_{40}$)hydrocarbyl; ($C_1$-$C_{40}$)heteroalkyl; Si($R_c$)$_3$, Ge($R_c$)$_3$, P($R^P$)$_2$, N($R^N$)$_2$, OR$^c$, SR$^C$, NO$_2$, CN, CF$_3$, $R^cS(O)-$, $R^cS(O)_2-$, $(R^C)_2C=N-$, $R^cC(O)O-$, $R^cOC(O)-$, $R^cC(O)N(R)-$, $(R^c)_2NC(O)-$ or halogen atom; or when $R^8$ is H, then $R^7$ is a ($C_1$-$C_{40}$)hydrocarbyl; ($C_1$-$C_{40}$)heteroalkyl; Si($R^c$)$_3$, Ge($R^c$)$_3$, P($R^P$)$_2$, N($R^N$)$_2$, OR$^c$, SR$^C$, NO$_2$, CN, CF$_3$, $R^cS(O)-$, $R^cS(O)_2-$, $(R^C)_2C=N-$, $R^cC(O)O-$, $R^cOC(O)-$, $R^cC(O)N(R)-$, $(R^c)_2NC(O)-$ or halogen atom;

optionally two or more R groups of the $R^1$-$R^{26}$ groups (for example, from $R^1$-$R^7$, $R^8$-$R^{14}$, $R^8$-$R^{11}$, $R^1$-$R^3$, $R^4$-$R^7$, $R^{15}$-$R^{20}$, $R^{21}$-$R^{26}$) can combine together into ring structures with such ring structures having from 3 to 50 atoms in the ring excluding any hydrogen atoms; and Y has the formula -T($R^d$)$_b$ and contains more than four non-hydrogen atoms, wherein T is, independently for each Y occurrence, selected from the group consisting of C, Si, Ge, N, O, S, P or a combination thereof and wherein T is substituted with $R^d$ substituents, b being an integer from 1 to 3, depending on the valency of T and $R^d$, each $R^d$ is a substituent and is selected from the group consisting of hydrogen, ($C_1$-$C_{40}$)hydrocarbyl; ($C_1$-$C_{40}$)heteroalkyl; Si($R^c$)$_3$, Ge($R^c$)$_3$, P($R^P$)$_2$, N($R^N$)$_2$, OR$^c$, SR$^C$, NO$_2$, CN, CF$_3$, $R^cS(O)-$, $R^cS(O)_2-$, $(R^C)_2C=N-$, $R^cC(O)O-$, $R^cOC(O)-$, $R^cC(O)N(R)-$, $(R^c)_2NC(O)-$, halogen atoms, and any combination thereof.

In at least one embodiment, a bis(phenolate) transition metal complex is represented by formula (IV):

(IV)

wherein:
$T^2$ is a divalent bridging group of from 2 to 20 atoms not counting hydrogen; and
$Ar^2$ independently each occurrence is an arylene or an alkyl- or aryl-substituted arylene group of from 6 to 20 atoms not counting hydrogen; M is a Group 4 metal;
each X is independently an anionic, neutral or dianionic ligand group; x is a number from 1 to 5.

Catalysts of the present disclosure can include pyridyl amide complexes described in U.S. Pat. Nos. 6,900,321 and 8,592,615, the disclosures of which are incorporated herein by reference in their entirety.

In at least one embodiment, a pyridyl amide transition metal complex is represented by formula (V):

(V)

wherein:
$R^1$ is selected from alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl and combinations thereof;
T is a bridging group selected from $-CR^2R^3-$ and $-SiR^2R^3-$ with $R^2$ and $R^3$ independently selected from the group from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof;

J" is selected from heteroaryl and substituted heteroaryl;

each L is independently selected from halide, alkyl, substituted alky, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, hydroxyl, boryl, silyl, amino, amine, hydrido, allyl, diene, seleno, phosphino, phosphine, carboxylates, thio, 1,3-dionates, oxalates, carbonates, nitrates, sulphates, ethers, thioethers and combinations thereof or optionally two or more L groups are joined into a ring structure;

n is 1, 2, 3, 4, 5, or 6; and x is 1 or 2.

In at least one embodiment, a pyridyl amide transition metal complex is represented by formula (VI):

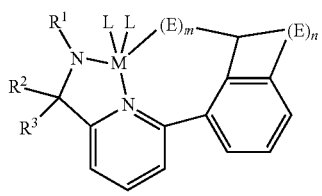

(VI)

wherein:
L is a leaving group;
M is a metal of any one of Groups 3 to 6 of the Periodic Table of the Elements being in a formal oxidation state of +2, +3, +4, +5, or +6;
E is a linking group that is a divalent bridging group of from 1 to 41 atoms other than hydrogen;
$R^1$, $R^2$, $R^3$ and $R^4$ are selected from substituted or unsubstituted alkyl, cycloalkyl, heteroalkyl, cycloheteroalkyl, aryl, heteroaryl;
x is an integer from 1 to 4;
and m and n are the integer 1.

Examples of a pyridyl amide transition metal complexes include:

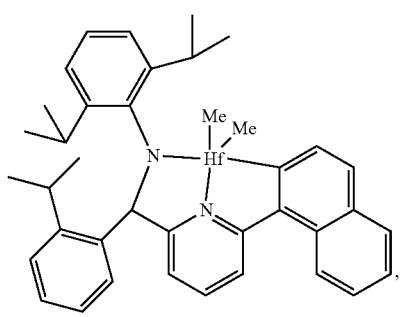

and
hafnium, [N-[2,6-bis(1-methylethyl)phenyl]-α-[2,4,6-tri(1-methylethyl)phenyl]-5-(2-ethylbenzofturan-3-yl-κ-$C^4$)-2-(N'-methyl)imidazol-2-yl)methanarninato(2-)-κN',κ$N^2$]di(methyl);

hafnium, [N-[2,6-bis(1-methylethyl)phenyl]-α-[2,4,6-tri(1-methylethyl)phenyl]-5-(carbazol-1-yl-κ-$C^2$)-2-(N'-methyl)imidazol-2-yl)methanaminato (2-)-KN', K$N^2$]di(methyl);

hafnium,[N-[2,6-bis(1-methylethyl)phenyl]-α-[2,4,6-tri(1-methylethyl)phenyl]-5-(2-ethylbenzofuran-3-yl-κ-$C^4$)-2-(N'-methyl)imidazol-2-yl)methanaminato(2-)-κN',κ$N^2$]di(n-butyl);

hafnium,[N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κN', κ$N^2$]di(n-butyl);

hafnium,[N-[2,6-bis(1-methylethyl)phenyl]-α-[2,4,6-tri(1-methylethyl)phenyl]-5-(carbazol-1-yl-κ-$C^2$)-2-(N'-methyl)imidazol-2-yl)methanaminato (2-)-κN*,κ$N^2$]di(n-butyl); and hafnium,[N-[2,6-bis(1-methylethyl)phenyl]-α-[2,6-di(1-methylethyl)phenyl]-5-(carbazol-1-yl-κ-$C^2$)-2-(N'-methyl)imidazol-2-yl)methanaminato(2-)-κN',κ$N^2$]di(methyl).

Catalysts of the present disclosure can include phenoxyimine complexes described in EP0874005, the disclosure of which is incorporated herein by reference in its entirety.

In at least one embodiment, a phenoxyimine transition metal complex is represented by formula (VII):

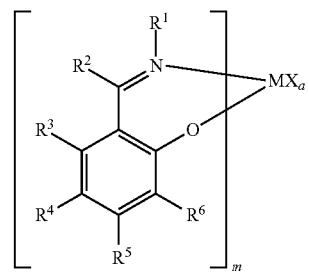

(VII)

wherein:
M is a transition metal atom of Groups 3, 4, 5, 6, 7, 8, 9, 10 and 11 of the periodic table,
wherein the transition metal atom of Group 5 is selected from Nb, Ta, and V;
m is an integer of 2 to 6;
$R^1$ to $R^6$ are independently hydrogen, halogen, hydrocarbyl, heterocyclyl, oxygen-containing group, nitrogen-containing group, boron-containing group, sulfur-containing group, phosphorus-containing group, silicon-containing group, germanium-containing group or a tin-containing group, and two or more of $R^1$ to $R^6$ may be bonded to each other to form a ring;
n is a number satisfying a valence of M; and
X is hydrogen, halogen, hydrocarbon, oxygen-containing group, sulfur-containing group, nitrogen-containing group, boron-containing group, aluminum-containing group, phosphorus-containing group, halogen-containing group, heterocyclic compound residue, silicon-containing group, germanium-containing group or tin-containing group, and when n is 2 or greater, each X may be the same or different and may be bonded to each other to form a ring.

Catalysts of the present disclosure can include cyclopentadienyl-amidinate complexes described in U.S. Pat. No. 8,188,200, the disclosure of which is incorporated herein by reference in its entirety.

In at least one embodiment, a cyclopentadienyl-amidinate transition metal complex is represented by formula (VIII):

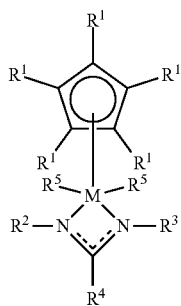

(VIII)

wherein:
M is Ti, Zr, Hf, V, Nb or Ta;
each $R^1$ is independently hydrogen or alkyl or two adjacent $R^1$ groups form an aromatic ring;
each $R^2$, $R^3$ and $R^4$ is independently substituted or unsubstituted alkyl, cycloalkyl, —Si(alkyl)$_3$, —Si(aryl)$_3$, phenyl, alkylphenyl; and
each $R^5$ is independently halo, alkyl, cycloalkyl, aryl, or arylalkyl.

Catalysts of the present disclosure can include pyridine bis(imine) complexes described in U.S. Pat. No. 7,087,686, the disclosures of which are incorporated herein by reference in their entirety.

In at least one embodiment, the pyridine bis(imine) complex is represented by formula (IX):

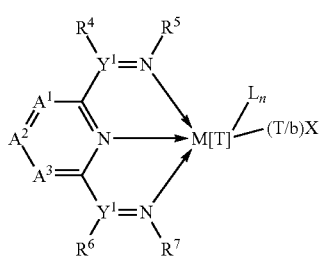

(IX)

wherein M[T] is Ti[II], Ti[III], Ti[IV], Zr[II], Zr[III], Zr[IV], Hf[II], Hf[III], Hf[IV], V[II], V[III], V[IV], Nb[II], Nb[III], Nb[IV], Nb[V], Ta[II], Ta[III], Ta[IV], Cr[II], Cr[III], Mn[II], Mn[III], Mn[IV], Fe[II], Fe[III], Ru[II], Ru[III], Ru[IV], Co[H], Co[III], Rh[II], Rh[III], Ni[II], Pd[II];
X represents an atom or group covalently or ionically bonded to the transition metal M;
T is the oxidation state of the transition metal M and b is the valency of the atom or group X;
$Y^1$ is C or P(Rc),
$A^1$ to $A^3$ are each independently N or P or CR, with the proviso that at least one is CR; and
R, Rc, $R^4$, $R^5$, $R^6$ and $R^7$ are each independently selected from the group hydrogen, halogen, hydrocarbyl, substituted hydrocarbyl, heterohydrocarbyl, substituted heterohydrocarbyl and
SiR'3 where each R' is independently selected from the group consisting of hydrogen, halogen, hydrocarbyl, substituted hydrocarbyl, heterohydrocarbyl and substituted heterohydrocarbyl.

Reversible Chain Transfer Agents

In embodiments of the first stage of processes of the present disclosure, the term "reversible chain transfer agent" (RCTA) is defined as a group 12 or 13 organometallic compound, or mixture of such compounds, which is capable of reversibly transferring/receiving an alkyl group, including polymeryl groups, between the group 12 or 13 metal center and the activated transition metal polymerization catalyst. The chain transfer process provides transfer of alkyl or polymeryl groups between the group 12 or 13 metal and the metal center of the activated polymerization catalyst. The term "reversible chain transfer agent" does not include chain transfer agents that irreversibly react with a growing polymer chain to form a dead chain that does not participate in any further growth. Based on this distinction, hydrogen and silanes are not reversible chain transfer agents. Reversible chain transfer agents (RCTA) useful herein include triakyl aluminum compounds and dialkyl zinc compounds (where the alkyl is preferably a $C_1$ to $C_{40}$ alkyl group, preferably a $C_2$ to $C_{20}$ alkyl group, preferably a $C_2$ to $C_{12}$ alkyl group, preferably a $C_2$ to $C_8$ group, such as methyl, ethyl, propyl (including isopropyl and n-propyl), butyl (including n-butyl, sec-butyl, and iso-butyl) pentyl, hexyl (including n-hexyl and iso-hexyl), heptyl (including n-heptyl and iso-heptyl), and octyl (including n-octyl and iso-octyl), and isomers an analogs thereof). Preferably the alkyl groups are unbranched alkyl groups, such as ethyl, n-propyl, n-hexyl, n-octyl, n-decyl, and n-dodecyl. Preferred agents are trialkyl aluminum compounds having unbranched alkyl groups that contain from 3 to 12 carbons each; also preferred are dialkyl zinc compounds having unbranched alkyl groups that contain from 1 to 12 carbons each. Specific examples of preferred agents include: tri(n-hexyl)aluminum, tri(n-octyl) aluminum (TNOAL or TNOA), diethylzinc, di(n-propyl) zinc, and di(n-octyl)zinc. Particularly preferred agents for the use in the present invention are diethyl zinc and tri(n-octyl)aluminum.

In a preferred embodiment, one or more triakyl aluminum compounds and one or more dialkyl zinc compounds (where the alkyl is preferably a $C_1$ to $C_{40}$ alkyl group, preferably a $C_2$ to $C_{20}$ alkyl group, preferably a $C_2$ to $C_{12}$ alkyl group, preferably a $C_2$ to $C_8$ group, such as methyl, ethyl, propyl (including isopropyl and n-propyl), butyl (including n-butyl, sec-butyl and iso-butyl) pentyl, hexyl, heptyl, octyl, and isomers or analogs thereof) are used as the RCTA. Preferred combinations include TIBAL, and/or TNOAL with Et$_2$Zn, preferably TIBAL and Et$_2$Zn, or TNOAL and Et$_2$Zn. Preferably, the molar ratio of dialkyl zinc to trialkyl aluminum compounds (i.e. Zn/Al) present in the reaction is from 0.5 to 1,000, such as from 1 to 100, such as from 10 to 50. In at least one embodiment, the molar ratio of trialkylaluminum to dialkylzinc compounds (i.e. Al/Zn) is 0.5 or more, 1 or more, 10 or more, 50 or more, 100 or more, 1000 or more.

In at least one embodiment, trialkylaluminum is the only RCTA used.

In at least one embodiment dialkylzinc is the only RCTA used.

The reversible chain transfer agent(s) are typically present in the reaction at a molar ratio of metal of the reversible chain transfer agent to transition metal (from the transition metal complex) of 5 or more, preferably from 10 to 10000, preferably from 20 to 4000, preferably from 100 to 4000, preferably from 200 to 3000, preferably from 50 to 2000.

Without being bound by theory, addition of a reversible chain transfer agent to a reactor during the first stage of processes of the present disclosure provides a stabilized metal-capped first polymer (metal of the reversible chain transfer agent), allowing the first polymer to remain as a "living" polymer, e.g. capable of reacting with a coupling agent in the presence of a catalyst and activator in the second stage of processes of the present disclosure.

Coupling Agents

In embodiments of the second stage of processes of the present disclosure, the term "coupling agent" includes a compound that in the presence of an olefin polymerization catalyst couples two or more polymers by covalent bonding to form a larger polymer and the coupling agent is incorporated into the backbone of the larger polymer.

In at least one embodiment, a coupling agent is a dual-reactive diene. A dual-reactive diene can be conjugated or non-conjugated. Preferably, a dual-reactive diene is non-conjugated and is an α,ω-diene. Preferably, a dual-reactive diene is an α,ω-diene containing 5 to 30 carbons, preferably 6-20 carbons, more preferably 8-16. An α,ω-diene has each end of the molecule terminating in a vinyl group, such as 1,7-octadiene or 1,9-decadiene. Other exemplary dienes include 1,3-butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-icosadiene, 1,20-heneicosadiene, 1,21-docosadiene, 1,22-tricosadiene, 1,23-tetracosadiene, 1,24-pentacosadiene, 1,25-hexacosadiene, 1,26-heptacosadiene, 1,27-octacosadiene, 1,28-nonacosadiene, 1,29-triacontadiene, and low molecular weight polybutadienes (Mw less than 1000 g/mol). Dual-reactive dienes that feature cyclic groups include cyclopentadiene, norbornadiene, 5-vinyl-2-norbornene, divinylbenzene, diallylbenzene, 1-vinyl-4-allylbenzene, 1-vinyl-3-buten-1-ylbeznene, bis(4-methylphenyl)di-2-propenylsilane, 1-methyl-4-(methyldi-2-propen-1-ylsilyl)benzene, 1,1-di-2-propen-1-ylsilacyclopentane, 1,1'-(di-2-propen-1-ylsilylene)bisbenzene, dicyclopentadiene or higher ring containing diolefins with or without substituents at various ring positions. Coupling agents can also include higher linear or cyclic polyenes, for example, 1,5,10-undecatriene, 1,4,9-decatriene, 1,5,9-decatriene, 1,4,8-nonatriene, 1,3-diethenyl-1,2,3,3a,4,6a-hexahydropentalene, 4,5-diethenylcyclohexene, 5,6-diethenylcyclooctene, trivinylbenzene, 1,2-ethanediylbis[tri-2-propenyl]silane, triallylsilylbenzne, triallylmethylsilane, tetraallylsilane, bis(1-methylethyl)di-2-propen-1-ylsilane, dimethyldiallylsilane, and the like.

Particularly preferred coupling agents include 1,7-octadiene, 1,8-nonadiene, and 1,9-decadiene.

The coupling agent(s) are typically present in the reaction at a molar ratio of coupling agent to transition metal (from the transition metal complex) of 5 or more, preferably from 10 to 2000, preferably from 20 to 1000, preferably from 25 to 800, preferably from 50 to 700, preferably from 100 to 600.

Without being bound by theory, contacting the first polymer with a coupling agent in a second stage provides controllable crosslinking via head-to-head couplings between first polymers to form a long-chain branched polymer. Unlike olefin polymerization processes that use diene crosslinking agents in a single reaction stage, the processes of the present disclosure have reduced or eliminated gel-formation in a reactor, providing low gel content (e.g. less than 20 wt %, gel and or mass recovery of polymer products of 50% by weight or greater based on the total weight of polymer product of a polymerization, as determined by gel permeation chromatography.

In at least one embodiment, mass recovery of polymer products of the present disclosure is 60% or greater by weight, such as 70% or greater by weight, such as 80% or greater by weight, such as 90% or greater by weight, such as 95% or greater by weight, such as about 100% by weight based on the total weight of polymer product of a polymerization, as determined by gel permeation chromatography. Observed mass recovery percentage determined by GPC may be affected a modest amount by the presence of vinyl or other unsaturated groups and the presence of extremely high MW polymer chains. Therefore, mass recovery percentage data of the present disclosure encompasses such high MW polymer content and unsaturation content present in a polymer sample. Mass recovery percentage in combination with other metrics, such as melt index data and observable gel formation in a reactor, provide valuable data indicative of gel formation or lack thereof of a polymerization process.

Polymers formed during the first stage of processes of the present disclosure can be linear (e.g., g'vis of 0.9 or greater). However, after treatment with a coupling agent during the second stage, polymers of the present disclosure can have g'vis values of less than 0.9, such as from about 0.35 to about 0.85, alternately 0.4 to 0.8, alternately 0.45 to 0.75 as determined by GPC-3D. Furthermore, in embodiments where the coupling agent is an αω-diene, polymers of the present disclosure can have a vinyl unsaturation content of 0.7 or more, alternately 0.8 or more, alternately 0.84 or more vinyls/1000 carbons, as determined by $^1$H NMR, which provides reactive end groups of the polymers for functionalization.

Activators

After the complexes have been synthesized, catalyst systems may be formed by combining them with activators in any suitable manner. The catalyst systems may also be added to or generated in solution polymerization or bulk polymerization (in the monomer). The catalyst system can include a complex and an activator such as alumoxane or a non-coordinating anion. Activation may be performed using alumoxane solution including methyl alumoxane, referred to as MAO, as well as modified MAO, referred to herein as MMAO, containing some higher (C3+, preferably C4+) alkyl groups which improves the solubility. Particularly useful MAO can be purchased from Albemarle, typically in a 10 wt % solution in toluene. Preferable alumoxanes include methyl alumoxane, modified methyl alumoxane, ethyl alumoxane, and iso-butyl alumoxane.

When an alumoxane or modified alumoxane is used, the complex-to-activator molar ratio is from 1:3000 to 10:1; such as from 1:2000 to 10:1; such as from 1:1000 to 10:1; such as from 1:500 to 1:1; such as from 1:300 to 1:1; such as from 1:200 to 1:1; such as from 1:100 to 1:1; such as from 1:50 to 1:1; such as from 1:10 to 1:1. When the activator is an alumoxane (modified or unmodified), the amount of activator can be at a 5000-fold molar excess over the catalyst precursor (per metal catalytic site).

Activation may also be performed using activators comprising non-coordinating anions, referred to as NCA's, of the type described in EP 277 003 A1 and EP 277 004 A1. NCA may be added in the form of an ion pair using, for example, [DMAH]$^+$ [NCA]$^-$ in which the N,N-dimethylanilinium (DMAH) cation reacts with a basic leaving group on the transition metal complex to form a transition metal complex cation and [NCA]$^-$. The cation in the precursor may, alternatively, be trityl (triphenylmethyl, (Ph)$_3$C+). Alternatively, the transition metal complex may be reacted with a neutral NCA precursor, such as B(C$_6$F$_5$)$_3$, which abstracts an anionic group from the complex to form an activated species. Useful activators include N,N-dimethylanilinium tetrakis(pentafluorophenyl)borate (i.e.,

[PhNMe$_2$H]B(C$_6$F$_5$)$_4$) and N,N-dimethylanilinium tetrakis (heptafluoronaphthyl)borate, where Ph is phenyl, and Me is methyl.

Additionally preferred activators useful herein include those described in U.S. Pat. No. 7,247,687 at column 169, line 50 to column 174, line 43, particularly column 172, line 24 to column 173, line 53.

In an embodiment of the present disclosure, the non-coordinating anion activator is represented by formula (1):

wherein Z is (L-H) or a reducible Lewis acid; L is a neutral Lewis base; H is hydrogen, and (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the catalyst precursor, resulting in a cationic transition metal species, or the activating cation (L-H)$_d^+$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar$_3$C$^+$), where Ar is aryl or aryl substituted with a heteroatom, or a C$_1$ to C$_{40}$ hydrocarbyl, the reducible Lewis acid may be represented by the formula: (Ph$_3$C$^+$), where Ph is phenyl or phenyl substituted with a heteroatom, and/or a C$_1$ to C$_{40}$ hydrocarbyl. In an embodiment, the reducible Lewis acid is triphenyl carbenium.

Embodiments of the anion component A$^{d-}$ include those having the formula [M$^{k+}$Q$_n$]$^{d-}$ wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable A$^{d-}$ components also include diboron compounds as disclosed in U.S. Pat. No. 5,447,895, which is fully incorporated herein by reference.

In an embodiment in any of the NCA's represented by Formula 1 described above, the anion component A$^{d-}$ is represented by the formula [M*$^{k*}$+Q*$_{n*}$*]$^{d*-}$ wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

An NCA activator of the present disclosure can be represented by Formula (2):

R$_n$M**(ArNHal)$_{4-n}$ (2)

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically, the NCA comprising an anion of Formula (2) also comprises a suitable cation that is essentially non-interfering with the ionic catalyst complexes formed with the transition metal compounds, or the cation is Z$_d^+$ as described above.

In an embodiment of an NCA having an anion represented by Formula (2), R is selected from C$_1$ to C$_{30}$ hydrocarbyl radicals. In an embodiment, C$_1$ to C$_{30}$ hydrocarbyl radicals can be substituted with one or more C$_1$ to C$_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C$_4$ to C$_{20}$ hydrocarbyl radicals; —SR$^a$, —NR$^a{}_2$, and —PR$^a{}_2$, where each R$^a$ is independently a monovalent C$_4$ to C$_{20}$ hydrocarbyl radical comprising a molecular volume greater than or equal to the molecular volume of an isopropyl substitution or a C$_4$ to C$_{20}$ hydrocarbyl substituted organometalloid having a molecular volume greater than or equal to the molecular volume of an isopropyl substitution.

In an embodiment of an NCA having an anion represented by Formula (2), the NCA also comprises a cation comprising a reducible Lewis acid represented by the formula: (Ar$_3$C$^+$), where Ar is aryl or aryl substituted with a heteroatom, and/or a C$_1$ to C$_{40}$ hydrocarbyl, or the reducible Lewis acid represented by the formula: (Ph$_3$C$^+$), where Ph is phenyl or phenyl substituted with one or more heteroatoms, and/or C$_1$ to C$_{40}$ hydrocarbyls.

In an embodiment of an NCA having an anion represented by Formula (2), the NCA may also comprise a cation represented by the formula, (L-H)$_d^+$, wherein L is an neutral Lewis base; H is hydrogen; (L-H) is a Bronsted acid; and d is 1, 2, or 3, or (L-H)$_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In at least one embodiment, an activator comprises a salt of a cationic oxidizing agent and a noncoordinating, compatible anion represented by Formula (3):

wherein OX$^{e+}$ is a cationic oxidizing agent having a charge of e+; e is 1, 2 or 3; d is 1, 2 or 3; and A$^{d-}$ is a non-coordinating anion having the charge of d− (as described above). Examples of cationic oxidizing agents include: ferrocenium, hydrocarbyl-substituted ferrocenium, Ag$^+$, or Pb$^{2+}$. Suitable embodiments of A$^{d-}$ include tetrakis (pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, di(hydrogenated tallow) methyl ammonium tetrakis(perfluorophenyl) borate, di(hydrogenated tallow) methyl ammonium tetrakis(perfluoronaphthyl) borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4$$^-$]; methyl dioctadecylammonium tetrakis(pentafluorophenyl)borate, and methyl di(hydrogenated tallow)ammonium tetrakis(pentafluorophenyl)borate.

In at least one embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In at least one embodiment, two NCA activators are used in the polymerization and/or crosslinking and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment of the present disclosure, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator, all of which are incorporated by reference herein).

In at least one embodiment, an NCA (such as an ionic or neutral stoichiometric activator) is used, and the complex-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Scavengers

In some embodiments, when using the complexes described herein, the catalyst system may additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary scavengers include triethyl aluminum, triethyl borane, tri-iso-butyl aluminum, methyl alumoxane, iso-butyl alumoxane, tri-n-octyl aluminum, bis(diisobutylaluminum)oxide, modified methylalumoxane. (Useful modified methylalumoxane includes cocatalyst type 3A (commercially available from Akzo Chemicals, Inc. under the trade name Modified Methylalumoxane type 3A) and those described in U.S. Pat. No. 5,041,584.) Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=C$_6$F$_5$). Some scavengers, such as trialkylaluminums containing unbranched alkyl substituents, may also function as reversible chain-transfer agents with certain catalyst systems.

Preferred scavengers include bis(diisobutylaluminum)oxide, modified methylalumoxane, tri(isobutyl)aluminum, tri(n-hexyl)aluminum, and tri(n-octyl)aluminum.

Polymers

The present disclosure provides compositions of matter that can be produced by the methods of the present disclosure.

Polymers of the present disclosure can have a high degree of vinyl unsaturation. In at least one embodiment, a polymer has a vinyl unsaturation content of 0.1 or more vinyls/1000 carbons, preferably 0.4 or more, preferably 0.6 or more, preferably 0.8 or more, preferably 1.0 or more, alternatively from 0.5 to 5, such as from 0.6 to 3, such as from 0.8 to 1. Vinyl unsaturation can provide reactive groups of polymers for functionalization.

Unsaturation (internal and terminal) in a polymer can be determined by $^1$H NMR with reference to *Macromolecules* 2014, 47, 3782 and *Macromolecules* 2005, 38, 6988, but in event of conflict *Macromolecules* 2014, 47, 3782 shall control. Peak assignments are determined referencing the solvent of tetrachloroethane-1,2 d2 at 5.98 ppm. Specifically, percent internal unsaturation is determined by adding Vy1+Vy2+trisubstituted olefins then dividing by total unsaturation.

In at least one embodiment, after the second stage of a process of the present disclosure, the polymer produced is an ethylene copolymer having a comonomer content of from 99.9 wt % to 30 wt %, such as from 99 wt % to 40 wt %, such as from 95 wt % to 40 wt %, such as from 95 wt % to 60 wt %, such as from 95 wt % to 70 wt % based on the weight of the polymer, where the balance of the polymer comprises ethylene. Alternatively, a polymer is an ethylene copolymer having a comonomer content of from 1 wt % to 30 wt %, such as from 2 wt % to 25 wt %, such as from 3 wt % to 20 wt %, such as from 4 wt % to 15 wt %, such as from 5 wt % to 10 wt % based on the weight of the polymer, where the balance of the polymer comprises ethylene. In at least one embodiment, the comonomer is propylene, 1-hexene, and/or 1-octene.

A polymer of the present disclosure may have an ethylene content of from 1 (percent by weight of the polymer) wt % to 100 wt %, such as from 2 wt % to 99 wt %, such as from 30 wt % to 98 wt %, such as from 40 wt % to 97 wt %, such as from 50 wt % to 96 wt %, based on the weight of the polymer. The balance of the polymer comprises one or more comonomers. Alternately, the A polymer of the present disclosure may have an ethylene content of from 2 wt % to 20 wt %.

In at least one embodiment, after the second stage of a process of the present disclosure, a polymer has a diene content of from 0.1 wt % to 10 wt %, such as from 0.1 wt % to 5 wt %, such as from 0.1 wt % to 2 wt %, such as from 0.1 wt % to 1 wt %, such as from 0.1 wt % to 0.5 wt %, based on the weight of the polymer. The balance of the polymer comprises ethylene and an optional comonomer.

A polymer of the present disclosure may have an ethylene content of from 1 (percent by weight of the polymer) wt % to 100 wt %, such as from 2 wt % to 99 wt %, such as from 30 wt % to 98 wt %, such as from 40 wt % to 97 wt %, such as from 50 wt % to 96 wt %, based on the weight of the polymer. The balance of the polymer comprises one or more comonomers.

In a preferred embodiment, the polymer produced herein is homopolyethylene.

In a preferred embodiment, the polymer produced herein has an ethylene content of from 50 to 98.9 mol % (alternately 60 to 95 mol %, alternately 70 to 90 mol %), a C3 to C40 comonomer (preferably propylene) content of 1 to 49.9 mol % (alternately 5 to 40, alternately 10 to 30 mol %) and diene content of 0.1 to 10 mol % (alternately 0.5 to 6 mol %, alternately 1 to 3 mol %).

A polymer of the present disclosure can have a weight average molecular weight (Mw), as determined using light scattering detector, of 5,000,000 g/mol or less, a number average molecular weight (Mn), as determined using differential refractive index detector, of 3,000,000 g/mol or less, a z-average molecular weight (Mz), as determined using a light scattering detector, of 10,000,000 g/mol or less, and a $g'_{vis}$ average value of 0.95 or less (preferably 0.80 or less), all of which may be determined by gel permeation chromatography with three detectors (GPC-3D). A polymer of the present disclosure may have an Mn of from 5,000 to 500,000 g/mol, such as from 10,000 to 300,000 g/mol, such as from 20,000 to 200,000 g/mol, such as from 20,000 to 100,000 g/mol, such as from 13,000 to 80,000 g/mol. A polymer of the present disclosure may have an Mw of from 20,000 to 1,000,000 g/mol, such as from 20,000 to 500,000 g/mol, such as from 30,000 to 450,000 g/mol, such as from 60,000 to 500,000 g/mol, such as from 100,000 to 600,000 g/mol. A polymer of the present disclosure may have an Mz of from 50,000 to 10,000,000 g/mol, such as from 50,000 to 6,000,000 g/mol, such as from 100,000 to 6,000,000 g/mol, such as from 100,000 to 2,000,000 g/mol, such as 50,000 to 1,000,000 g/mol, such as from 100,000 to 1,000,000 g/mol.

The molecular weight distribution Mw/Mn of a polymer of the present disclosure may be from 1.6 to 60. For example, a polymer may have an MWD with an upper limit of 60, 40, or 20, or 10, or 9, or 7, or 5, and a lower limit of 1.6, or 1.7, or 2, or 3. In one or more embodiments, the MWD of a polymer is from 1.6 to 60, such as from 1.6 to 30, such as from 1.6 to 20, such as from 1.6 to 11, such as from 2 to 10.

A polymer of the present disclosure may have a $g'_{vis}$ average value of 0.95 or less, such as 0.8 or less, or 0.6 or less. Polymers of the present disclosure can have g'vis values of 0.9 or less, such as from about 0.3 to about 0.9, such as from about 0.4 to about 0.8, such as from about 0.4 to about 0.6.

A polymer of the present disclosure may have a density of from 0.83 g/cm³ to 0.97 g/cm³, or from 0.85 g/cm³ to 0.94 g/cm³, or from 0.85 g/cm³ to 0.90 g/cm³, at room temperature as measured per ASTM D-1505 test method.

A polymer of the present disclosure may have a melt index (MI, g/10 min, 190° C., 2.16 kg weight) of 100 g/10 min or less, as determined in accordance with ASTM D1238 at 190° C. Preferably the MI is 20 g/10 min or less, is 5 g/10 min or less, 3 g/10 min or less, 2 g/10 min or less, 1 g/10 min or less, 0.2 g/10 min or less, 0.1 g/10 min or less, 0.05 g/10 min or less.

A polymer of the present disclosure may have a high load melt index (HLMI, g/10 min, 190° C., 21.6 kg weight) of 1000 g/10 min or less, as determined in accordance with ASTM D1238 at 190° C. Preferably the HLMI is 500 g/10 min or less, 100 g/10 min or less, is 50 g/10 min or less, 10 g/10 min or less, 5 g/10 min or less, 1 g/10 min or less. Preferably the HLMI is between 1 and 500 g/10 minutes, is between 5 and 300 g/10 minutes, is between 5 and 50 g/10 minutes.

A polymer of the present disclosure may have a melt index ratio (defined as HLMI/MI) greater than 15, greater than 20, greater than 50, greater than 100. Preferably the melt index ratio is between 15 and 400, is between 30 and 200, is between 50 and 150, is between 70 and 115.

A polymer of the present disclosure may have a Mooney viscosity ML (1+4) at 125° C., as determined according to ASTM D1646, of greater than 2, of greater than 5, of greater than 10, of greater than 15, of greater than 20, of greater than 40.

A polymer of the present disclosure may have a melt flow rate (MFR, g/10 min, 230° C., 2.16 kg weight) of 100 g/10 min or less, as determined in accordance with ASTM D1238 at 230° C. Preferably, the MFR is 20 g/10 min or less, such as 5 g/10 min or less, such as 3 g/10 min or less, such as 2 g/10 min or less, such as 1 g/10 min or less.

A polymer of the present disclosure may have a high load melt flow rate (MFR HL, g/10 min, 230° C., 21.6 kg weight) of 1000 g/10 min or less, as determined in accordance with ASTM D1238 at 230° C. Preferably the MFR HL is 500 g/10 min or less, 100 g/10 min or less, is 50 g/10 min or less, 10 g/10 min or less, 5 g/10 min or less, 1 g/10 min or less. Preferably, the HLMI is from about 1 g/10 minutes to about 500 g/10 minutes, such as from about 5 to about 300 g/10 minutes, such as from about 50 g/10 minutes to about 80 g/10 minutes.

A polymer of the present disclosure may have a melt flow rate ratio (defined as (MFR HL)/MFR) greater than 15, such as greater than 20, such as greater than 50, such as greater than 100. Preferably the melt flow rate ratio is from about 15 to about 400, such as from about 30 and about 200, such as from about 50 to about 150, such as from about 30 to about 50.

The crystallinity of a polymer of the present disclosure may be expressed interms of percentage of crystallinity (i.e., % crystallinity). A polymer may have a % crystallinity of from 0 to 90%. In some embodiments, a polymer may have a % crystallinity of from 0.01% to 80%, such as from 0.05% to 3%, such as from 0.1% to 2.5%. In one or more embodiments, a polymer may have crystallinity of 3% or less, such as from 0.25% to 3%, such as from 0.5% to 2.5%, such as from 0.75% to 2%. In one or more embodiments, a polymer may have a crystallinity of greater than 5%, such as from 5 to 10%, such as from 5 to 20%, such as from 10 to 40%, such as from 40 to 60%, such as from 60 to 80%. (The degree of crystallinity is determined by dividing heat of fusion measured (as determined according to the DSC procedure described herein) with the heat of fusion for 100% crystalline polyethylene which has the value of 293 J/g (B. Wunderlich, Thermal Analysis, Academic Press, 1990, pp. 417-431.)

A polymer of the present disclosure may have a single broad melting transition. However, a polymer of the present disclosure may show secondary melting peaks adjacent to the principal peak, but for purposes herein, such secondary melting peaks are considered together as a single melting point, with the highest of these peaks (relative to baseline) being considered as the melting point of the polymer.

A polymer of the present disclosure may have a melting point, as measured by the DSC procedure described herein, of equal to or less than 140° C., or less than 120° C., or less than 100° C., or less than 90° C., or less than 80° C., or less than 60° C. In one or more embodiments, the polymer has a melting point of from 10° C. to 80° C., such as from 15° C. to 75° C., such as from 20° C. to 70° C.

A polymer of the present disclosure may have a glass transition temperature (Tg), as determined by the DSC procedure described herein, from −70° C. to −40° C., −40° C. to −20° C., −25° C. to −2° C., such as from −15° C. to −5° C., such as from −14° C. to −10° C., such as from −13.5° C. to −10.1° C.

Peak melting point, $T_m$, (also referred to as melting point), peak crystallization temperature, $T_c$, (also referred to as crystallization temperature), glass transition temperature ($T_g$), heat of fusion ($\Delta H_f$ or $H_f$), and percent crystallinity are determined using the following DSC procedure according to ASTM D3418-03. Differential scanning calorimetric (DSC) data can be obtained using a TA Instruments model Q200 machine. Samples weighing approximately 5-10 mg are sealed in an aluminum hermetic sample pan. The DSC data are recorded by first gradually heating the sample to 200° C. at a rate of 10° C./minute. The sample is kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided; however, that a value of 293 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures are reported. The heat of fusion for each endothermic peak is calculated individually. The percent crystallinity is calculated using the sum of heat of fusions from all endothermic peaks. Some polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample is aged (typically by holding it at ambient temperature for a period of 2 days) or annealed to maximize the level of crystallinity.

Percent gel(s) (% gel): The gel test measures the percent of un-dissolvable material in a polymer sample. These tests are performed and measured according to ASTM D2765, Test Method for Determination of Gel Content and Swell Ratio of Crosslinked Ethylene Plastics, Test method A, xylenes. Preferably, after the second stage of the process of the present invention, the polymer has a gel content of less than 20 wt %, preferably less than 15 wt %, preferably less than 10 wt %, preferably less than 5 wt %, preferably less than 3 wt %, preferably less than 2 wt %, preferably less than 1 wt %, preferably less than 0.5 wt %, preferably 0 wt %, based on the weight of the polymer.

In a preferred embodiment the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Gel Permeation Chromatography with Three Detectors (GPC-3D)

$M_w$, $M_n$ and $M_w/M_n$ are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 micron Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and $\lambda$=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the following equation:

$$\eta_S = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{k M_v^\alpha}$$

$M_v$ is the viscosity-average molecular weight based on molecular weights determined by LS analysis, while $\alpha$ and K are as calculated in the published in literature (T. Sun, P. Brant, R. R. Chance, and W. W. Graessley, Macromolecules, Volume 34, Number 19, pp. 6812-6820, (2001)), except that for purposes of this invention and claims thereto, $\alpha$=0.695+ (0.01*(wt. fraction propylene)) and K=0.000579− (0.0003502*(wt. fraction propylene)) for ethylene-propylene copolymers and ethylene-propylene-diene terpolymers, $\alpha$=0.695 and K=0.000579 for ethylene polymers, $\alpha$=0.705 and K=0.0002288 for propylene polymers, $\alpha$=0.695 and K=0.000181 for butene polymers, $\alpha$ is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1-0.0075*w2b) for ethylene-hexene copolymer where w2b is a bulk weight percent of hexene comonomer, and $\alpha$ is 0.695 and K is 0.000579*(1-0.0077*w2b) for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted.

All molecular weights are weight average unless otherwise noted. All molecular weights are reported in g/mol unless otherwise noted.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+ 30.045$X^2$, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

Dynamic shear melt rheological data can be measured with an Advanced Rheometrics Expansion System (ARES) using parallel plates (diameter=25 mm) in a dynamic mode under nitrogen atmosphere. The rheometer can be thermally stable at 190° C. for at least 30 minutes before inserting a compression-molded sample of resin onto the parallel plates. To determine the samples, viscoelastic behavior, frequency sweeps in the range from 0.01 to 385 rad/s can be carried out at a temperature of 190° C. under constant strain. Depending on the molecular weight and temperature, strains of 10% and 15% can be used and linearity of the response is verified. A nitrogen stream can be circulated through the sample oven to minimize chain extension or cross-linking during the experiments. All the samples can be compression molded at 190° C. and no stabilizers added. A sinusoidal shear is applied to the material. If the strain amplitude is sufficiently small then the material behaves linearly. It can be shown that the resulting steady-state stress will also oscillate sinusoidally at the same frequency but will be shifted by a phase angle $\delta$ with respect to the strain wave. The stress leads the strain by $\delta$. For purely elastic materials $\delta$=0° (stress is in phase with strain) and for purely viscous materials, $\delta$=90° (stress leads the strain by 90° although the stress is in phase with the strain rate). For viscoelastic materials, 0<$\delta$<90. The shear thinning slope (STS) was measured using plots of the logarithm (base ten) of the dynamic viscosity versus logarithm (base ten) of the frequency. The slope is the difference in the log (dynamic viscosity) at a frequency of 100 s$^{-1}$ and the log (dynamic viscosity) at a frequency of 0.01 s$^{-1}$ divided by 4. Dynamic viscosity is also referred to as complex viscosity or dynamic shear viscosity.

The dynamic shear viscosity ($\eta$*) versus frequency ($\omega$) curves can be fitted using the Cross model (see, for example, C. W. Macosco, RHEOLOGY: PRINCIPLES, MEASUREMENTS, AND APPLICATIONS, Wiley-VCH, 1994):

$\eta^* = \eta_0/[1+(\lambda\omega)^{1-n}]$

The three parameters in this model are: $\eta_0$, the zero-shear viscosity; $\lambda$, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1−n on a log($\eta^*$)–log($\omega$) plot. For Newtonian fluids, n=1 and the dynamic complex viscosity is independent of frequency. For the polymers of interest here, n<1, so that enhanced shear-thinning behavior is indicated by a decrease in n (increase in 1−n).

The transient uniaxial extensional viscosity can be measured using a SER-2-A Testing Platform available from Xpansion Instruments LLC, Tallmadge, Ohio, USA. The SER Testing Platform can be used on a Rheometrics ARES-LS (RSA3) strain-controlled rotational rheometer available from TA Instruments Inc., New Castle, Del., USA. The SER Testing Platform is described in U.S. Pat. Nos. 6,578,413 & 6,691,569, which are incorporated herein for reference. A general description of transient uniaxial extensional viscosity measurements is provided, for example, in "Strain hardening of various polyolefins in uniaxial elongational flow", The Society of Rheology, Inc., J. Rheol. 47(3), 619-630 (2003); and "Measuring the transient extensional rheology of polyethylene melts using the SER universal testing platform", The Society of Rheology, Inc., J. Rheol. 49(3), 585-606 (2005), incorporated herein for reference. Strain hardening occurs when a polymer is subjected to uniaxial extension and the transient extensional viscosity increases more than what is predicted from linear viscoelastic theory. Strain hardening is observed as an abrupt upswing of the extensional viscosity in the transient extensional viscosity vs. time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1.

End Uses

Articles made using ethylene homopolymers or copolymers produced herein may include, for example, molded articles (such as containers and bottles, e.g., household containers, industrial chemical containers, personal care bottles, medical containers, fuel tanks, and storageware, toys, sheets, pipes, tubing) films, and non-wovens.

In other embodiments of the present disclosure, the ethylene homopolymers or copolymers produced herein are used in lubricating compositions, typically as viscosity modifiers or viscosity index improvers.

In other embodiments of the present disclosure, a lubricant composition comprising one or more ethylene homopolymers or copolymers produced herein and a lubricating base stock is provided. The lubricant compositions exhibit little to no gelling.

This invention further relates to:
1. A method for producing an olefin polymer comprising:
   i) contacting alpha-olefin with a catalyst system comprising a first non-metallocene catalyst, an activator, and a reversible chain transfer agent to form a first polymer;
   ii) contacting the first polymer with a coupling agent in the presence of the first catalyst system or a second catalyst system comprising a second non-metallocene catalyst, which may be the same as or different from the first non-metallocene catalyst, and a second activator; and
   iii) obtaining a second polymer.
2. The method of paragraph 1, further comprising transferring the first polymer from a first reactor to a second reactor.
3. The method of paragraphs 1 or 2, wherein contacting the alpha-olefin of step i) is performed in the absence of a coupling agent.
4. The method of any of paragraphs 1-3, wherein contacting the first polymer in step ii) is performed in the absence of additional reversible chain transfer agent.
5. The method of any of paragraphs 1-4, wherein the alpha-olefin comprises ethylene and $C_3$-$C_{20}$ comonomer.
6. The method of any of paragraphs 1-5, wherein contacting the alpha-olefin of step i) and contacting the first polymer of step ii) are performed at a temperature of from about 75° C. to about 190° C.
7. The method of any of paragraphs 1-6, wherein contacting the alpha-olefin of step i) and contacting the first polymer of step ii) are performed at a pressure of from about 2.5 MPa or more.
8. The method of any of paragraphs 1-7, wherein the first catalyst system is combined with toluene.
9. The method of any of paragraphs 1-8, wherein contacting the alpha-olefin of step i) has an average residence time of from about 10 minutes to about 100 minutes.
10. The method of any of paragraphs 1-9, wherein contacting the first polymer of step ii) has an average residence time of from about 10 minutes to about 100 minutes.
11. The method of any of paragraphs 1-10, wherein a period of time between contacting the alpha-olefin of step i) and contacting the first polymer of step ii) is from about 0.1 minutes to about 5 minutes.
12. The method of any of paragraphs 1-11, wherein contacting alpha-olefin of step i) and contacting the first polymer of step ii) are performed in the absence of hydrogen.
13. The method of any of paragraphs 1-12, wherein the reversible chain transfer agent comprises one or more agent selected from trialkyl aluminums and dialkyl zincs.
14. The method of paragraph 13, wherein the reversible chain transfer agent comprises trialkyl aluminum selected from triethylaluminum, tri(i-butyl) aluminum, tri(n-hexyl) aluminum, tri(n-octyl) aluminum.
15. The method of paragraphs 13 or 14, wherein the chain transfer agent comprises dialkyl zinc selected from diethyl zinc, dipropyl zinc, and dioctyl zinc.
16. The method of any of paragraphs 1-15, wherein the coupling agent is an α,ω-diene.
17. The method of paragraph 16, wherein the coupling agent is one or more of 1,6-heptadiene; 1,7-octadiene; 1,8-nonadiene; 1,9-decadiene; 1,10-undecadiene; 1,11-dodecadiene; 1,12-tridecadiene; and 1,13-tetradecadiene.
18. The method of any of paragraphs 1-17, wherein the each catalyst is represented by formula (I) or formula (II):

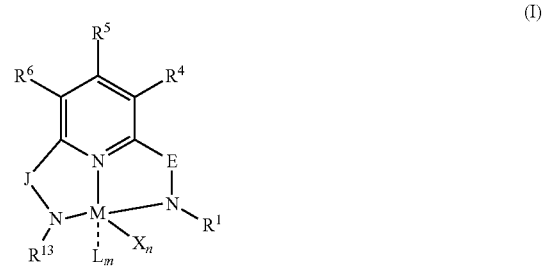

-continued (II)

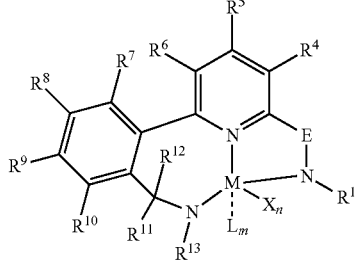

wherein:

M is a Group 3, 4, 5, 6, 7, 8, 9, or 10 metal; E is $C(R^2)$ or $C(R^3)(R^{3'})$; X is an anionic leaving group, wherein two X groups may be joined to form a dianionic group; L is a neutral Lewis base, wherein two L groups may be joined to form a bidentate Lewis base, wherein an X group may be joined to an L group to form a monoanionic bidentate group; $R^1$ and $R^{13}$ are independently selected from substituted or unsubstituted $C_1$-$C_{40}$ hydrocarbyl or silyl groups;

$R^2$ is a group containing 1-10 carbon atoms that is optionally joined with $R^4$ to form an aromatic ring; $R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino, or two of $R^3$, $R^{3'}$, $R^4$, $R^5$, $R^6$, $R^7$, $R^8$, $R^9$, $R^{10}$, $R^{11}$, and $R^{12}$ may be joined to form a ring; J is a divalent group that forms a three-atom-length bridge between the pyridine ring and the amido nitrogen; n is 1 or 2; and m is 0, 1, or 2.

19. The method of paragraph 18, wherein M is Zr or Hf; X is methyl, chloride, or dialkylamido; L is ether, amine, phosphine, or thioether; $R^1$ and $R^{13}$ are aryl; $R^3$ and $R^{3'}$ are hydrogen; and J is selected from:

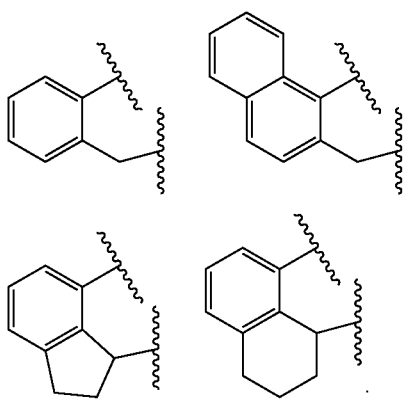

20. The method of paragraph 18, wherein the catalyst is:

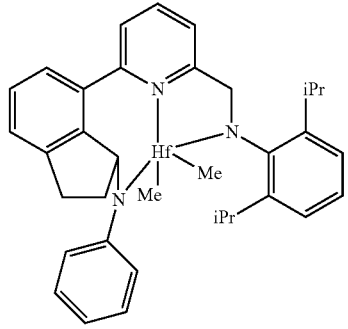

or

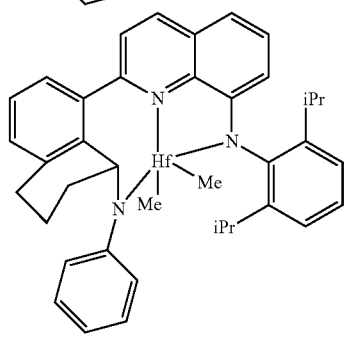

21. The method of paragraph 1, wherein the activator is represented by the formula:

wherein: Z is (L-H) or a reducible Lewis acid, wherein L is a neutral Lewis base, H is hydrogen, and (L-H) is a Bronsted acid; and $A^{d-}$ is a boron containing non-coordinating anion having the charge d−, wherein d is 1, 2, or 3.

22. The method of paragraph 21, wherein the activator comprises one or more of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)^{4-}]$, $[Me_3NH^+][B(C_6F_5)^{4-}]$, N,N-dimethylanilinium tetrakis(perfluorophenyl)aluminate, methyl dioctadecylammonium tetrakis(pentafluorophenyl)borate, and methyl di(hydrogenated tallow)ammonium tetrakis(pentafluorophenyl)borate.

23. The method of paragraph 22, wherein the activator is N,N-dimethylanilinium tetrakis(pentafluorophenyl)borate.

24. The method of any of paragraphs 1-23, wherein the second polymer has gel content of 20% or less based on the total weight of polymer product.

25. The method of paragraph 24, wherein the second polymer has a gel content of 5% or less based on the total weight of polymer product.

26. A polymer obtained by the method of any of paragraphs 1-23, wherein the polymer has a $g'_{vis}$ average value from about 0.4 to about 0.8, as determined by gel permeation chromatography.

27. The polymer of paragraph 26, wherein the polymer has a vinyl unsaturation content of 0.8 or greater vinyls/1000 carbons, as determined by $^1H$ nuclear magnetic resonance spectroscopy.

28. The polymer of paragraph 26, wherein the polymer has a melt index ratio (HLMI/MI) from about 50 to about 120.

EXPERIMENTAL

Examples

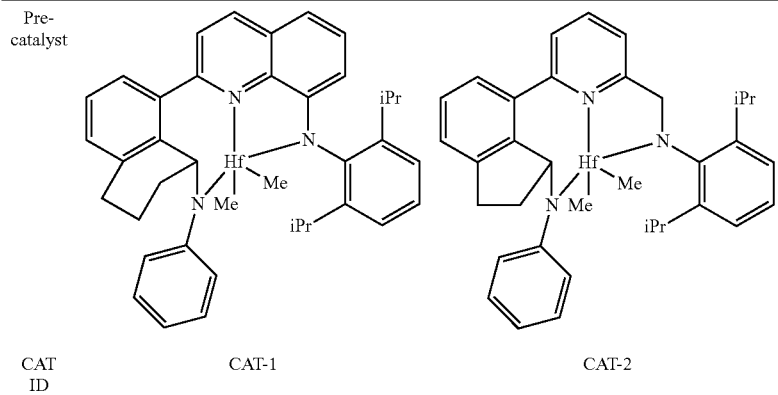

| CAT ID | CAT-1 | CAT-2 |

| Activator | N,N-dimethylanilinium tetrakis(pentafluorophenyl)borate |
|---|---|
| ACT ID | NCA-1 |

Starting Reagents: NaH, 8-bromoquinolin-2(1H)-one, t-butyldimethylsilylchloride, n-butyllithium, t-butyllithium, Pd$_2$(dba)$_3$, XPhos, K$_2$CO$_3$, dichloromethane, methanol, POCl$_3$, n-hexane, 1,2,3,4-tetrahydronaphthalen-1-ol, N,N,N',N'-tetramethylethylene diamine (TMEDA), pentane, 1,2-dibromotetrafluoroethane, Na$_2$SO$_4$, triethylamine, acetic anhydride, 4-(dimethylamino)pydridine (DMAP), ethyl acetate, Na$_2$CO$_3$, KOH, pyridinium chlorochromate (PCC), aniline, toluene, TiCl$_4$, NaBH$_3$CN, acetic acid, CDCl$_3$, 2-isopropoxy-4,4,5,5-tetramethyl-1,3,2-dioxaborolane, 1,4-dioxane, cesium carbonate, Pd(PPh$_3$)$_4$, benzene, Hf(NMe$_2$)$_4$, Me$_3$Al, 6-bromopyridine-2-carboxaldehyde, 2,6-diisopropylaniline, indan-1-ol and 2-isopropoxy-4,4,5,5-tetramethyl-1,3,2-dioxaborolane were purchased from commercial sources and used as received. Hf(NMe$_2$)$_2$Cl$_2$, (DME) (DME=1,2-dimethoxyethane), and dimethylmagnesium were prepared following published procedures (Erker et al. Organometallics 2000, 19, 127; Coates and Heslop J. Chem. Soc. A 1968, 514; Andersen et al. J. Chem. Soc., Dalton Trans. 1977, 809). Tetrahydrofuran (Merck) and diethyl ether (Merck; ether) were freshly distilled from benzophenone ketyl were used for organometallic synthesis and catalysis.

8-(2,6-Diisopropylphenylamino)quinolin-2(1H)-one. To a suspension of NaH (5.63 g of 60 wt % in mineral oil, 140 mmol) in tetrahydrofuran (1000 mL) was added 8-bromoquinolin-2(1H)-one (30.0 g, 134 mmol) in small portions at 0° C. The obtained reaction mixture was warmed to room temperature, stirred for 30 min, then cooled to 0° C. Then t-butyldimethylsilylchloride (20.2 g, 134 mmol) was added in one portion. This mixture was stirred for 30 min at room temperature and then poured into water (1 L). The protected 8-bromoquinolin-2(1H)-one was extracted with diethyl ether (3×400 mL). The combined extracts were dried over Na$_2$SO$_4$ and then evaporated to dryness. Yield 45.2 g (quant., 99% purity by GC/MS) of a dark red oil. To a solution of 2,6-diisopropylaniline (27.7 mL, 147 mmol) and toluene (1.5 L) was added n-butyllithium (60.5 mL, 147 mmol, 2.5 M in hexanes) at room temperature. The obtained suspension was heated briefly to 100° C. and then cooled to room temperature. To the reaction mixture was added Pd$_2$(dba)$_3$ (dba=dibenzylideneacetone) (2.45 g, 2.68 mmol) and XPhos (XPhos=2-Dicyclohexylphosphino-2',4',6'-triisopropylbiphenyl) (2.55 g, 5.36 mmol) followed by the addition of the protected 8-bromoquinolin-2(1H)-one (45.2 g, 134 mmol). The obtained dark brown suspension was heated at 60° C. until lithium salt precipitate disappeared (ca. 30 min). The resulting dark red solution was quenched by addition of water (100 mL), and the organic layer was separated, dried over Na$_2$SO$_4$ and then evaporated to dryness. The obtained oil was dissolved in a mixture of dichloromethane (1000 mL) and methanol (500 mL), followed by an addition of 12 M HCl (50 mL). The reaction mixture was stirred at room temperature for 3 h, then poured into 5% K$_2$CO$_3$ (2 L). The product was extracted with dichloromethane (3×700 mL). The combined extracts were dried over Na$_2$SO$_4$, filtered, and then evaporated to dryness. The resulting solid was triturated with n-hexane (300 mL), and the obtained suspension collected on a glass frit. The precipitate was dried in vacuum. Yield 29.0 g (67%) of a marsh-green solid. Anal. calc. for C$_{21}$H$_{24}$N$_2$O: C, 78.71; H, 7.55; N, 8.74. Found: C, 79.00; H, 7.78; N, 8.50. $^1$H NMR (CDCl$_3$): δ 13.29 (br.s, 1H), 7.80-7.81 (d, 1H, J=9.5 Hz), 7.35-7.38 (m, 1H), 7.29-7.30 (m, 3H), 6.91-6.95 (m, 2H), 6.58-6.60 (d, 1H, J=9.5 Hz), 6.27-6.29 (m, 1H), 3.21 (sept, 2H, J=6.9 Hz), 1.25-1.26 (d, 6H, J=6.9 Hz), 1.11-1.12 (d, 6H, J=6.9 Hz).

2-Chloro-N-(2,6-diisopropylphenyl)quinolin-8-amine. 29.0 g (90.6 mmol) of 8-(2,6-diisopropylphenylamino)quinolin-2(1H)-one was added to 400 mL of POCl$_3$ in one portion. The resulting suspension was heated for 40 h at 105° C., then cooled to room temperature, and poured into 4000 cm$^3$ of a crushed ice. The crude product was extracted with 3×400 mL of diethyl ether. The combined extract was dried over K$_2$CO$_3$ and then evaporated to dryness. The resulting solid was triturated with 30 mL of cold n-hexane, and the formed suspension was collected on a glass frit. The obtained solid was dried in vacuum. Yield 29.0 g (95%) of a yellow-green solid. Anal. calc. for C$_{21}$H$_{23}$N$_2$Cl: C, 74.43; H, 6.84; N, 8.27. Found: C, 74.68; H, 7.02; N, 7.99. $^1$H NMR (CDCl$_3$): δ 8.04-8.05 (d, 1H, J=8.6 Hz), 7.38-7.39 (d, 1H, J=8.5 Hz), 7.33-7.36 (m, 1H), 7.22-7.27 (m, 4H), 7.04-7.06 (d, 1H, J=8.1 Hz), 6.27-6.29 (d, 1H, J=7.8 Hz), 3.20 (sept, 2H, J=6.9 Hz), 1.19-1.20 (d, 6H, J=6.9 Hz), 1.10-1.11 (d, 6H, J=6.9 Hz).

8-Bromo-1,2,3,4-tetrahydronaphthalen-1-ol. To a mixture of 78.5 g (530 mmol) of 1,2,3,4-tetrahydronaphthalen-1-ol, 160 mL (1.06 mol) of N,N,N',N'-tetramethylethylenediamine, and 3000 mL of pentane cooled to −20° C. 435 mL (1.09 mol) of 2.5 M ″BuLi in hexanes was added dropwise. The obtained mixture was refluxed for 12 h, then cooled to −80° C., and 160 mL (1.33 mol) of 1,2-dibromotetrafluoroethane was added. The obtained mixture was allowed to warm to room temperature and then stirred for 12 h at this temperature. After that, 100 mL of water was added. The resulting mixture was diluted with 2000 mL of water, and the organic layer was separated. The aqueous layer was extracted with 3×400 mL of toluene. The combined organic extract was dried over $Na_2SO_4$ and then evaporated to dryness. The residue was distilled using the Kugelrohr apparatus, b.p. 150-160° C./1 mbar. The obtained yellow oil was dissolved in 100 mL of triethylamine, and the formed solution was added dropwise to a stirred solution of 71.0 mL (750 mmol) of acetic anhydride and 3.00 g (25.0 mmol) of 4-dimethylaminopyridine in 105 mL of triethylamine. The formed mixture was stirred for 5 min, then 1000 mL of water was added, and the obtained mixture was stirred for 12 h. After that, the reaction mixture was extracted with 3×200 mL of ethyl acetate. The combined organic extract was washed with aqueous $Na_2CO_3$, dried over $Na_2SO_4$, and then evaporated to dryness. The residue was purified by flash chromatography on silica gel 60 (40-63 um, eluent: hexane-ethyl acetate=30:1, vol.). The isolated ester was dissolved in 1500 mL of methanol, 81.0 g (1.45 mol) of KOH was added, and the obtained mixture was heated to reflux for 3 h. The reaction mixture was then cooled to room temperature and poured into 4000 mL of water. The title product was extracted with 3×300 mL of dichloromethane. The combined organic extract was dried over $Na_2SO_4$ and then evaporated to dryness. Yield 56.0 g (47%) of a white crystalline solid. $^1$H NMR ($CDCl_3$): δ 7.38-7.41 (m, 1H, 7-H); 7.03-7.10 (m, 2H, 5,6-H); 5.00 (m, 1H, 1-H), 2.81-2.87 (m, 1H, 4/4'-H), 2.70-2.74 (m, 1H, 4'/4-H), 2.56 (br.s., 1H, OH), 2.17-2.21 (m, 2H, 2,2'-H), 1.74-1.79 (m, 2H, 3,3'-H).

8-Bromo-3,4-dihydronaphthalen-1(2H)-one. To a solution of 56.0 g (250 mmol) of 8-bromo-1,2,3,4-tetrahydronaphthalen-1-ol in 3500 mL of dichloromethane was added 265 g (1.23 mol) of pyridinium chlorochromate (PCC). The resulting mixture was stirred for 5 h at room temperature, then passed through a pad of silica gel 60 (500 mL; 40-63 um), and finally evaporated to dryness. Yield 47.6 g (88%) of a colorless solid. $^1$H NMR ($CDCl_3$): δ 7.53 (m, 1H, 7-H); 7.18-7.22 (m, 2H, 5,6-H); 2.95 (t, J=6.1 Hz, 2H, 4,4'-H); 2.67 (t, J=6.6 Hz, 2H, 2,2'-H); 2.08 (quint, J=6.1 Hz, J=6.6 Hz, 2H, 3,3'-H).

(8-Bromo-1,2,3,4-tetrahydronaphthalen-1-yl)phenylamine. To a stirred solution of 21.6 g (232 mmol) of aniline in 140 mL of toluene was added 10.93 g (57.6 mmol) of $TiCl_4$ over 30 min at room temperature under argon atmosphere. The resulting mixture was stirred for 30 min at 90° C., followed by an addition of 13.1 g (57.6 mmol) of 8-bromo-3,4-dihydronaphthalen-1(2H)-one. This mixture was stirred for 10 min at 90° C., then cooled to room temperature, and poured into 500 mL of water. The product was extracted with 3×50 mL of ethyl acetate. The combined organic extract was dried over $Na_2SO_4$, evaporated to dryness, and the residue was re-crystallized from 10 mL of ethyl acetate. The obtained crystalline solid was dissolved in 200 mL of methanol, 7.43 g (118 mmol) of $NaBH_3CN$ and 3 mL of acetic acid were added in argon atmosphere. This mixture was heated to reflux for 3 h, then cooled to room temperature, and evaporated to dryness. The residue was diluted with 200 mL of water, and crude product was extracted with 3×100 mL of ethyl acetate. The combined organic extract was dried over $Na_2SO_4$ and evaporated to dryness. The residue was purified by flash chromatography on silica gel 60 (40-63 um, eluent: hexane-ethyl acetate-triethylamine=100:10:1, vol.). Yield 13.0 g (75%) of a yellow oil. Anal. Calc. for $C_{16}H_{16}BrN$: C, 63.59; H, 5.34; N, 4.63. Found: C, 63.82; H, 5.59; N, 4.49. $^1$H NMR ($CDCl_3$): δ 7.44 (m, 1H), 7.21 (m, 2H), 7.05-7.11 (m, 2H), 6.68-6.73 (m, 3H), 4.74 (m, 1H), 3.68 (br.s, 1H, NH), 2.84-2.89 (m, 1H), 2.70-2.79 (m, 1H), 2.28-2.32 (m, 1H), 1.85-1.96 (m, 1H), 1.76-1.80 (m, 1H), 1.58-1.66 (m, 1H).

N-Phenyl-8-(4,4,5,5-tetramethyl-1,3,2-dioxaborolan-2-yl)-1,2,3,4-tetrahydronaphthalen-1-amine. To a solution of 13.0 g (43.2 mmol) of (8-bromo-1,2,3,4-tetrahydronaphthalen-1-yl)phenylamine in 250 mL tetrahydrofuran (THF) was added 17.2 mL (43.0 mmol) of 2.5 M ″BuLi at −80° C. Further on, this mixture was stirred for 1 h at this temperature, and 56.0 mL (90.3 mmol) of 1.6 M $^t$BuLi in pentane was added. The resulting mixture was stirred for 1 h at the same temperature. Then, 16.7 g (90.0 mmol) of 2-isopropoxy-4,4,5,5-tetramethyl-1,3,2-dioxaborolane was added. After that the cooling bath was removed, and the resulting mixture was stirred for 1 h at room temperature. Finally, 10 mL of water was added, and the obtained mixture was evaporated to dryness. The residue was diluted with 200 mL of water, and crude product was extracted with 3×100 mL of ethyl acetate. The combined organic extract was dried over $Na_2SO_4$ and then evaporated to dryness. Yield 15.0 g (98%) of a yellow oil. Anal. Calc. for $C_{22}H_{28}BNO_2$: C, 75.65; H, 8.08; N, 4.01. Found: C, 75.99; H, 8.32; N, 3.79. $^1$H NMR ($CDCl_3$): δ 7.59 (m, 1H), 7.18-7.23 (m, 4H), 6.71-6.74 (m, 3H), 5.25 (m, 1H), 3.87 (br.s, 1H, NH), 2.76-2.90 (m, 2H), 2.12-2.16 (m, 1H), 1.75-1.92 (m, 3H), 1.16 (s, 6H), 1.10 (s, 6H).

2-(8-Anilino-5,6,7,8-tetrahydronaphthalen-1-yl)-N-(2,6-diisopropylphenyl)quinolin-8-amine. To a solution of 13.8 g (41.0 mmol) of 2-chloro-N-(2,6-diisopropylphenyl)quinolin-8-amine in 700 mL of 1,4-dioxane were added 15.0 g (43.0 mmol) of N-phenyl-8-(4,4,5,5-tetramethyl-1,3,2-dioxaborolan-2-yl)-1,2,3,4-tetrahydronaphthalen-1-amine, 35.0 g (107 mmol) of cesium carbonate and 400 mL of water. The obtained mixture was purged with argon for 10 min followed by an addition of 2.48 g (2.15 mmol) of $Pd(PPh_3)_4$. The formed mixture was stirred for 2 h at 90° C., then cooled to room temperature. To the obtained two-phase mixture 700 mL of n-hexane was added. The organic layer was separated, washed with brine, dried over $Na_2SO_4$, and then evaporated to dryness. The residue was purified by flash chromatography on silica gel 60 (40-63 um, eluent: hexane-ethyl acetate-triethylamine=100:5:1, vol.) and then re-crystallized from 150 mL of n-hexane. Yield 15.1 g (70%) of a yellow powder. Anal. calc. for $C_{37}H_{39}N_3$: C, 84.53; H, 7.48; N, 7.99. Found: C, 84.60; H, 7.56; N, 7.84. $^1$H NMR ($CDCl_3$): δ 7.85-7.87 (d, J=7.98 Hz, 1H), 7.56 (br.s, 1H), 7.43-7.45 (d, J=8.43 Hz, 1H), 7.21-7.38 (m, 6H), 7.12 (t, J=7.77 Hz, 1H), 6.87-6.89 (d, J=7.99 Hz, 1H), 6.74 (t, J=7.99 Hz, 1H), 6.36 (t, J=7.32 Hz, 1H), 6.14-6.21 (m, 3H), 5.35 (br.s, 1H), 3.56 (br.s, 1H), 3.20-3.41 (m, 2H), 2.83-2.99 (m, 2H), 2.10-2.13 (m, 1H), 1.77-1.92 (m, 3H), 1.13-1.32 (m, 12H).

Complex CAT-1. Benzene (50 mL) was added to 2-(8-Anilino-5,6,7,8-tetrahydronaphthalen-1-yl)-N-(2,6-diisopropylphenyl)quinolin-8-amine (2.21 g, 4.20 mmol) and $Hf(NMe_2)_4$ (1.58 g, 4.45 mmol) to form a clear orange solution. The mixture was heated to reflux for 16 hours to form a clear red-orange solution. Most of the volatiles were removed by evaporation under a stream of nitrogen to afford a concentrated red solution (ca. 5 mL) that was warmed to 40° C. Then hexane (30 mL) was added and the mixture was stirred to cause orange crystalline solid to form. This slurry was cooled to −40° C. for 30 minutes then the solid was collected by filtration and washed with additional cold hexane (2×10 mL). The resulting quinolinyldiamide hafnium diamide was isolated as an orange solid and dried under reduced pressure (2.90 g, 3.67 mmol, 87.4% yield). This solid was dissolved in toluene (25 mL) and Me$_3$Al (12.8 mL, 25.6 mmol) was added. The mixture was warmed to 40° C. for 1 hour then evaporated under a stream of nitrogen. The crude product (2.54 g) was ~90% pure by $^1$H NMR spectroscopy. The solid was purified by recrystallization from CH$_2$Cl$_2$-hexanes (20 mL-20 mL) by slow evaporation to give pure product as orange crystals (1.33 g, 43.2% from ligand). The mother liquor was further concentrated for a second crop (0.291 g, 9.5% from ligand). FIG. 1 is a $^1$H NMR spectrum of CAT-1 acquired on a 400 MHz NMR spectrometer. (Solvent: CD$_2$Cl$_2$ (ca. 10 mg sample/mL solvent))(Reference peak=CHDCl$_2$ δ 5.32 ppm).

Preparation of N-[(6-bromopyridin-2-yl)methyl]-2,6-diisopropylaniline

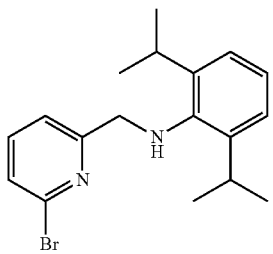 [SMILES: CC(C)c1cccc(C(C)C)c1NCc1cccc(Br)n1]

A solution of 85.0 g (457 mmol) of 6-bromopyridine-2-carbaldehyde and 80.9 g (457 mmol) of 2,6-diisopropylaniline in 1000 ml of ethanol was refluxed for 8 h. The obtained solution was evaporated to dryness, and the residue was re-crystallized from 200 ml of methanol. In argon atmosphere, to thus obtained 113.5 g (329 mmol) of N-[(1E)-(6-bromopyridin-2-yl)methylene]-2,6-diisopropylaniline were added 33.16 g (526 mmol) of NaBH$_3$CN, 9 ml of acetic acid and 1000 ml of methanol. This mixture was refluxed for 12 h, then cooled to room temperature, poured into 1000 ml of water, and crude product was extracted with 3×200 ml of ethyl acetate. The combined extract was dried over sodium sulfate and evaporated to dryness. The residue was purified by flash chromatography on silica gel 60 (40-63 um, eluent: hexane-ethyl acetate=10:1, vol.). Yield 104.4 g (66%) of a yellow oil. Anal. calc. for C$_{18}$H$_{23}$BrN$_2$: C, 62.25; H, 6.68; N, 8.07. Found: C, 62.40; H, 6.87; N, 7.90. $^1$H NMR (CDCl$_3$): δ 7.50 (m, 1H, 4-H in Py), 7.38 (m, 1H, 5-H in Py), 7.29 (m, 1H, 3-H in Py), 7.05-7.12 (m, 3H, 3,4,5-H in 2,6-iPr$_2$C$_6$H$_3$), 4.18 (s, 2H, CH$_2$NH), 3.94 (br.s, 1H, NH), 3.33 (sept, J=6.8 Hz, 2H, CHMe$_2$), 1.23 (d, J=6.8 Hz, 12H, CHMe$_2$).

Preparation of 7-bromoindan-1-ol

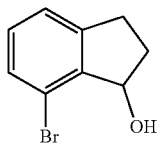

To a mixture of 100 g (746 mmol) of indan-1-ol, 250 ml (1.64 mol) of N,N,N',N'-tetramethylethylenediamine, and 3000 ml of pentane cooled to −20° C., 655 ml (1.64 mol) of 2.5M nBuLi in hexanes was added. The reaction mixture was then refluxed for 12 h and then cooled to −80° C. Then, 225 ml (1.87 mol) of 1,2-dibromotetrafluoroethane was added, and the resulting mixture was allowed to warm to room temperature. This mixture was stirred for 12 h, and then 100 ml of water was added. The resulting mixture was diluted with 2000 ml of water, and the organic layer was separated. The aqueous layer was extracted with 3×400 ml of toluene. The combined organic extract was dried over Na$_2$SO$_4$ and evaporated to dryness. The residue was distilled using a Kugelrohr apparatus, b.p. 120-140° C./1 mbar. The resulting yellow oil was dissolved in 50 ml of triethylamine, and the obtained solution added dropwise to a stirred solution of 49.0 ml (519 mmol) of acetic anhydride and 4.21 g (34.5 mmol) of 4-(dimethylamino)pyridine in 70 ml of triethylamine. The resulting mixture was stirred for 5 min, then 1000 ml of water was added, and stirring was continued for 12 h. Then, the reaction mixture was extracted with 3×200 ml of ethyl acetate. The combined organic extract was washed with aqueous Na$_2$CO$_3$, dried over Na$_2$SO$_4$, and evaporated to dryness. The residue was purified by flash chromatography on silica gel 60 (40-63 um, eluent: hexane-ethyl acetate=30:1, vol.). The resulting ester was dissolved in 1000 ml of methanol, 50.5 g (900 mmol) of KOH was added, and this mixture was refluxed for 3 h. The reaction mixture was then cooled to room temperature and poured into 4000 ml of water. Crude product was extracted with 3×300 ml of dichloromethane. The combined organic extract was dried over Na$_2$SO$_4$ and evaporated to dryness. Yield 41.3 g (26%) of a white crystalline solid. Anal. Calc for C$_9$H$_9$BrO: C, 50.73; H, 4.26. Found: C, 50.85; H, 4.48. $^1$H NMR (CDCl$_3$): δ 7.34 (d, J=7.6 Hz, 1H, 6-H); 7.19 (d, J=7.4 Hz, 1H, 4-H); 7.12 (dd, J=7.6 Hz, J=7.4 Hz, 1H, 5-H); 5.33 (dd, J=2.6 Hz, J=6.9 Hz, 1H, 1-H), 3.18-3.26 (m, 1H, 3- or 3'-H), 3.09 (m, 2H, 3,3'-H); 2.73 (m, 2H, 2,2'-H).

Preparation of 7-bromoindan-1-one

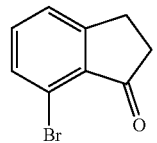 [SMILES: O=C1CCc2cccc(Br)c21]

To a solution of 37.9 g (177 mmol) of 7-bromoindan-1-ol in 3500 ml of dichloromethane 194 g (900 mmol) of pyridinium chlorochromate was added. The resulting mixture was stirred at room temperature for 5 h, then passed through a silica gel pad (500 ml), and the elute was evaporated to dryness. Yield 27.6 g (74%) of a white crystalline solid. Anal. Calc for C$_9$H$_7$BrO: C, 51.22; H, 3.34. Found: C, 51.35; H, 3.41. $^1$H NMR (CDCl$_3$): δ 7.51 (m, 1H, 6-H); 7.36-7.42 (m, 2H, 4,5-H); 3.09 (m, 2H, 3,3'-H); 2.73 (m, 2H, 2,2'-H).

Preparation of
7-bromo-N-phenyl-2,3-dihydro-1H-inden-1-amine

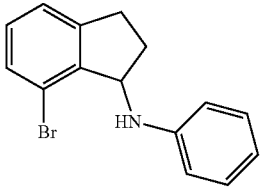 [SMILES: Brc1cccc2c1C(Nc1ccccc1)CC2]

To a stirred solution of 10.4 g (112 mmol) of aniline in 60 ml of toluene 5.31 g (28.0 mmol) of TiCl$_4$ was added for 30 min at room temperature in argon atmosphere. The resulting mixture was stirred at 90° C. for 30 min followed by an addition of 6.00 g (28.0 mmol) of 7-bromoindan-1-one. The resulting mixture was stirred for 10 min at 90° C., poured into 500 ml of water, and crude product was extracted with 3×100 ml of ethyl acetate. The organic layer was separated, dried over Na$_2$SO$_4$, and then evaporated to dryness. The residue was crystallized from 10 ml of ethyl acetate at −30° C. The resulting solid was separated and dried in vacuum. After that it was dissolved in 100 ml of methanol, 2.70 g (42.9 mmol) of NaBH$_3$CN and 0.5 ml of glacial acetic acid was added. The resulting mixture was refluxed for 3 h in argon atmosphere. The resulting mixture was cooled to room temperature and then evaporated to dryness. The residue was diluted with 200 ml of water, and crude product was extracted with 3×50 ml of ethyl acetate. The combined organic extract was dried over Na$_2$SO$_4$ and evaporated to dryness. The residue was purified by flash chromatography on silica gel 60 (40-63 um, eluent: hexane-ethyl acetate-triethylamine=100:10:1, vol.). Yield 5.50 g (68%) of a yellow oil. Anal. calc. for C$_{15}$H$_{14}$BrN: C, 62.52; H, 4.90; N, 4.86. Found: C, 62.37; H, 5.05; N, 4.62. $^1$H NMR (CDCl$_3$): δ 7.38 (m, 1H, 6-H in indane); 7.22 (m, 3H, 3,5-H in phenyl and 4-H in indane); 7.15 (m, 1H, 5-H in indane); 6.75 (m, 1H, 4-H in indane); 6.69 (m, 2H, 2,6-H in phenyl); 4.94 (m, 1H, 1-H in indane); 3.82 (br.s, 1H, NH); 3.17-3.26 (m, 1H, 3- or 3'-H in indane); 2.92-2.99 (m, 2H, 3'- or 3-H in indane); 2.22-2.37 (m, 2H, 2,2'-H in indane).

Preparation of N-phenyl-7-(4,4,5,5-tetramethyl-1,3,2-dioxaborolan-2-yl)-2,3-dihydro-1H-inden-1-amine

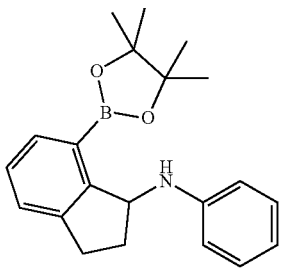 [SMILES: CC1(C)OB(c2cccc3c2C(Nc2ccccc2)CC3)OC1(C)C]

To a solution of 2.50 g (8.70 mmol) of 7-bromo-N-phenyl-2,3-dihydro-1H-inden-1-amine in 50 ml THF 3.50 ml (8.70 mmol) of 2.5M $^n$BuLi in hexanes was added at −80° C. in argon atmosphere. The reaction mixture was then stirred for 1 h at this temperature. Then, 11.1 ml (17.8 mmol) of 1.7M $^t$BuLi in pentane was added, and the reaction mixture was stirred for 1 hour. Then, 3.23 g (17.4 mmol) of 2-isopropoxy-4,4,5,5-tetramethyl-1,3,2-dioxaborolane was added. Then, the cooling bath was removed, and the resulting mixture was stirred for 1 h at room temperature. To the formed mixture 10 ml of water was added, and the resulting mixture was evaporated to dryness. The residue was diluted with 200 ml of water, and the title product was extracted with 3×50 ml of ethyl acetate. The combined organic extract was dried over Na$_2$SO$_4$ and evaporated to dryness. Yield 2.80 g (96%) of a light yellow oil. Anal. calc. For C$_{21}$H$_{26}$BNO$_2$: C, 75.24; H, 7.82; N, 4.18. Found: C, 75.40; H, 8.09; N, 4.02. $^1$H NMR (CDCl$_3$): δ 7.63 (m, 1H, 6-H in indane); 7.37-7.38 (m, 1H, 4-H in indane); 7.27-7.30 (m, 1H, 5-H in indane); 7.18 (m, 2H, 3,5-H in phenyl); 6.65-6.74 (m, 3H, 2,4,6-H in phenyl); 5.20-5.21 (m, 1H, 1-H in indane); 3.09-3.17 (m, 1H, 3- or 3'-H in indane); 2.85-2.92 (m, 1H, 3'- or 3-H in indane); 2.28-2.37 (m, 1H, 2- or 2'-H in indane); 2.13-2.19 (m, 1H, 2'- or 2-H in indane); 1.20 (s, 6-H, 4,5-Me in BPin); 1.12 (s, 6H, 4',5'-Me in BPin).

Preparation of 7-(6-(((2,6-diisopropylphenyl)amino)methyl)pyridin-2-yl)-N-phenyl-2,3-dihydro-1H-inden-1-amine

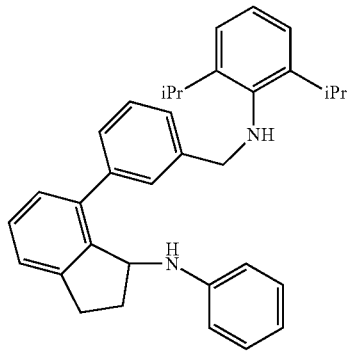 [SMILES: CC(C)c1cccc(C(C)C)c1NCc1cccc(-c2cccc3c2C(Nc2ccccc2)CC3)c1]

A solution of 2.21 g (21.0 mmol) of Na$_2$CO$_3$ in a mixture of 80 ml of water and 25 ml of methanol was purged with argon for 30 min. The obtained solution was added to a mixture of 2.80 g (8.40 mmol) of N-phenyl-7-(4,4,5,5-tetramethyl-1,3,2-dioxaborolan-2-yl)-2,3-dihydro-1H-inden-1-amine, 2.90 g (8.40 mmol) of N-[(6-bromopyridin-2-yl)methyl]-2,6-diisopropylaniline, 0.48 g (0.40 mmol) of Pd(PPh$_3$)$_4$, and 120 ml of toluene. This mixture was stirred for 12 hours (h) at 70° C., then cooled to room temperature. The organic layer was separated, the aqueous layer was extracted with 3×50 ml of ethyl acetate. The combined organic extract was washed with brine, dried over Na$_2$SO$_4$ and evaporated to dryness. The residue was purified by flash chromatography on silica gel 60 (40-63 um, eluent: hexane-ethyl acetate-triethylamine=100:5:1, vol.). Yield 2.00 g (50%) of a yellow oil. Anal. calc. For C$_{33}$H$_{37}$N$_3$: C, 83.33; H, 7.84; N, 8.83. Found: C, 83.49; H, 7.66; N, 8.65. $^1$H NMR (CDCl$_3$): δ 7.56-7.61 (m, 3H, 6-H in indane and 4,5-H in Py); 7.46-7.51 (m, 2H, 3,5-H in phenyl); 7.14-7.16 (m, 1H, 4-H in indane); 7.08-7.12 (m, 5H, 3-H in Py, 3,4,5-H in 2,6-diisopropylphenyl and 5-H in indane); 6.65 (m, 1H, 4-H in phenyl); 6.53 (m, 2H, 2,6-H in phenyl); 5.21-5.22 (m, 1H, 1-H in indane); 3.95-4.15 (m, 4H, CH$_2$NH and NH-phenyl and NH-2,6-diisopropylphenyl); 3.31 (sept, J=6.8 Hz, 2H, CH in 2,6-diisopropylphenyl); 3.16-3.24 (m, 1H, 3- or 3'-H in indane); 2.91-2.97 (m, 1H, 3'- or 3-H in indane); 2.21-2.37 (m, 2H, 2,2'-H in indane); 1.19-2.21 (m, 12H, $CH_3$ in 2,6-diisopropylaniline).

Preparation of CAT-2. Toluene (5 mL) was added to 7-(6-(((2,6-diisopropylphenyl)amino)methyl)pyridin-2-yl)-N-phenyl-2,3-dihydro-1H-inden-1-amine (0.296 g, 0.623 mmol) and $Hf(NMe_2)_2Cl_2(dme)$ (0.267 g, 0.623 mmol) to form a clear colorless solution. The mixture was loosely capped with aluminum foil and heated to 95° C. for 3 hours. The mixture was then evaporated to a solid and washed with $Et_2O$ (5 mL) to afford 0.432 g of the presumed (pyridyldiamide) $HfCl_2$ complex. This was dissolved in $CH_2Cl_2$ (5 mL) and cooled to −50° C. A $Et_2O$ solution of dimethylmagnesium (3.39 mL, 0.747 mmol) was added dropwise and the mixture was allowed to warm to ambient temperature. After 30 minutes the volatiles were removed by evaporation and the residue was extracted with $CH_2Cl_2$ (10 mL) and filtered. The solution was concentrated to 2 mL and pentane (4 mL) was added. Cooling to −10° C. overnight afforded colorless crystals that were isolated and dried under reduced pressure. Yield=0.41 g, 92%. $^1H$ NMR ($CD_2Cl_2$, 400 MHz): 8.00 (t, 1H), 6.85-7.65 (13H), 5.06 (d, 1H), 4.91 (dd, 1H), 4.50 (d, 1H), 3.68 (sept, 1H), 3.41 (m, 1H), 2.85 (m, 1H), 2.61 (sept, 1H), 2.03 (m, 1H), 1.85 (m, 1H), 1.30 (m, 2H), 1.14 (d, 3H), 1.06 (d, 3H), 0.96 (d, 3H), 0.68 (3, 3H), −0.48 (s, 3H), −0.84 (s, 3H).

Batch Polymerizations

General Considerations: Batch polymerizations were performed in either a stirred 1 L autoclave reactor or a small (approximately 500 mL) thick-walled glass reactor. All solvents, monomers, and gases were purified using 3 angstrom molecular sieves, oxygen scavenger, and/or sodium-potassium alloy, as required.

Example 1

Ethylene/hexene/1,9-decadiene Terpolymerization
(Comparative)

A glass vial was loaded with 1-hexene (0.5 mL), 1,9-decadiene (0.1 mL), hexane (4 mL) and tri(n-octyl)aluminum (0.020 mL of 0.5 M solution in hexane). At room temperature (approximately 23° C.), ethylene was vigorously bubbled through the stirred solution (approximately 800 rpm) for a minute. Then a 0.5 mM catalyst solution prepared from a 1:1 molar ratio of CAT-1 and NCA-1 in toluene was added (0.5 mL, 250 nmol) while the ethylene bubbling was continued. After 1 to 2 minutes the viscosity of the mixture began to increase. After the initial increase in viscosity the entire mixture thickened rapidly to form a stiff gel within 20 seconds. Stirring with the magnetic stirrer was impossible. Breaking the gel with a spatula revealed the gel to be stiff without significant flowability.

Example 2

Ethylene/hexene/1,9-decadiene Terpolymerization

A glass vial was loaded with 1-hexene (0.5 mL), hexane (4 mL) and tri(n-octyl)aluminum (0.020 mL of 0.5 M solution in hexane). At room temperature, ethylene was vigorously bubbled through the stirred solution (approximately 800 rpm) for a minute. Then a 0.5 mM catalyst solution prepared from a 1:1 molar ratio of CAT-1 and NCA-1 in toluene was added (0.5 mL, 250 nmol) while the ethylene bubbling was continued. After 1 to 2 minutes the viscosity of the mixture began to increase. Over the next 3 minutes the viscosity of the mixture gradually increased, but stirring was maintained. At this time 1,9-decadiene (0.1 mL) was added. The mixture continued to thicken gradually over the next 10 minutes, but remained a flowing solution that was stirred with the magnetic stirrer.

Example 3

Ethylene/Propylene Copolymerization
(Comparative)

To a 1 liter autoclave reactor were added propylene (100 mL), isohexane (600 mL), a hexane solution of bis(diisobutylaluminum)oxide (0.1 mmol, 0.111 mL), a hexane solution of diethylzinc (0.1 mmol, 0.5 mL), and a toluene solution of NCA-1 (2000 nmol, 2 mL). The reactor was stirred at 600 rpm and the mixture was heated to 80° C. Then the reactor was pressurized with ethylene to 75 psi and the mixture was stirred for several minutes. Then a toluene solution of CAT-2 (2000 nmol, 5 mL) was pushed in with ethylene gas at a pressure of 100 psi. Ethylene at this pressure was allowed to flow into the reactor. After 5 minutes the polymerization was quenched by the addition of isopropanol (20 mL). The reactor was then cooled, depressurized, and opened. The residual volatiles in the product were removed under a stream of nitrogen, followed by heating the sample in a vacuum oven at 60° C. Yield: 30 g.

Example 4

Ethylene/Propylene Copolymerization
(Comparative)

To a 1 liter autoclave reactor were added propylene (50 mL), isohexane (600 mL), a hexane solution of bis(diisobutylaluminum)oxide (0.1 mmol, 0.111 mL), a hexane solution of diethylzinc (0.1 mmol, 0.5 mL), and a toluene solution of NCA-1 (2000 nmol, 2 mL). The reactor was stirred at 600 rpm and the mixture was heated to 80° C. Then the reactor was pressurized with ethylene to 75 psi and the mixture was stirred for several minutes. Then a toluene solution of CAT-2 (2000 nmol, 5 mL) was pushed in with ethylene gas at a pressure of 100 psi. Ethylene at this pressure was allowed to flow into the reactor. After 5 minutes the polymerization was quenched by the addition of isopropanol (20 mL). The reactor was then cooled, depressurized, and opened. The residual volatiles in the product were removed under a stream of nitrogen, followed by heating the sample in a vacuum oven at 60° C. Yield: 24 g.

Example 5

Ethylene/Propylene Copolymerization
(Comparative)

To a 1 liter autoclave reactor were added propylene (50 mL), isohexane (600 mL), a hexane solution of bis(diisobutylaluminum)oxide (0.1 mmol, 0.111 mL), a hexane solution of diethylzinc (0.2 mmol, 1.0 mL), and a toluene solution of NCA-1 (2000 nmol, 2 mL). The reactor was stirred at 600 rpm and the mixture was heated to 80° C. Then the reactor was pressurized with ethylene to 100 psi and the mixture was stirred for several minutes. Then a toluene solution of CAT-2 (2000 nmol, 5 mL) was pushed in with ethylene gas at a pressure of 125 psi. Ethylene at this pressure was allowed to flow into the reactor. After 5 minutes the polymerization was quenched by the addition of isopropanol (20 mL). The reactor was then cooled, depressurized, and opened. The residual volatiles in the product were removed under a stream of nitrogen, followed by heating the sample in a vacuum oven at 60° C. Yield: 33 g.

Example 6

Ethylene/1,9-decadiene Copolymerization

Polymerization was performed in a thick-walled glass bottle. Toluene (65 mL) was added to the bottle and the bottle was placed in an oil bath maintained at 100° C. To the bottle were added tri(n-octyl)aluminum (0.05 mL of 1 M hexane solution, 0.05 mmol) and diethylzinc (0.05 mL of 1 M hexane solution, 0.05 mmol). The mixture was stirred rapidly (approximately 800 rpm) using a magnetic stirrer. Then NCA-1 (1 mL of 1 mM toluene solution, 1000 nmol) and CAT-1 (1 mL or 1 mM toluene solution, 1000 nmol) were added. Immediately, the bottle was capped and pressurized with ethylene (50 psi). The pressure was maintained for 4 minutes during which time the solution thickened by a moderate amount. The pressure was released and 1,9-decadiene (1 mL) was added. The bottle was immediately pressurized with ethylene (50 psi) and stirring was continued for an additional 6 minutes at this pressure. The pressure was vented and octadecyl 3-(3,5-di-tert-butyl-4-hydroxyphenyl) propionate (Irganox 1076) (10 mg) was added to quench the catalyst. The clear colorless solution was poured into a tray and the volatiles were removed under a stream of nitrogen at 60° C. to afford 1.87 g of polymer.

Example 7

Ethylene/octene/1,7-octadiene Terpolymerization

The polymerization was performed in a thick-walled glass reactor. Toluene (65 mL) and 1-octene (1 mL) were loaded into the reactor and the mixture was heated to 80° C. Then, a toluene solution of TNOA (0.12 mL, 0.06 mmol) was added, followed by a toluene solution of NCA-1 (0.750 mL, 750 nmol) and a toluene solution of CAT-2 (0.750 mL, 750 nmol). The reactor was then sealed and pressurized with ethylene (50 psig) while stirring rapidly (approximately 800 rpm) using a magnetic stirrer. After 3 minutes, the pressure was released and 1,7-octadiene (1 mL) was added to the homogeneous mixture, followed by a toluene solution of NCA-1 (0.12 mL, 120 nmol) and a toluene solution of CAT-2 (0.12 mL, 120 nmol). The reactor was then sealed and pressurized with ethylene (30 psig). After 6 minutes, the pressure was released and octadecyl 3-(3,5-di-tert-butyl-4-hydroxyphenyl)propionate (Irganox 1076) (8 mg) was added to the homogeneous, thick solution. The solution was poured into a tray and the volatiles were evaporated to afford 3.2 g of polymer product.

Example 8

Ethylene/octene/1,7-octadiene Terpolymerization

The polymerization was performed in a thick-walled glass reactor. Toluene (65 mL) and 1-octene (1 mL) were loaded into the reactor and the mixture was heated to 80° C. Then, a toluene solution of TNOA (0.12 mL, 0.06 mmol) was added, followed by a toluene solution of NCA-1 (0.750 mL, 750 nmol) and a toluene solution of CAT-2 (0.750 mL, 750 nmol). The reactor was then sealed and pressurized with ethylene (50 psig) while stirring rapidly (approximately 800 rpm) with a magnetic stirrer. After 3 minutes, the pressure was released and 1,7-octadiene (1 mL) was added to the homogeneous mixture. The reactor was then sealed and pressurized with ethylene (30 psig). After 6 minutes, the pressure was released and octadecyl 3-(3,5-di-tert-butyl-4-hydroxyphenyl)propionate (Irganox 1076) (8 mg) was added to the homogeneous, thick solution. The solution was poured into a tray and the volatiles were evaporated to afford 3.2 g of polymer product.

Example 9

Ethylene/octene/1,7-octadiene Terpolymerization

The polymerization was performed in a magnetically-stirred glass reactor. Toluene (65 mL) and 1-octene (1 mL) were loaded into the reactor and the mixture was heated to 80° C. Then, a toluene solution of TNOA (0.20 mL, 0.10 mmol) was added, followed by a toluene solution of NCA-1 (0.750 mL, 750 nmol) and a toluene solution of CAT-2 (0.750 mL, 750 nmol). The reactor was then sealed and pressurized with ethylene (50 psig) while stirring rapidly (approximately 800 rpm) using a magnetic stirrer. After 4 minutes, the pressure was released and 1,7-octadiene (1 mL) was added to the homogeneous mixture. The reactor was then sealed and pressurized with ethylene (20 psig). After 6 minutes, the pressure was vented and octadecyl 3-(3,5-di-tert-butyl-4-hydroxyphenyl)propionate (Irganox 1076) (10 mg) was added to the homogeneous, thick solution. The solution was poured into a tray and the volatiles were evaporated to afford 3.3 g of polymer product.

Example 10

Ethylene/propylene/1,9-decadiene Terpolymerization

The polymerization was performed in a 2 L autoclave reactor. A scavenger (bis(diisobutylaluminum)oxide) (1.25 mL of 0.2 M hexanes solution, 0.25 mmol), diethylzinc (0.5 mL of 1 M in hexanes, 0.5 mmol) and isohexane (1000 mL) were added to the reactor followed by propylene (150 mL). The reactor was sealed and the mixture was warmed to 90° C. while stirring rapidly (ca. 700 rpm). The pressure inside the reactor at this time was noted and the ethylene feed regulator was adjusted to a value 100 psi above this pressure. Then a mixture of CAT-2 (3000 nmol), NCA-1 (3000 nmol), and toluene (6 mL) was pushed into the reactor with a chaser of isohexane (200 mL). Immediately ethylene was opened to the reactor. An exotherm of 20° C. was observed and the polymerization was continued with ethylene pressure being maintained. After 5 minutes, the ethylene flow was blocked and 1,9-decadiene (30 mL) was added to the reactor using high pressure nitrogen to push in the charge. Ethylene was reintroduced at this time (50 psi over reactor pressure after 1,9-decadiene addition) and the polymerization was allowed to continue with ethylene flow for an additional 18 minutes. Ethanol (2.5 mL) was then added to the reactor using high pressure nitrogen to quench the polymerization. The reactor was then cooled and vented. A toluene solution of octadecyl 3-(3,5-di-tert-butyl-4-hydroxyphenyl)propionate (Irganox 1076) (0.1 g, 5 mL) was added to the solution. The polymer was recovered following evaporation of the volatiles and drying at 50° C. in a vacuum oven. Yield: 129 g.

Example 11

Ethylene/propylene/1,9-decadiene Terpolymerization

The polymerization was performed in a 2 L autoclave reactor. Bis(diisobutylaluminum)oxide (1.25 mL of 0.2 M hexanes solution, 0.25 mmol), diethylzinc (4 mL of 1 M in hexanes, 4 mmol) and isohexane (1000 mL) were added to the reactor followed by propylene (150 mL). The reactor was sealed and the mixture was warmed to 90° C. while stirring rapidly (ca. 700 rpm). The pressure inside the reactor at this time was noted and the ethylene feed regulator was adjusted to a value 100 psi above this pressure. Then a mixture of CAT-2 (3000 nmol), NCA-1 (3000 nmol), and toluene (6 mL) was pushed into the reactor with a chaser of isohexane (200 mL). Immediately ethylene was opened to the reactor. An exotherm of 13° C. was observed and the polymerization was continued with ethylene pressure being maintained. After 5 minutes, the ethylene flow was blocked and 1,9-decadiene (30 mL) was added to the reactor using high pressure nitrogen to push in the charge. Ethylene was reintroduced at this time (50 psi over reactor pressure after 1,9-decadiene addition) and the polymerization was allowed to continue with ethylene flow for an additional 18 minutes. Ethanol (2.5 mL) was then added to the reactor using high pressure nitrogen to quench the polymerization. The reactor was then cooled and vented. A toluene solution of octadecyl 3-(3,5-di-tert-butyl-4-hydroxyphenyl)propionate (Irganox 1076) (0.1 g, 5 mL) was added to the solution. The polymer was recovered following evaporation of the volatiles and drying at 50° C. in a vacuum oven. Yield: 143 g.

Example 12

Ethylene/1,9-decadiene Copolymerization

The polymerization was performed in a 2 L autoclave reactor. Bis(diisobutylaluminum)oxide (1.25 mL of 0.2 M hexanes solution, 0.25 mmol), diethylzinc (4 mL of 1 M, 4 mmol), and isohexane (1000 mL) were added to the reactor. The reactor was sealed and the mixture was warmed to 100° C. while stirring rapidly (ca. 700 rpm). The pressure inside the reactor at this time was noted and the ethylene feed regulator was adjusted to a value 200 psi above this pressure. Then a mixture of CAT-2 (3000 nmol), NCA-1 (3000 nmol), and toluene (6 mL) was pushed into the reactor with a chaser of isohexane (200 mL). Immediately, ethylene was opened to the reactor. An exotherm of 20° C. was observed and the polymerization was continued with ethylene pressure being maintained. After 5 minutes the ethylene flow was blocked and 1,9-decadiene (30 mL) was added to the reactor using high pressure nitrogen to push in the charge. Ethylene was reintroduced at this time (50 psi over reactor pressure after 1,9-decadiene addition) and the polymerization was allowed to continue with ethylene flow for an additional 18 minutes. Ethanol (2.5 mL) was then added to the reactor using high pressure nitrogen to quench the polymerization. The reactor was then cooled and vented. A toluene solution of octadecyl 3-(3,5-di-tert-butyl-4-hydroxyphenyl)propionate (Irganox 1076) (0.1 g, 5 mL) was added to the solution. The polymer was recovered following evaporation of the volatiles and drying at 50° C. in a vacuum oven. Yield: 99 g.

Example 13

Propylene/1,9-decadiene Copolymerization (Comparative)

The polymerization was performed in a 2 L autoclave reactor. Tri(n-octyl)aluminum (1.0 mL of 1.0 M hexanes solution, 1.0 mmol), 1,9-decadiene (1.5 mL), and isohexane (1000 mL) were added to the reactor followed by propylene (300 mL). The reactor was sealed and the mixture was warmed to 50° C. while stirring rapidly (ca. 700 rpm). Then a mixture of CAT-2 (1500 nmol), NCA-1 (1500 nmol), and toluene (6 mL) was pushed into the reactor with a chaser of isohexane (200 mL). An exotherm of 4° C. was observed. Stirring in the reactor became difficult. After 30 minutes, ethanol (2.5 mL) was then added to the reactor using high pressure nitrogen to quench the polymerization. The reactor was then cooled and vented. Opening the reactor revealed a semi-solid reactor gel formed around the impeller filled the entire reactor. The polymer was recovered following evaporation of the volatiles and drying at 50° C. in a vacuum oven. Yield: 148 g.

Example 1 (comparative) describes the terpolymerization of ethylene, hexene, and the crosslinking agent 1,9-decadiene where the diene is added at the start of the polymerization. Under these conditions a network gel was formed and the mixture could not be stirred using the magnetic stirrer. Example 2 describes a similar polymerization that is performed in two stages, with the diene being added in a second stage. The polymer solution from example 2 did not form a network gel and it could be stirred with the magnetic stirrer.

TABLE 1

Melt index data.

| Example | Polymer/Diene | MI, g/10 min | HLMI, g/10 min | MIR (HLMI/MI) |
|---|---|---|---|---|
| 3 | EP/none | 0.51 | 7.35 | 14 |
| 4 | EP/none | 0.96 | 14.27 | 15 |
| 5 | EP/none | 4.23 | 53.97 | 13 |
| 10 | EP/1,9-DD | <0.1 | 5.00 | >50 |
| 11 | EP/1,9-DD | 2.50 | 177.10 | 71 |
| 12 | HDPE/1,9-DD | 2.60 | 292.70 | 113 |

Table 1 illustrates that the inventive examples (10 through 12) have a melt index ratio (HLMI/MI) of greater than 50 to 113, whereas the comparative examples (3 through 5) have a MIR of 13 to 15. The larger MIR for the inventive examples indicates that they have improved shear thinning behavior.

TABLE 2

$^1$H-NMR spectroscopic data for polymers.

| Example | Polymer/Diene | Ethylene, wt % (HNMR) | vinylene/ 1000 C (HNMR) | trisub/ 1000 C (HNMR) | vinyl/ 1000 C (HNMR) | vinylidene/ 1000 C (HNMR) |
|---|---|---|---|---|---|---|
| 3 | EP/none | 61.4 | 0.02 | 0.03 | 0.02 | 0.01 |
| 4 | EP/none | 70.8 | | | | |
| 5 | EP/none | 74.3 | | | | |
| 6 | HDPE/1,9-DD | ~100 | 0.02 | 0.07 | 3.02 | 0.01 |
| 7 | EO/1,7-OD | 81.8 | 0.08 | 0.06 | 0.84 | 0.04 |

TABLE 2-continued

¹H-NMR spectroscopic data for polymers.

| Example | Polymer/Diene | Ethylene, wt % (HNMR) | vinylene/ 1000 C (HNMR) | trisub/ 1000 C (HNMR) | vinyl/ 1000 C (HNMR) | vinylidene/ 1000 C (HNMR) |
|---|---|---|---|---|---|---|
| 8 | EO/1,7-OD | 82.8 | 0.05 | 0.02 | 0.85 | 0.03 |
| 9 | EO/1,7-OD | 83.6 | 0.05 | 0.02 | 0.94 | 0.05 |
| 10 | EP/1,9-DD | 45.8 | | | | |
| 11 | EP/1,9-DD | 59.4 | | | | |
| 12 | HDPE/1,9-DD | ~100 | | | | |

Table 2 shows the amount of unsaturated alkene groups present in the polymer examples. These data show that the inventive polymers (6 through 12) have higher levels of vinyl unsaturations (0.84 to 3.02 vinyls per 1000 C) than the comparative examples (3 through 5). The presence of vinyls is desired for functionalization chemistry.

TABLE 3

GPC-3D data for polymers.

| Example | Polymer/Diene | Mn, g/mol (DRI) | Mw, g/mol (LS) | Mz, g/mol (LS) | MWD (Mw/Mn) | g'vis | mass recovery |
|---|---|---|---|---|---|---|---|
| 3 | EP/none | 102,552 | 155,439 | 183,141 | 1.5 | 1.00 | 95% |
| 4 | EP/none | 86,852 | 119,105 | 142,602 | 1.4 | 1.04 | 94% |
| 5 | EP/none | 64,255 | 78,697 | 87,272 | 1.2 | 0.99 | 96% |
| 6 | HDPE/1,9-DD | 18,102 | 29,053 | 106,275 | 1.6 | 0.78 | 91% |
| 7 | EO/1,7-OD | 21,960 | 245,484 | 2,782,487 | 11.2 | 0.45 | 82% |
| 8 | EO/1,7-OD | 24,787 | 207,299 | 3,170,972 | 8.4 | 0.51 | 83% |
| 9 | EO/1,7-OD | 13,444 | 121,101 | 5,817,318 | 9.0 | 0.42 | 88% |
| 10 | EP/1,9-DD | 81,411 | 411,800 | 1,721,312 | 5.1 | 0.47 | 86% |
| 11 | EP/1,9-DD | 33,085 | 145,426 | 1,504,680 | 4.4 | 0.43 | 85% |
| 12 | HDPE/1,9-DD | | | | | | |
| 13 | PP/1,9-DD | 17,165 | 47,520 | 33,925 | 2.8 | 0.70 | 13% |

Table 3 shows that the inventive examples (6 through 12) have MWD (Mw(LS)/Mn(DRI)) values of 4.4 to 11.2. These MWD values are higher than those of the comparative examples (3 through 5), which have MWD values between 1.2 and 1.5. The inventive examples have g'$_{vis}$ values of 0.43 to 0.78, whereas the comparative examples have values of approximately 1. Taken together these data indicate that the inventive examples have a high MW component that contains long-chain branching.

Table 3 also shows comparative example 13 which describes the copolymerization of propylene and the cross-linking agent 1,9-decadiene where the diene is added at the start of the polymerization. The isolated product was found to have very low mass recovery (13%) by GPC compared to the inventive examples (6 through 12) where the diene was added in the second stage of the polymerization.

Figure 2:
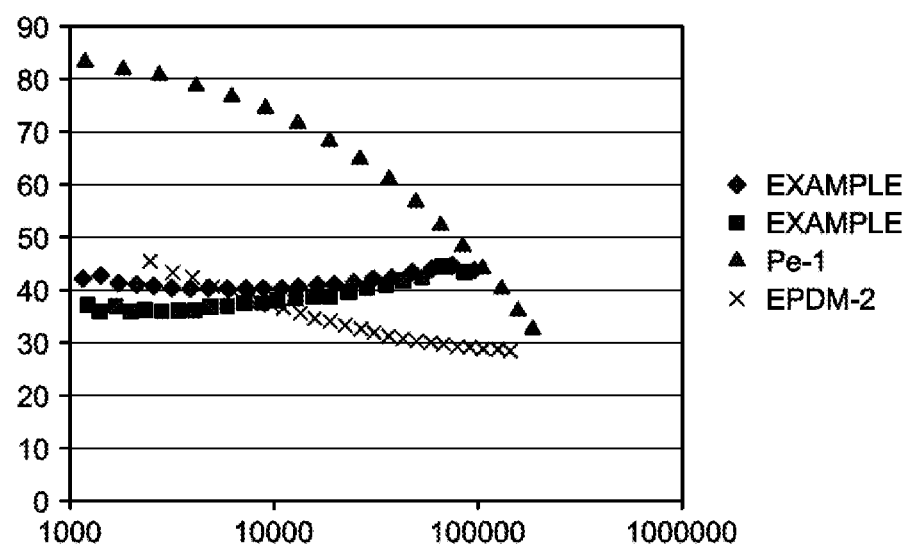
FIG. 2 is a Van Gurp-Palmen plot of complex modulus (Pa) versus phase angle (deg) for the ethylene-octene copolymers produced in polymerization Example 7 and Example 8, according to an embodiment.
Figure 3A:
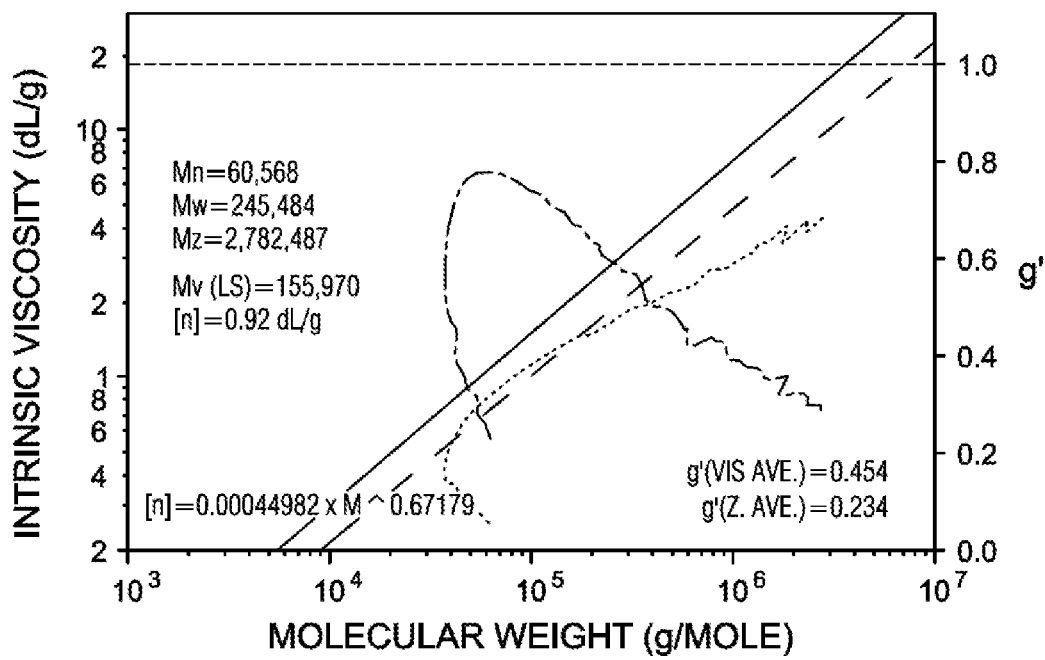
FIG. 3A is a graph illustrating GPC-3D data (intrinsic viscosity vs. Molecular weight) for the ethylene-octene copolymer produced by polymerization Example 7, according to an embodiment.
Figure 3B:
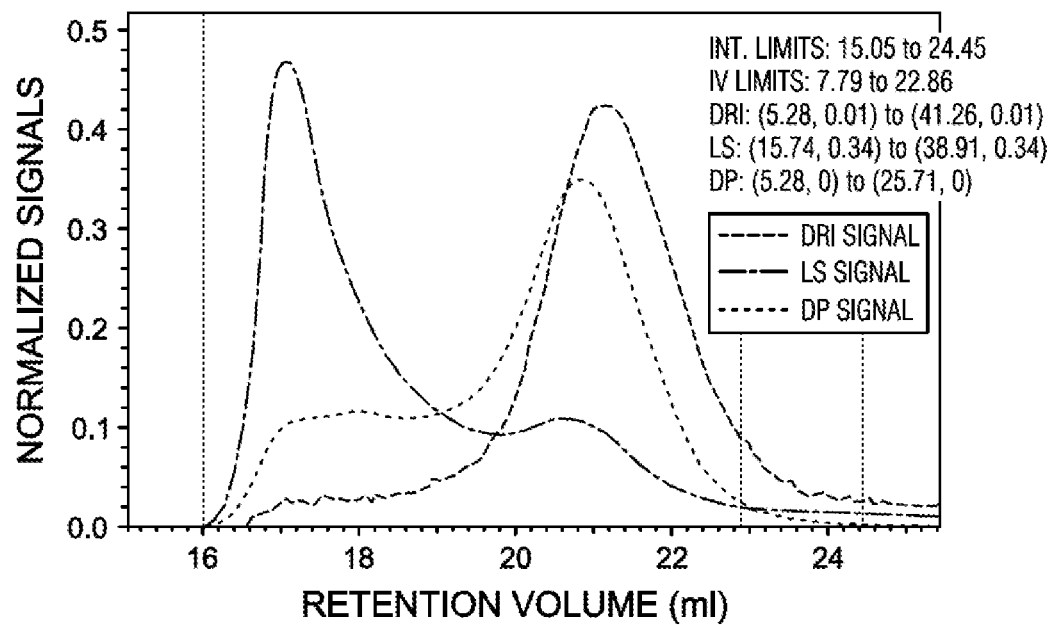
FIG. 3B is a graph illustrating GPC-3D data (normalized DRI, LS, and Viscometer chromatograms) for the ethylene-octene copolymer produced by polymerization Example 7, according to an embodiment.
Figures 3C, 3D:
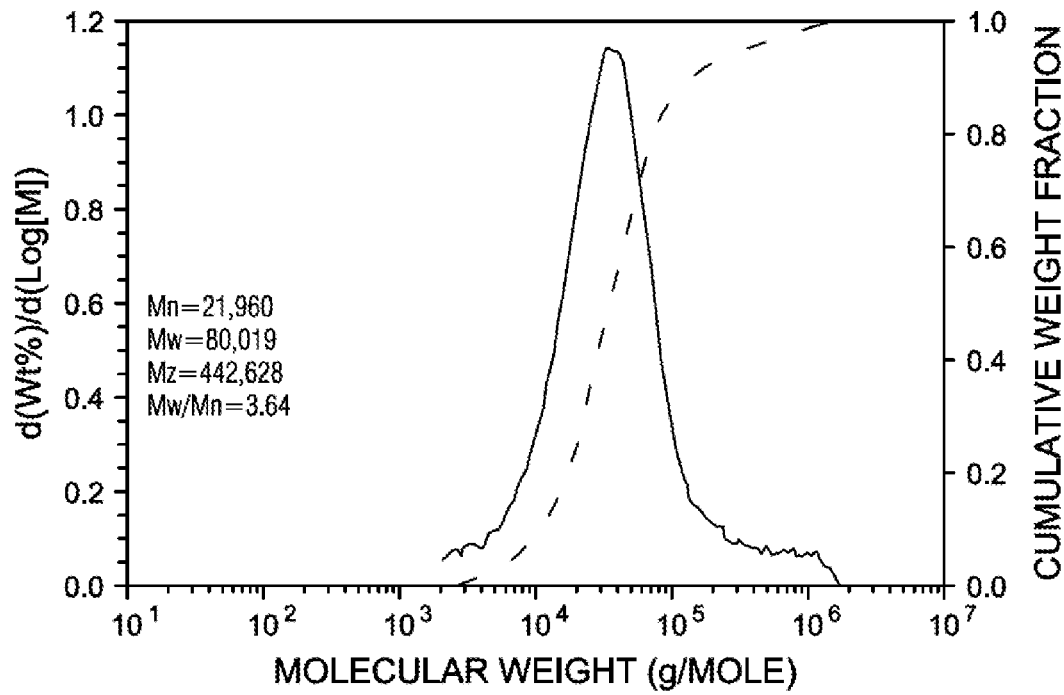
FIG. 3C is a graph illustrating GPC-3D data (MW moments and MWD obtained from DRI analysis) for the ethylene-octene copolymer produced by polymerization Example 7, according to an embodiment.
FIG. 3D is a chart of run conditions and instrument and polymer parameters for GPC-3D data obtained for the ethylene-octene copolymer produced by polymerization Example 7, according to an embodiment.
Figure 4A:
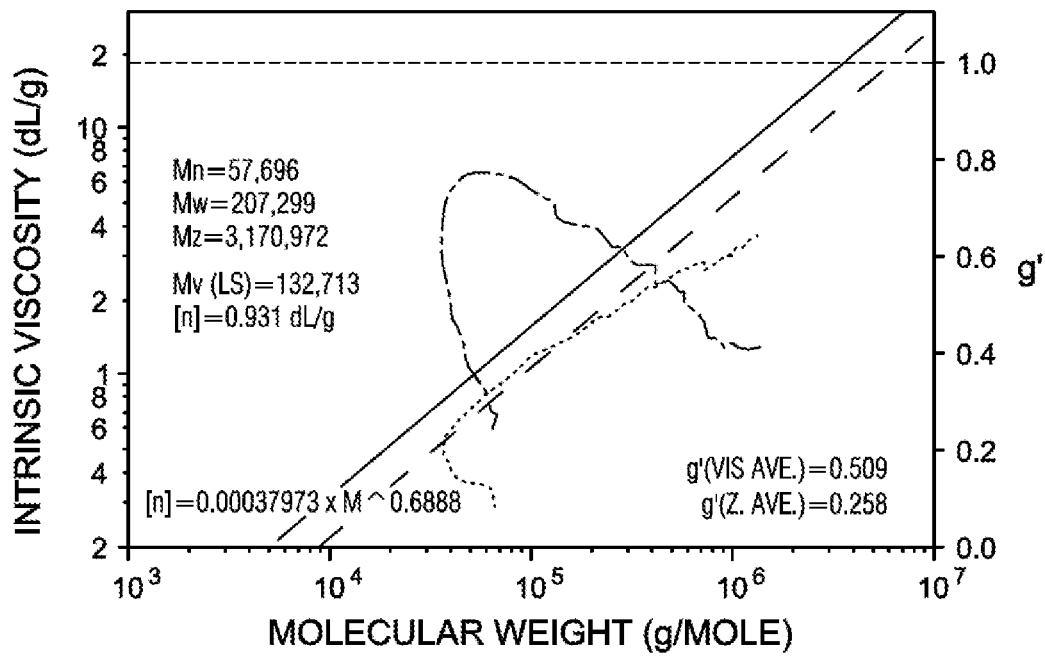
FIG. 4A is a graph illustrating GPC-3D data (intrinsic viscosity vs. Molecular weight) for the ethylene-octene copolymer produced by polymerization Example 8, according to an embodiment.
Figure 4B:
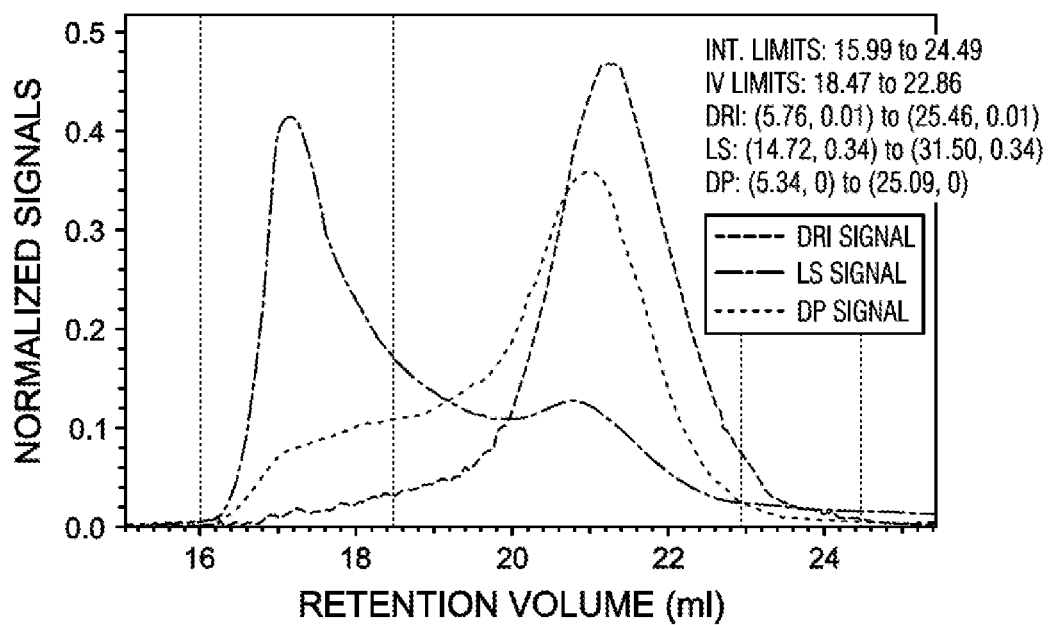
FIG. 4B is a graph illustrating GPC-3D data (normalized DRI, LS, and Viscometer chromatograms) for the ethylene-octene copolymer produced by polymerization Example 8, according to an embodiment.
Figures 4C, 4D:
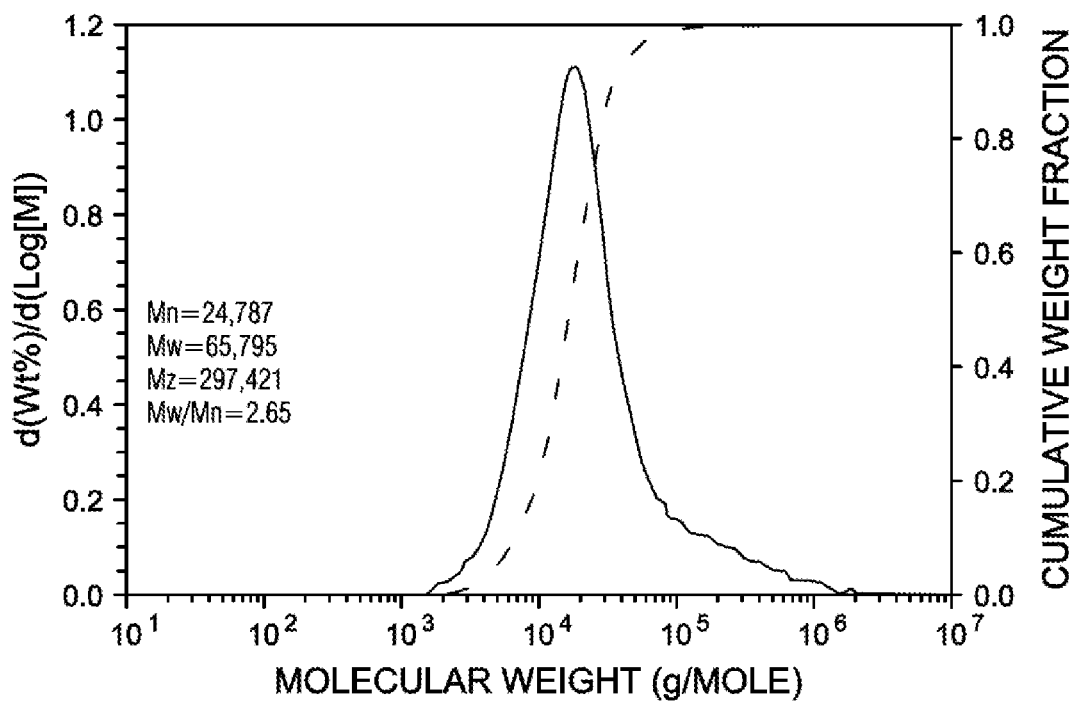
FIG. 4C is a graph illustrating GPC-3D data (MW moments and MWD obtained from DRI analysis) for the ethylene-octene copolymer produced by polymerization Example 8, according to an embodiment.
FIG. 4D is a chart of run conditions and instrument and polymer parameters for GPC-3D data obtained for the ethylene-octene copolymer produced by polymerization Example 8, according to an embodiment.
Figure 5A:
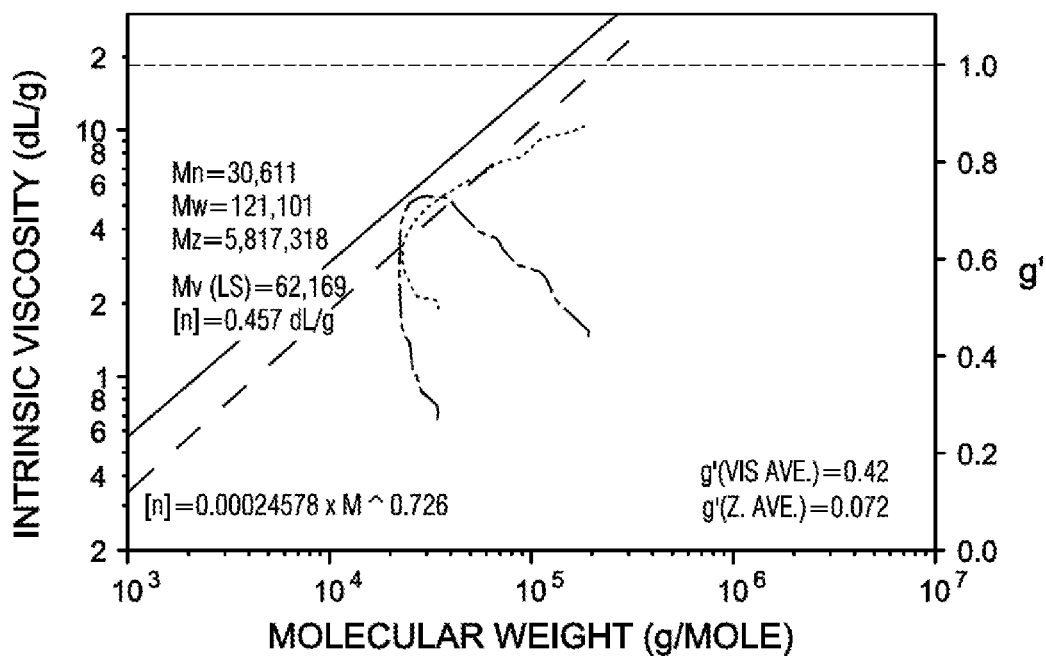
FIG. 5A is a graph illustrating GPC-3D data (intrinsic viscosity vs. Molecular weight) for the ethylene-octene copolymer produced by polymerization Example 9, according to an embodiment.
Figure 5B:
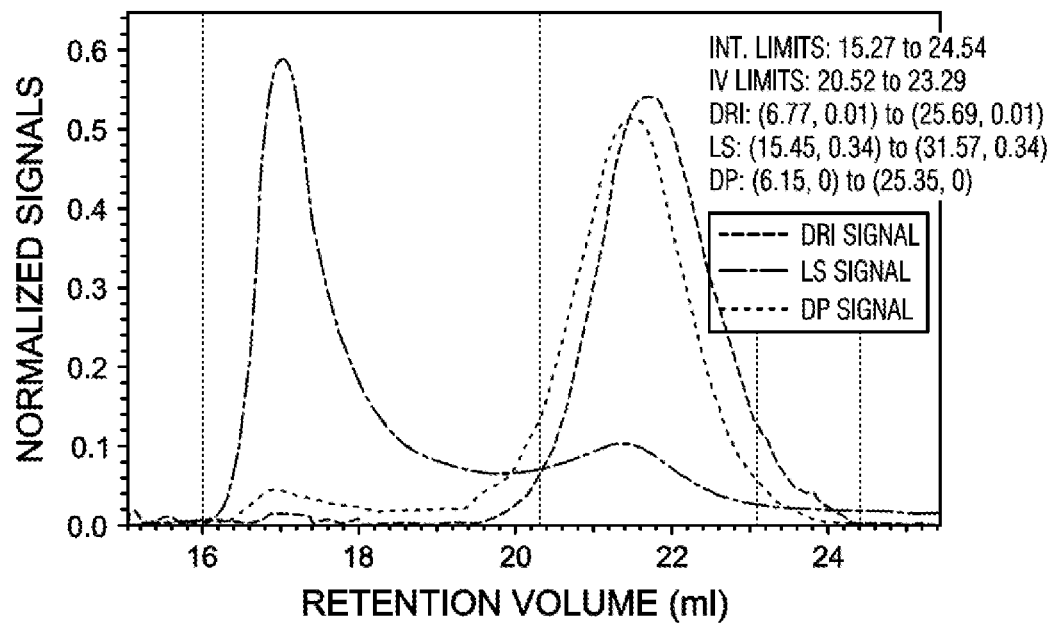
FIG. 5B is a graph illustrating GPC-3D data (normalized DRI, LS, and Viscometer chromatograms) for the ethylene-octene copolymer produced by polymerization Example 9, according to an embodiment.
Figures 5C, 5D:
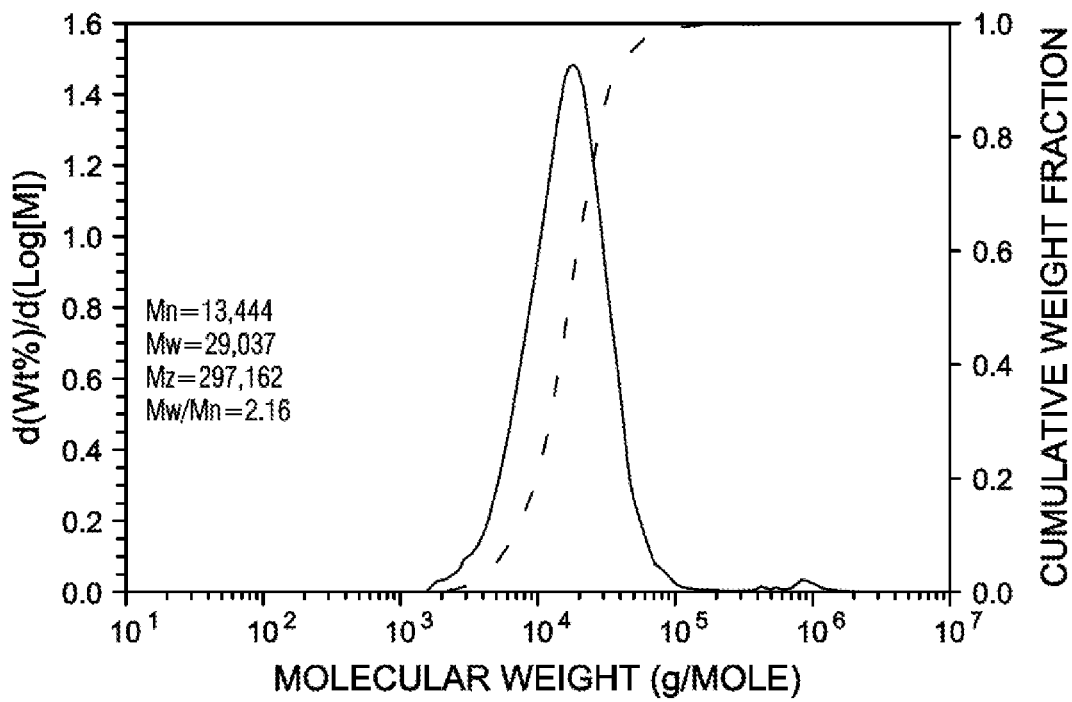
FIG. 5C is a graph illustrating GPC-3D data (MW moments and MWD obtained from DRI analysis) for the ethylene-octene copolymer produced by polymerization Example 9, according to an embodiment.
FIG. 5D is a chart of run conditions and instrument and polymer parameters for GPC-3D data obtained for the ethylene-octene copolymer produced by polymerization Example 9, according to an embodiment.

FIG. 2 is a Van Gurp-Palmen plot of complex modulus (Pa) versus phase angle (deg) for the ethylene-octene copolymers produced in polymerization Example 7 and Example 8. A Van Gurp-Palmen plot provides visualization of the elasticity of a polymer. As the phase angle gets closer to 90 degrees, the polymer is able to relax which means it has less elastic flow. As shown in FIG. 2, the polymers of Example 7 and Example 8 have a phase angle of close to 40 degrees across a wide range of complex moduli (Pa), which indicates that the polymers are elastic, very branched, very modulus materials. The comparative polymers used for FIG. 2 are commercial polymers called Pe-1 and EPDM-2. Pe-1 is a linear ethylene-propylene copolymer that contains 16 wt % ethylene. EPDM-2 is an EPDM rubber having a low Mooney viscosity, very low vinyl norbornene diene content, an ethylene content of 77 wt %, broad molecular weight distribution, and a high level of long chain branching.

FIGS. 3A-3D are GPC data for the ethylene-octene copolymer produced by polymerization Example 7. As shown in FIGS. 3A-3D, ethylene-octene copolymers can be obtained from the polymerization of Example 7 that are highly branched (g'vis of about 0.454) and have a narrow molecular weight distribution (PDI of about 3.64).

FIGS. 4A-4D are GPC data for the ethylene-octene copolymer produced by polymerization Example 8. As shown in FIGS. 4A-4D, ethylene-octene copolymers can be obtained from the polymerization of Example 8 that are highly branched (g'vis of about 0.509) and have a narrow molecular weight distribution (PDI of about 2.65).

FIGS. 5A-5D are GPC data for the ethylene-octene copolymer produced by polymerization Example 9. As shown in FIGS. 5A-5D, ethylene-octene copolymers can be obtained from the polymerization of Example 9 that are highly branched (g'vis of about 0.42) and have a narrow molecular weight distribution (Mw/Mn of about 2.16).

Figure 6:
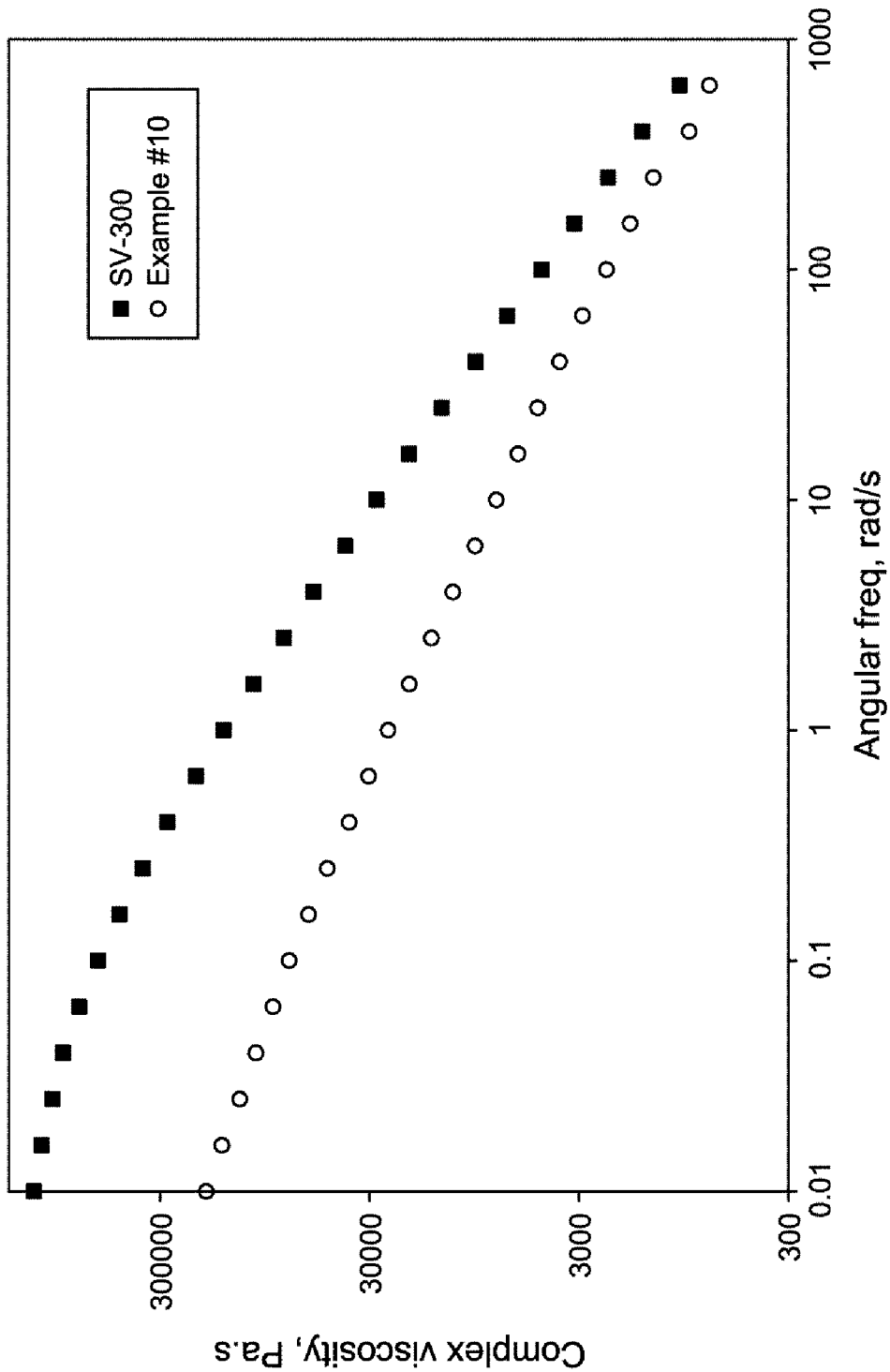
FIG. 6 is a graph of angular frequency versus complex viscosity for Example 10 and SV300™.

FIG. 6 shows the dynamic frequency sweep of the neat polymers at 190° C. for SV-300™ (available from Infineum USA, L.P., Linden N.J.), and Example 10. Example 10 shows much stronger shear thinning with viscosity decreasing across several orders of magnitude when compared to linear commercial olefin copolymer counterparts. The plateau region for Example 10 is less than 0.01 rad/s, indicating a much earlier shear thinning onset than SV300, indicating stronger fuel economy benefits in viscosity modifier applications.

Continuous Polymerizations

Polymerizations were carried out in a continuous stirred tank reactor system with two Autoclave reactors in series configuration. The first reactor was a 0.5 liter reactor and the second reactor was a 1 liter reactor. The Autoclave reactors were equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. All flow rates of liquid were controlled using Coriolis mass flow controller (Quantim series from Brooks). Ethylene flowed as a gas under its own pressure through a Brooks flow controller. Ethylene and propylene feeds were combined into one stream and then mixed with a pre-chilled isohexane stream that had been cooled to at least 0° C. The mixture was then fed to the reactor through a single line. Scavenger solution was added to the combined solvent and monomer stream just before it entered the reactor to further reduce any catalyst poisons, if any. Similarly, catalyst solution was fed to the reactor using an ISCO syringe pump through a separated line. 1,9 decadiene was fed into the reactor using an ISCO syringe pump.

Isohexane (used as solvent), and monomers (e.g., ethylene and propylene) were purified over beds of alumina and molecular sieves. Toluene for preparing catalyst solutions was purified by the same technique.

The catalyst, CAT-1, was activated with NCA-1 at a molar ratio of about 1:1 in 900 ml of toluene. Diethylzinc (52 wt % Zn basis) was diluted in toluene.

Ethylene, propylene, isohexane, catalyst solution and diethylzinc solution were fed into the first reactor. The content (including polymer produced and active catalyst) of the first reactor flowed directly into the second reactor. Otherwise, the two reactors are operated independently. 1,9 decadiene was fed into the second reactor. Polymer exited the second reactor through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The detailed polymerization process conditions and some characteristic properties are listed in Table 4. The catalyst feed rates can be adjusted according to the level of impurities in the system to reach the targeted conversions listed. All the reactions were carried out at a gauge pressure of about 2.4 MPa unless otherwise mentioned. Additional processing conditions for the polymerization process of Continuous Polymerization 1 (CP-1), Continuous Polymerization 2 (CP-2), and Continuous Polymerization 3 (CP-3), and the properties of the polymers produced are included below in Table 4.

TABLE 4

Process conditions and polymer characterization data for EP copolymer produced in a continuous polymerization.

| Sample | CP-1 | CP-2 | CP-3 |
|---|---|---|---|
| First reactor | | | |
| Polymerization temperature (° C.) | 107 | 100 | 100 |
| Ethylene feed rate to 1st reactor (g/min) | 4.52 | 4.52 | 4.52 |
| Propylene feed rate to 1st reactor (g/min) | 6 | 6 | 6 |
| Isohexane feed rate to 1st reactor (g/min) | 51.2 | 51.2 | 51.2 |
| Catalyst feed rate to 1st reactor (mole/min) | 6.373E−08 | 4.552E−08 | 4.552E−08 |
| diethylzinc feed rate to 1st reactor (mole/min) | 9.758E−05 | 9.758E−05 | 9.758E−05 |
| Second reactor | | | |
| Polymerization temperature (° C.) | 100 | 100 | 100 |
| 1,9 decadiene feed rate to 2nd reactor (g/min) | 1.5 | 2.625 | 3.75 |
| Yield (g/min) | 7.89 | 6.81 | 6.67 |
| Conversion (%) | 75.0% | 64.7% | 63.4% |
| Ethylene content (FTIR) (wt %) | 59.4% | 65.1% | 66.8% |
| MFR (230° C., 2.16 kg) (g/10 min) | 1.7 | 3.4 | 12.5 |
| MFR HL (230° C., 21.6 kg) (g/10 min) | 68.2 | | |
| Mn_DRI (g/mol) | 50,632 | 41,227 | 35,899 |
| Mw_DRI (g/mol) | 132,703 | 127,719 | 122,079 |
| Mz_DRI (g/mol) | 449,295 | 1,045,228 | 1,275,223 |
| Mw/Mn | 2.62 | 3.1 | 3.4 |
| Mn_LS (g/mol) | 77,401 | 49,222 | 46,068 |
| Mw_LS (g/mol) | 206,730 | 132,347 | 103,138 |
| Mz_LS (g/mol) | 1,263,525 | 734,261 | 428,292 |
| $g'_{vis}$ | 0.727 | 0.796 | 0.873 |

The gel content in certain polymer samples was determined according to ASTM D2765. The data are shown in Table 5. Samples 11, 12, CP-1, CP-2, and CP-3 were each determined to have insoluble gel content below 10%, whereas sample 13 had a content of insoluble gel of 85%. This result demonstrates the benefit of using a two- or multi-stage polymerization process where the crosslinking agent is not present in the first stage of the polymerization.

TABLE 5

Data for polymer samples.

| Ex | Polymer/Diene | Mn, g/mol (DRI) | Mw, g/mol (LS) | Mz, g/mol (LS) | MWD (Mw/Mn) | g'vis | mass recovery | gel content* |
|---|---|---|---|---|---|---|---|---|
| 11 | EP/1,9-DD | 33,085 | 145,426 | 1,504,680 | 4.4 | 0.43 | 85% | 4.1% |
| 12 | HDPE/1,9-DD | 19,022 | 52,120 | 2,566,257 | 2.7 | 0.77 | 94% | 9.7% |
| 13 | PP/1,9-DD | 17,165 | 47,520 | 33,925 | 2.8 | 0.70 | 13% | 85.0% |
| CP-1 | EP/1,9-DD | 50,632 | 206,730 | 1,263,525 | 4.1 | 0.73 | 86% | 2.0% |
| CP-2 | EP/1,9-DD | 41,227 | 132,347 | 734,261 | 3.2 | 0.80 | 91% | 0.6% |
| CP-3 | EP/1,9-DD | 35,899 | 103,138 | 428,292 | 2.9 | 0.87 | 95% | 1.2% |

*by ASTMD2765

Overall, methods of the present disclosure and polymers formed by methods of the present disclosure provide reduced or eliminated gel-formation in a reactor, providing mass recovery of polymer products of 50% or greater (preferably 60% or greater, preferably 70% or greater, preferably 80% or greater, preferably 90% or greater), as determined by GPC. Methods of the present disclosure provide long-chain branched polyolefins produced using diene crosslinking agents, while not forming intractable reactor gel. Polymers of the present disclosure can have $g'_{vis}$ values of 0.9 or less, such as from about 0.4 to about 0.8, as determined by GPC-3D. Low $g'_{vis}$ values indicate shear thinning behavior, e.g. a polymer is becoming less viscous at higher shear rates (which indicates long-chain branching). Polymers of the present disclosure can have a vinyl unsaturation content of 0.1 or greater vinyls/1000 carbons, as determined by $^1$H NMR, which provides reactive end groups of the polymers for functionalization.

Overall, methods of the present disclosure and polymers formed by methods of the present disclosure provide reduced or eliminated gel-formation in a reactor, providing polymers having reduced or eliminated gel-formation in a reactor, preferably providing reduced or eliminated gel content of 20 wt % or less (preferably less than 15 wt %, preferably less than 10 wt %, preferably less than 5 wt %, preferably less than 3 wt %, preferably less than 2 wt %, preferably less than 1 wt %, preferably less than 0.5 wt %, preferably 0 wt %, based on the weight of the polymer. Methods of the present disclosure provide long-chain branched polyolefins produced using diene crosslinking agents, while not forming intractable reactor gel. Polymers of the present disclosure can have $g'_{vis}$ values of 0.9 or less, such as from about 0.4 to about 0.8, as determined by GPC-3D. Low $g'_{vis}$ values indicate shear thinning behavior, e.g. a polymer is becoming less viscous at higher shear rates (which indicates long-chain branching). Polymers of the present disclosure can have a vinyl unsaturation content of 0.1 or greater vinyls/1000 carbons, as determined by $^1$H NMR, which provides reactive end groups of the polymers for functionalization.

All documents described herein are incorporated by reference herein, including any priority documents and/or testing procedures to the extent they are not inconsistent with this text. As is apparent from the foregoing general description and the specific embodiments, while some embodiments of the present disclosure have been illustrated and described, various modifications can be made without departing from the spirit and scope of the present disclosure. Accordingly, it is not intended that embodiments of the present disclosure be limited thereby. Likewise, the term "comprising" is considered synonymous with the term "including." Likewise, whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa. Likewise, the terms "comprising," "consisting essentially of," "consisting of" also include the product of the combinations of elements listed after the term.

What is claimed is:

1. A method for producing an olefin polymer comprising:
   i) contacting alpha-olefin with a catalyst system comprising a first non-metallocene catalyst, an activator, and a reversible chain transfer agent to form a first polymer;
   ii) contacting the first polymer with a coupling agent in the presence of the first catalyst system or a second catalyst system comprising a second non-metallocene catalyst, which is the same as or different from the first non-metallocene catalyst, and a second activator; and
   iii) obtaining a second polymer.

2. The method of claim 1, further comprising transferring the first polymer from a first reactor to a second reactor.

3. The method of claim 1, wherein contacting the alpha-olefin of step i) is performed in the absence of a coupling agent.

4. The method of claim 1, wherein contacting the first polymer in step ii) is performed in the absence of additional reversible chain transfer agent.

5. The method of claim 1, wherein the alpha-olefin comprises ethylene and $C_3$-$C_{20}$ comonomer.

6. The method of claim 1, wherein contacting the alpha-olefin of step i) and contacting the first polymer of step ii) are performed at a temperature of from about 75° C. to about 190° C.

7. The method of claim 1, wherein contacting the alpha-olefin of step i) and contacting the first polymer of step ii) are performed at a pressure of from about 2.5 Mpa or more.

8. The method of claim 1, wherein the first catalyst system is combined with toluene.

9. The method of claim 1, wherein contacting the alpha-olefin of step i) has an average residence time of from about 10 minutes to about 100 minutes.

10. The method of claim 1, wherein contacting the first polymer of step ii) has an average residence time of from about 10 minutes to about 100 minutes.

11. The method of claim 1, wherein a period of time between contacting the alpha-olefin of step i) and contacting the first polymer of step ii) is from about 0.1 minutes to about 5 minutes.

12. The method of claim 1, wherein contacting alpha-olefin of step i) and contacting the first polymer of step ii) are performed in the absence of hydrogen.

13. The method of claim 1, wherein the reversible chain transfer agent comprises one or more agent selected from trialkyl aluminums and dialkyl zincs.

14. The method of claim 13, wherein the reversible chain transfer agent comprises trialkyl aluminum selected from triethylaluminum, tri(i-butyl) aluminum, tri(n-hexyl) aluminum, tri(n-octyl) aluminum.

15. The method of claim 13, wherein the chain transfer agent comprises dialkyl zinc selected from diethyl zinc, dipropyl zinc, and dioctyl zinc.

16. The method of claim 1, wherein the coupling agent is an α,ω-diene.

17. The method of claim 16, wherein the coupling agent is one or more of 1,6-heptadiene; 1,7-octadiene; 1,8-nonadiene; 1,9-decadiene; 1,10-undecadiene; 1,11-dodecadiene; 1,12-tridecadiene; and 1,13-tetradecadiene.

18. The method of claim 1, wherein the each catalyst is represented by formula (I) or formula (II):

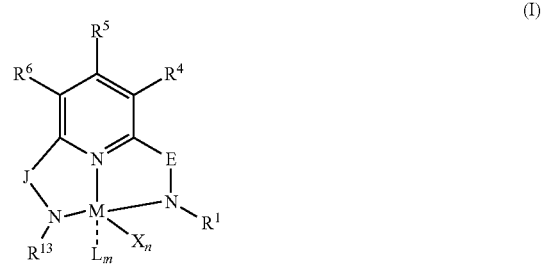

-continued

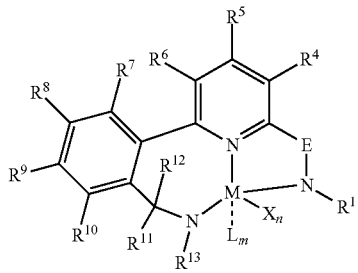
(II)

wherein:
M is a Group 3, 4, 5, 6, 7, 8, 9, or 10 metal;
E is $C(R^2)$ or $C(R^3)(R^{3'})$;
X is an anionic leaving group, wherein two X groups may be joined to form a dianionic group;
L is a neutral Lewis base, wherein two L groups may be joined to form a bidentate Lewis base, wherein an X group may be joined to an L group to form a monoanionic bidentate group;
$R^1$ and $R^{13}$ are independently selected from substituted or unsubstituted $C_1$-$C_{40}$ hydrocarbyl or silyl groups;
$R^2$ is a group containing 1-10 carbon atoms that is optionally joined with $R^4$ to form an aromatic ring;
$R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino, or two of $R^3$, $R^{3'}$, $R^4$, $R^5$, $R^6$, $R^7$, $R^8$, $R^9$, $R^{10}$, $R^{11}$, and $R^{12}$ may be joined to form a ring;
J is a divalent group that forms a three-atom-length bridge between the pyridine ring and the amido nitrogen;
n is 1 or 2;
m is 0, 1, or 2.

19. The method of claim 18, wherein M is Zr or Hf; X is methyl, chloride, or dialkylamido; L is ether, amine, phosphine, or thioether; $R^1$ and $R^{13}$ are aryl; $R^3$ and $R^{3'}$ are hydrogen; and J is selected from:

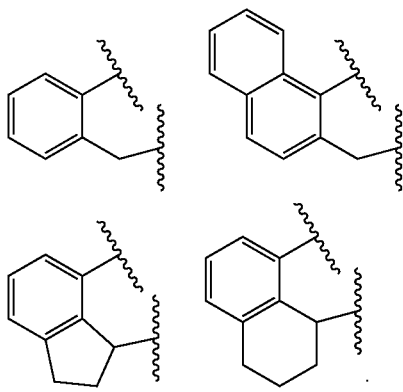

20. The method of claim 18, wherein the catalyst is:

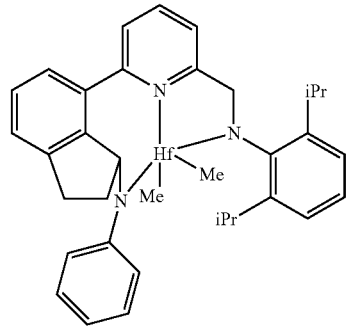

or

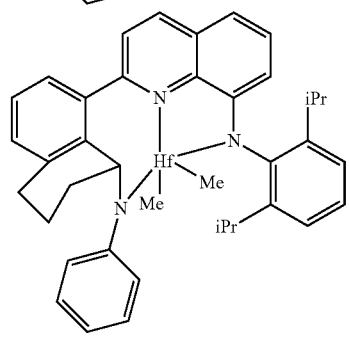

21. The method of claim 1, wherein the activator is represented by the formula:

$$(Z)_d^+(A^{d-})$$

wherein: Z is (L-H) or a reducible Lewis acid, wherein L is a neutral Lewis base, H is hydrogen, and (L-H) is a Bronsted acid; and $A^{d-}$ is a boron containing non-coordinating anion having the charge d−, wherein d is 1, 2, or 3.

22. The method of claim 21, wherein the activator comprises one or more of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4+}$], [Me$_3$NH$^+$][B(C$_6$F$_5$)$^{4-}$], N,N-dimethylanilinium tetrakis(perfluorophenyl)aluminate, methyl dioctadecylammonium tetrakis(pentafluorophenyl)borate, and methyl di(hydrogenated tallow)ammonium tetrakis(pentafluorophenyl)borate.

23. The method of claim 22, wherein the activator is N,N-dimethylanilinium tetrakis(pentafluorophenyl)borate.

24. The method of claim 1, wherein the second polymer has gel content of 20% or less based on the total weight of polymer product.

25. The method of claim 24, wherein the second polymer has a gel content of 5% or less based on the total weight of polymer product.

* * * * *